United States Patent
Wang et al.

(10) Patent No.: US 12,361,162 B2
(45) Date of Patent: Jul. 15, 2025

(54) PRIVACY PRESERVING MACHINE LEARNING FOR CONTENT DISTRIBUTION AND ANALYSIS

(71) Applicant: Google LLC, Mountain View, CA (US)

(72) Inventors: Gang Wang, Jersey City, NJ (US); Evgeny Skvortsov, Kirkland, WA (US)

(73) Assignee: Google LLC, Mountain View, CA (US)

( * ) Notice: Subject to any disclaimer, the term of this patent is extended or adjusted under 35 U.S.C. 154(b) by 191 days.

(21) Appl. No.: 17/908,284

(22) PCT Filed: Feb. 3, 2021

(86) PCT No.: PCT/US2021/016479
§ 371 (c)(1),
(2) Date: Aug. 31, 2022

(87) PCT Pub. No.: WO2022/169447
PCT Pub. Date: Aug. 11, 2022

(65) Prior Publication Data
US 2023/0205915 A1    Jun. 29, 2023

(51) Int. Cl.
*G06F 21/62* (2013.01)
*H04L 9/08* (2006.01)

(52) U.S. Cl.
CPC .......... *G06F 21/6245* (2013.01); *H04L 9/085* (2013.01); *H04L 2209/46* (2013.01)

(58) Field of Classification Search
CPC ..... H04L 9/085; H04L 9/0852; H04L 9/0863; H04L 9/0866; H04L 9/0872; H04L 9/30; H04L 209/46; G06F 21/6245
USPC ......................................... 709/220, 224–229
See application file for complete search history.

(56) References Cited

U.S. PATENT DOCUMENTS

| | | | |
|---|---|---|---|
| 8,543,907 B1 * | 9/2013 | Roskind | G06F 16/958 715/234 |
| 9,003,441 B1 | 4/2015 | Jindal et al. | |
| 9,037,975 B1 * | 5/2015 | Taylor | G06F 16/9577 715/733 |
| 9,183,258 B1 * | 11/2015 | Taylor | G06F 16/24578 |
| 9,342,930 B1 * | 5/2016 | Kraft | G06Q 30/0261 |
| 9,485,537 B1 | 11/2016 | Canney et al. | |

(Continued)

FOREIGN PATENT DOCUMENTS

| | | | | |
|---|---|---|---|---|
| AU | 2012231667 A1 * | 3/2013 | ............ | G06F 16/48 |
| CA | 2893960 A1 * | 6/2014 | ........... | G06F 16/335 |

(Continued)

OTHER PUBLICATIONS

Office Action in Korean Appln. No. 10-2022-7033024, mailed on Jul. 11, 2024, 15 pages (with English translation).
Archer et al., "From Keys to Databases—Real-World Applications of Secure Multi-Party Computation" International Association for Cryptologic Research, Nov. 28, 2018, 32 pages.

(Continued)

*Primary Examiner* — Khanh Q Dinh
(74) *Attorney, Agent, or Firm* — Fish & Richardson P.C.

(57) ABSTRACT

This disclosure relates to systems and techniques that can be implemented by content platforms to optimize (a) demographic-based digital component distribution used to categorize each user into a particular demographic so as to appropriately target that user for purposes of maximizing the efficacy of digital components shown to that user, and (b) demographic reporting used to report to digital component providers the effectiveness of the digital component.

18 Claims, 15 Drawing Sheets

(56) References Cited

U.S. PATENT DOCUMENTS

| | | | |
|---|---|---|---|
| 11,630,851 B2* | 4/2023 | Lacerda | G06F 16/90335 706/46 |
| 2006/0143084 A1* | 6/2006 | Donnelli | G06Q 30/0273 705/14.69 |
| 2007/0078835 A1* | 4/2007 | Donnelli | G06Q 30/02 |
| 2008/0275309 A1* | 11/2008 | Stivoric | G16H 10/60 600/300 |
| 2009/0177068 A1* | 7/2009 | Stivoric | A61B 5/0022 600/365 |
| 2012/0123232 A1* | 5/2012 | Najarian | G16Z 99/00 600/407 |
| 2013/0117208 A1* | 5/2013 | Dousse | G06N 20/00 706/21 |
| 2013/0158368 A1* | 6/2013 | Pacione | A61B 5/318 600/595 |
| 2017/0053540 A1* | 2/2017 | Meagher | G09B 5/00 |

FOREIGN PATENT DOCUMENTS

| | | |
|---|---|---|
| JP | 2009-008484 | 1/2009 |
| KR | 10-2010-0017778 | 2/2010 |
| KR | 10-2017-0002578 | 1/2017 |
| KR | 10-2020-0098619 | 8/2020 |
| WO | WO 2019010057 | 1/2019 |

OTHER PUBLICATIONS

Github.com [online], "Aggregated Reporting API" Oct. 2019, retrieved on Nov. 18, 2022, retrieved from URL <https://github.com/csharrison/aggregate-reporting-api>, 6 pages.

Github.com [online], "Attribution Reporting API with Aggregatable Reports" Aug. 2019, retrieved on Nov. 18, 2022, retrieved from URL <https://github.com/WICG/attribution-reporting-api/blob/main/AGGREGATE.md>, 14 pages.

Github.com [online], "TurtleDove" Jan. 2020, retrieved on Nov. 10, 2022, retrieved from URL <https://github.com/michaelkleber/turtledove>, 2 pages.

International Search Report and Written Opinion in International Appln. No. PCT/US2021/016479, dated Oct. 8, 2021, 21 pages.

International Preliminary Report on Patentability in International Appln. No. PCT/US2021/016479, mailed on Aug. 17, 2023, 14 pages.

Notice of Allowance in Japanese Appln. No. 2022-559376, Mar. 11, 2024, 5 pages (with English translation).

Office Action in Japanese Appln. No. 2022-559376, mailed on Nov. 20, 2023, 4 pages (with English translation).

Notice of Allowance in Korean Appln. No. 10-2022-7033024, mailed on Mar. 6, 2025, 4 pages (with English translation).

Office Action in Indian Appln. No. 202227049788, mailed on Mar. 12, 2025, 6 pages (with English translation).

* cited by examiner

PRIVACY PRESERVING MACHINE LEARNING FOR CONTENT DISTRIBUTION AND ANALYSIS

CROSS-REFERENCE TO RELATED APPLICATIONS

This application is a National Stage Application under 35 U.S.C. § 371 and claims the benefit of International Application No. PCT/US2021/016479, filed Feb. 3, 2021, the entirety of which is incorporated herein by reference.

TECHNICAL FIELD

This specification relates to a privacy preserving machine learning platform that trains and uses machine learning models using secure multi-party computation.

BACKGROUND

Some machine learning models are trained based on data collected from multiple sources, e.g., across multiple websites and/or native applications. However, this data may include private or sensitive data that should not be shared or allowed to leak to other parties.

SUMMARY

Digital component providers often benefit from being able to restrict the audience to whom digital components are displayed. Such restrictions are beneficial for users because they can be displayed more relevant content. Such restrictions can be based on demographics of the audience. Content platforms provide digital component providers the ability to distribute digital components of their campaigns to particular groups of users, e.g., users of particular demographic groups. Content platforms often do so by associating a cookie (e.g. third party cookie) of the user with one of the demographic groups, which can be performed even if the user is not logged in to a website displaying the digital component. The content platform may facilitate display of digital components on a website of the content provider or other websites (e.g. third party websites, which are websites hosted by entities other than the content provider platform). To keep a track of the browsing preferences of the user, the content platform uses a same cookie to trace the browsing history of the user across different websites. Content platforms use data extracted from that cookie to (a) categorize each user into a particular demographic so as to appropriately target that user for purposes of maximizing the efficacy of digital components shown to that user, and (b) report to digital component providers the effectiveness of the digital component. However, the use of cookie is disadvantageous because other websites may have access to that cookie, and thus the user preferences across different websites are accessible by each of those websites. Such access to user behavior by many websites can sometimes be deemed intrusive into the privacy of users. To avoid such intrusiveness, there exists a need to optimize the demographic-based digital component distribution and reporting performed by content platforms without the use of such cookies. In addition, some browsers block the use of third party cookies, such that the browsing information typically collected across multiple websites is no longer available. As such, any functionality, such as regulating distribution of data to client devices, that relies on information collected by third party cookies (e.g., cookies from a domain that differs from the domain of the web page currently being viewed by a user), is no longer available.

This disclosure relates privacy preserving machine learning platform that trains and uses machine learning models using secure multi-party computation. In particular, the disclosure describes systems and techniques for categorizing users into particular demographic groups without the use of third party cookies, and reporting the effectiveness of campaigns for distributing digital components to user groups that are based at least in part on demographic information.

In one aspect, an application of a client device can receive, from one or more computers, data identifying inferred demographic features of a user of the application. The application can display digital content including computer-readable code for reporting events related to the digital content, data specifying a set of allowed demographic-based user group identifiers, and a campaign identifier for the digital content. The application can determine that a given inferred feature matches a given allowed demographic-based user group identifier. In response to determining that the given inferred demographic feature matches the given allowed demographic-based user group identifier, the computer-readable code can be used to generate and send a request to update one or more event counts for the digital content and the given allowed demographic-based user group identifier.

In some implementations, one or more of the following can be additionally or alternately be implemented in any suitable combination. Receiving the data identifying inferred demographic features of a user of the application can include receiving inferred demographic-based user group identifiers for demographic-based user groups to which to add the user at the client device. An inference request including a user profile of the user can be sent to the one or more computers. The inferred demographic user group identifiers can be received from the one or more computers in response to the inference request. The one or more computers can include a plurality of multi-party computation (MPC) servers. Sending the inference request to the one or more computers can include sending a respective secret share of the user profile to each of the plurality of MPC servers. The plurality of MPC servers can perform a secure MPC process using one or more machine learning models to generate secret shares of the inferred demographic-based user group identifiers and transmits the secrets shares of the inferred demographic-based user group identifiers to the application.

The application can send, to the one or more computers, an inference request for the data identifying the inferred demographic features of the user of the application. The inference request can include a user profile of the user and contextual signals related to at least one of (i) a digital content slot in which the digital content is displayed or (ii) the digital content, wherein the inferred demographic user group identifiers are received from the one or more computers in response to the inference request, or (iii) uniform resource locator (URL) of a resource that includes the digital content, a location of the client device, spoken language setting of the application. Generating and sending, using the computer-readable code, the request to update one or more event counts for the digital content and the given allowed demographic-based user group identifier can include: generating an aggregation key comprising the campaign identifier and the given allowed demographic-based user group identifier; and transmitting the aggregation key with the request. Generating and transmitting, using the computer-readable code, the request to update one or more event counts for the digital content and the given allowed demographic-based user group identifier can include invoking an application programming interface (API) of the application to send the request.

Methods, systems, apparatuses, computer programmable products, and the like implementing the features noted above are also within the scope of this disclosure. For example, in some aspects, a system is described that includes at least one programmable processor; and a machine-readable medium storing instructions that, when executed by the at least one programmable processor, cause the at least one programmable processor to perform operations comprising: receiving, by an application of a client device and from one or more computers, data identifying inferred demographic features of a user of the application; displaying, by the application, a digital content including computer-readable code for reporting events related to the digital content, and data specifying a set of allowed demographic-based user group identifiers and a campaign identifier for the digital content; determining, by the application, that a given inferred feature matches a given allowed demographic-based user group identifier; and in response to determining that the given inferred demographic feature matches the given allowed demographic-based user group identifier, generating and sending, using the computer-readable code, a request to update one or more event counts for the digital content and the given allowed demographic-based user group identifier.

Similarly, in certain aspects, a non-transitory computer program product is described that can store instructions that, when executed by at least one programmable processor, cause the at least one programmable processor to perform operations that can include: receiving, by an application of a client device and from one or more computers, data identifying inferred demographic features of a user of the application; displaying, by the application, digital content including computer-readable code for reporting events related to the digital content, data specifying a set of allowed demographic-based user group identifiers, and a campaign identifier for the digital content; determining, by the application, that a given inferred feature matches a given allowed demographic-based user group identifier; and in response to determining that the given inferred demographic feature matches the given allowed demographic-based user group identifier, generating and sending, using the computer-readable code, a request to update one or more event counts for the digital content and the given allowed demographic-based user group identifier.

In some aspects, one or more processors can perform operations comprising: receiving, from a first browser of a digital content provider, data identifying digital content and a first set of one or more demographic categories for which demographic reporting is to be performed; associating a user of a client device on which the digital content is being displayed with a second set of one or more demographic categories; if the first set of one or more demographic categories and the second set of one or more demographic categories have at least one demographic category in common, transmitting browsing events input on the client device and the at least one common demographic category to an API, wherein the API combines the browsing events and the at least one common demographic category with at least one browsing event of other users and related at least one demographic category that is one of the first set of one or more demographic categories to generate aggregated data; receiving, from the API, the aggregated data; and generating a report comprising the aggregated data.

The associating of the user with the second set of one or more demographic categories can include: receiving a self-identification, by the user on the first browser, of the second set of one or more demographic categories; and mapping the user to the second set of one or more demographic categories. The associating of the user with the second set of one or more demographic categories can include: transmitting, to a multi-party computation cluster, browsing history of the user; receiving, from a machine learning model within the multi-party computation cluster, inferences output by the machine learning model, the inferences comprising the second set of demographic categories; and mapping the user to the second set of one or more demographic categories. The generating of the report can include: arranging the aggregated data in a table; generating analytics based on the aggregated data; and providing the table and the analytics in the report. The report can be generated in response to a request for the report or automatically at preset intervals of time. The request for the report can be generated by one or more of the digital content provider, content platform, secure multi-party computing cluster, or a publisher that develops and provides the first browser. The request for the report can be generated automatically at preset intervals of time or upon a count of an event exceeding a preset threshold.

The data identifying the digital content and the first set of one or more demographic categories can be included in an aggregate key. The data identifying the digital content can include a uniform resource locator (URL) of a resource displaying the digital content. The operations can further include determining a third set of demographic categories that are relevant for the user; and restricting the first browser of the client device to displaying digital content indicated by respective digital content providers as being associated with a category of the third set of demographic categories. The determining of the third set of one or more demographic categories can include receiving a self-identification, by the user on the first browser, of the third set of one or more demographic categories as being relevant for the user. The determining of the third set of one or more demographic categories can include: transmitting, to a multi-party computation cluster, browsing history of the user; and receiving, from the multi-party computation cluster, data identifying the third set of demographic categories.

Methods, systems, apparatuses, computer programmable products, and the like implementing the features noted above are also within the scope of this disclosure. For example, in some aspects, a system is described that can include: at least one programmable processor; and a machine-readable medium storing instructions that, when executed by the at least one programmable processor, cause the at least one programmable processor to perform operations comprising: receiving, from a first browser of a digital content provider, data identifying digital content and a first set of one or more demographic categories for which demographic reporting is to be performed; associating a user of a client device on which the digital content is being displayed with a second set of one or more demographic categories; if the first set of one or more demographic categories and the second set of one or more demographic categories have at least one demographic category in common, transmitting browsing events input on the client device and the at least one common demographic category to an API, wherein the API combines the browsing events and the at least one common demographic category with at least one browsing event of other users and related at least one demographic category that is one of the first set of one or more demographic categories to generate aggregated data; receiving, from the API, the aggregated data; and generating a report comprising the aggregated data.

Similarly, in another aspect, a non-transitory computer program product is described that can store instructions that, when executed by at least one programmable processor, cause the at least one programmable processor to perform operations comprising: receiving, from a first browser of a digital content provider, data identifying digital content and a first set of one or more demographic categories for which demographic reporting is to be performed; associating a user of a client device on which the digital content is being displayed with a second set of one or more demographic categories; if the first set of one or more demographic categories and the second set of one or more demographic categories have at least one demographic category in common, transmitting browsing events input on the client device and the at least one common demographic category to an API, wherein the API combines the browsing events and the at least one common demographic category with at least one browsing event of other users and related at least one demographic category that is one of the first set of one or more demographic categories to generate aggregated data; receiving, from the API, the aggregated data; and generating a report comprising the aggregated data.

The subject matter described in this specification can be implemented in particular embodiments so as to realize one or more of the following advantages. The digital component distribution techniques described in this document can identify users that have similar interests and expand user group membership while preserving the privacy of users, e.g., without leaking users' online activity to any computing systems. This protects user privacy with respect to such platforms and preserves the security of the data from breaches during transmission to or from the platforms. Cryptographic techniques, such as secure multi-party computation (MPC), enable the expansion of user groups based on similarities in user profiles without the use of third-party cookies, which preserves user privacy without negatively impacting the ability to expand the user groups and in some cases provides better user group expansion based on more complete profiles than achievable using third-party cookies. The MPC techniques can ensure that, as long as one of the computing systems in an MPC cluster is honest, no user data can be obtained by any of the computing systems or another party in cleartext. As such, the methods described herein allow the identification, grouping and transmission of user data in a secure manner, without requiring the use of third-party cookies to determine any relations between user data. This is a distinct approach from traditional methods, which generally require third-party cookies to determine relationships between data. By grouping user data in this manner, the efficiency of transmitting data content to user devices is improved as data content that is not relevant to a particular user need not be transmitted. Particularly, third-party cookies are not required thereby avoiding the storage of third-party cookies, improving memory usage. Exponential decay techniques can be used to build user profiles at client devices to reduce the data size of the raw data needed to build the user profiles, thereby reducing data storage requirements.

The demographic reporting techniques involve generation of reports to digital component providers based on user group membership of the users to indicate how their digital components performed for particular user groups. By using secure MPC machine learning techniques to predict user demographics, the reports can more accurately reflect the performance for demographic-based user groups without sacrificing user privacy. The process to generate such reports does not leak individual user's data to any entity, thereby preserving user privacy. The structural design of the reporting framework does not use cookies, and prevents the leak of user data.

Various features and advantages of the foregoing subject matter is described below with respect to the figures. Additional features and advantages are apparent from the subject matter described herein and the claims.

BRIEF DESCRIPTION OF THE DRAWINGS

Like reference numbers and designations in the various drawings indicate like elements.

DETAILED DESCRIPTION

Figure 1:
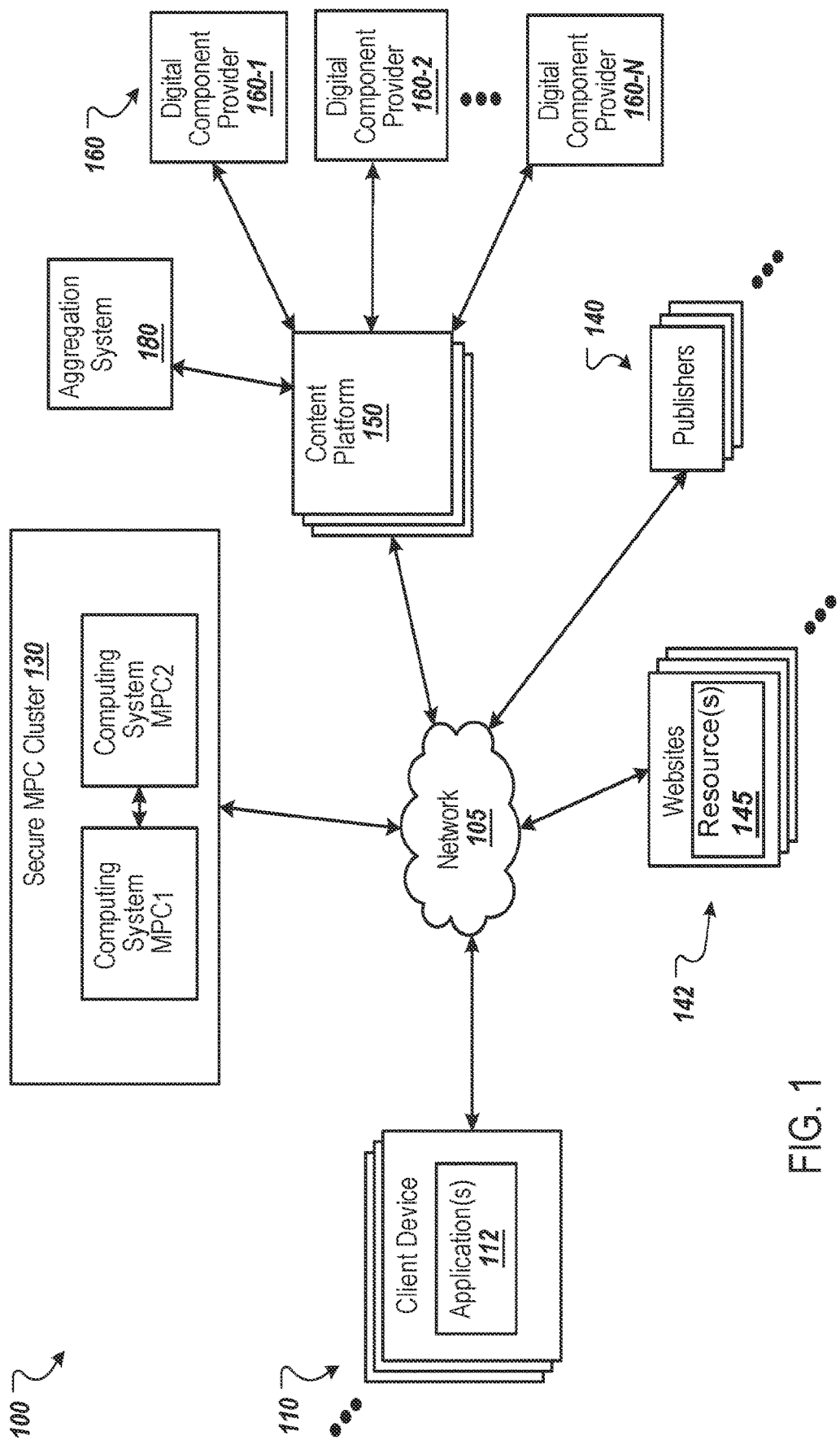
FIG. 1 is a block diagram of an environment in which a secure MPC cluster trains machine learning models and the machine learning models are used to expand user groups.

In general, systems and techniques are described that allow for categorizing users into particular demographic groups without the use of third party cookies, and reporting the effectiveness of campaigns for distributing digital components to user groups that are based at least in part on demographic information.

Demographic-Based User Group Expansion

The machine learning platform described in this document enables content platforms to generate and expand user groups that are based at least in part on demographic information (e.g., age range, geographic location, spoken language, etc.). These user groups enable a digital component provider to reach a specific set of users for which the user group was created. For instance, a digital component provider who runs a fitness studio exclusively for women may benefit from distributing digital components to members of a user group for women, which could help avoid showing digital components that are more relevant to men. To enable such directed content distribution without needing or using cookies, user groups are formed, and subsequently expanded using privacy-preserving machine learning systems and techniques. Such systems and techniques are used for training and using machine learning models to expand user group membership while preserving user privacy and ensuring data security.

In general, rather than creating and maintaining user profiles at computing systems of other entities, such as content platforms, the user profiles are maintained at the client devices of the users. To train the machine learning models, the client devices of the users can send their encrypted user profiles (e.g., as secret shares of the user profiles) along with other data to multiple computing systems of a secure multi-party computation (MPC) cluster, optionally via a content platform. For example, each client device can generate two or more secret shares of the user profile and send a respective secret share to each computing system. The computing systems of the MPC cluster can use MPC techniques to train machine learning models for suggesting user groups for the users based on their profiles in ways that prevent either computing system of the MPC cluster (or other party which is not the user itself) from obtaining any user's profile in cleartext (which can also be referred to as plaintext), thereby preserving user privacy. The machine learning models can be k-nearest neighbor (k-NN) models. In some implementations, the machine learning models can be k-NN augmented (e.g. via gradient boosting) by other machine learning models, e.g., neural network models, or gradient boosted decision trees.

After the machine learning models are trained, the machine learning models can be used to suggest one or more user groups for each user based on their profiles. For example, the client device of a user can query the MPC cluster for suggested user groups for that user or to determine whether a user should be added to a particular user group. Various inference techniques can be used, such as binary classification, regression (e.g., using arithmetic mean or root mean square), and/or multiclass classification to identify the user groups. The user group membership of a user can be used in privacy preserving and secure ways to provide content to the user.

Example System for Generating and Using Machine Learning Models

FIG. 1 is a block diagram of an environment 100 in which a secure MPC 130 cluster trains machine learning models and the machine learning models are used to expand user groups. The example environment 100 includes a data communication network 105, such as a local area network (LAN), a wide area network (WAN), the Internet, a mobile network, or a combination thereof. The network 105 connects the client devices 110, the secure MPC cluster 130, publishers 140, websites 142, and content platforms 150. The example environment 100 may include many different client devices 110, secure MPC clusters 130, publishers 140, websites 142, content platforms 150, digital component providers 160, and an aggregation system 180.

A client device 110 is an electronic device that is capable of communicating over the network 105. Example client devices 110 include personal computers, mobile communication devices, e.g., smart phones, and other devices that can send and receive data over the network 105. A client device 110 can also include a digital assistant device that accepts audio input through a microphone and outputs audio output through speakers. The digital assistant can be placed into listen mode (e.g., ready to accept audio input) when the digital assistant detects a "hotword" or "hotphrase" that activates the microphone to accept audio input. The digital assistant device can also include a camera and/or display to capture images and visually present information. The digital assistant can be implemented in different forms of hardware devices including, a wearable device (e.g., watch or glasses), a smart phone, a speaker device, a tablet device, or another hardware device. A client device 110 can also include a digital media device, e.g., a streaming device that plugs into a television or other display to stream videos to the television.

A client device 110 typically includes applications 112, such as web browsers and/or native applications, to facilitate the sending and receiving of data over the network 105. A native application is an application developed for a particular platform or a particular device (e.g., mobile devices having a particular operating system). Publishers 140 can develop and provide, e.g., make available for download, native applications to the client devices 110. A web browser can request a resource 145 from a web server that hosts a website 142 of a publisher 140, e.g., in response to the user of the client device 110 entering the resource address for the resource 145 in an address bar of the web browser or selecting a link that references the resource address. Similarly, a native application can request application content from a remote server of a publisher.

Some resources, application pages, or other application content can include digital component slots for presenting digital components with the resources 145 or application pages. As used throughout this document, the phrase "digital component" refers to a discrete unit of digital content or digital information (e.g., a video clip, audio clip, multimedia clip, image, text, or another unit of content). A digital component can electronically be stored in a physical memory device as a single file or in a collection of files, and digital components can take the form of video files, audio files, multimedia files, image files, or text files and include advertising information, such that an advertisement is a type of digital component. For example, the digital component may be content that is intended to supplement content of a web page or other resource presented by the application 112. More specifically, the digital component may include digital content that is relevant to the resource content (e.g., the digital component may relate to the same topic as the web page content, or to a related topic). The provision of digital components can thus supplement, and generally enhance, the web page or application content.

When the application 112 loads a resource (or application content) that includes one or more digital component slots, the application 112 can request a digital component for each slot. In some implementations, the digital component slot can include code (e.g., scripts) that cause the application 112 to request a digital component from a digital component distribution system that selects a digital component and provides the digital component to the application 112 for presentation to a user of the client device 110.

The content platforms 150 can include supply-side platforms (SSPs) and demand-side platforms (DSPs). In general, the content platforms 150 manage the selection and distribution of digital components on behalf of publishers 140 and digital component providers 160.

Some publishers 140 use an SSP to manage the process of obtaining digital components for digital component slots of its resources and/or applications. An SSP is a technology platform implemented in hardware and/or software that automates the process of obtaining digital components for the resources and/or applications. Each publisher 140 can have a corresponding SSP or multiple SSPs. Some publishers 140 may use the same SSP.

Digital component providers 160 can create (or otherwise publish) digital components that are presented in digital component slots of publisher's resources and applications. The digital component providers 160 can use a DSP to manage the provisioning of its digital components for presentation in digital component slots. A DSP is a technology platform implemented in hardware and/or software that automates the process of distributing digital components for presentation with the resources and/or applications. A DSP can interact with multiple supply-side platforms SSPs on behalf of digital component providers 160 to provide digital components for presentation with the resources and/or applications of multiple different publishers 140. In general, a DSP can receive requests for digital components (e.g., from an SSP), generate (or select) a selection parameter for one or more digital components created by one or more digital component providers based on the request, and provide data related to the digital component (e.g., the digital component itself) and the selection parameter to an SSP. The SSP can then select a digital component for presentation at a client device 110 and provide, to the client device 110, data that causes the client device 110 to present the digital component.

In some cases, it is beneficial to a user to receive digital components related to web pages, application pages, or other electronic resources previously visited and/or interacted with by the user. In order to distribute such digital components to users, the users can be assigned to user groups, e.g., user interest groups, cohorts of similar users, or other group types involving similar user data, when the users visit particular resources or perform particular actions at the resource (e.g., interact with a particular item presented on a web page or add the item to a virtual cart). The user groups can be generated by the digital component providers 160. That is, each digital component provider 160 can assign users to their user groups when the users visit electronic resources of the digital component providers 160. In some implementations, publishers 140, content platforms 150 or the MPC cluster 130 can also assign users to selected user groups.

To protect user privacy, a user's group membership can be maintained at the user's client device 110, e.g., by one of the applications 112, or the operating system of the client device 110, rather than by a digital component provider, content platform, or other party. In a particular example, a trusted program (e.g., a web browser or the operating system can maintain a list of user group identifiers ("user group list") for a user using the web browser or another application. The user group list can include a group identifier for each user group to which the user has been added. The digital component providers 160 or content platforms (e.g., DSPs) that create the user groups can specify the user group identifiers for their user groups. The user group identifier for a user group can be descriptive of the group (e.g., females group) or a code that represents the group (e.g., an alphanumeric sequence that is not descriptive). In general, the user group can be a demographics-based group. A demographics-based user group can be associated with one or more demographic features and include, as members users that have the one or more demographic feature (e.g., based on self-reporting) or that are predicted and/or classified as having the demographic feature using privacy preserving machine learning models. Such a user group can also have other non-demographic features, e.g., related to an activity or product. The user group list for a user can be stored in secure storage at the client device 110 and/or can be encrypted when stored to prevent others from accessing the list.

When the application 112 presents a resource or application content related to a digital component provider 160, or a web page on a website 142, the resource can request that the application 112 add one or more user group identifiers to the user group list. In response, the application 112 can add the one or more user group identifiers to the user group list and store the user group list securely.

The content platforms 150 can use the user group membership of a user to select digital components or other content that may be of interest to the user or may be beneficial to the user/user device in another way. For example, such digital components or other content may comprise data that improves a user experience, improves the running of a user device or benefits the user or user device in some other way. However, the user group identifiers of the user group list of a user can be provided in ways that prevent the content platforms 150 from correlating user group identifiers with particular users, thereby preserving user privacy when using user group membership data to select digital components. In some implementations, the security and privacy protections can be even stronger. For example, the computing systems $MPC_1$ and $MPC_2$ may not collude, and only the application 112 may be permitted to see the user group identifiers in cleartext.

The application 112 can provide user group identifiers from the user group list to a trusted computing system that interacts with the content platforms 150 to select digital components for presentation at the client device 110 based on the user group membership in ways that prevent the content platforms 150 or any other entities which are not the user itself from knowing any of the user's user group membership.

In some cases, it is beneficial to users and to digital component providers to expand user groups to include users that have similar interests or other similar data (e.g. similar demographics) as the users that are already members of the user group. Usefully, this may be achieved without the use of third-party cookies. For example, a first user may be interested in snow skiing and may be a member of a user group for a particular ski resort. A second user may also be interested in skiing, but unaware of this ski resort and not a member of the user group for the particular ski resort. If the two users have similar interests or data, e.g., similar user profiles, the second user may be added to the user group for the particular ski resort so that the second user receives content, e.g., digital components, related to the ski resort and that may be of interest or otherwise beneficial to the second user or a user device thereof. In other words, user groups may be expanded to include other users having similar user data. In a particular example, demographic-based user groups can be expanded to include other users having the same or similar demographics associated with the demographic-based user group.

The secure MPC cluster 130 can train machine learning models that suggest, or can be used to generate suggestions of, user groups to users (or their applications 112) based on the user's profiles. The secure MPC cluster 130 includes two computing systems $MPC_1$ and $MPC_2$ that perform secure MPC techniques to train the machine learning models. Although the example MPC cluster 130 includes two computing systems, more computing systems can also be used as long as the MPC cluster 130 includes more than one computing system. For example, the MPC cluster 130 can include three computing systems, four computing systems, or another appropriate number of computing systems. Using more computing systems in the MPC cluster 130 can provide more security and fault tolerance, but can also increase the complexity of the MPC processes.

The computing systems $MPC_1$ and $MPC_2$ can be operated by different entities. In this way, each entity may not have access to the user profiles in cleartext. Cleartext is text that is not computationally tagged, specially formatted, or written in code, or data, including binary files, in a form that can be viewed or used without requiring a key or other decryption device, or other decryption process. For example, one of the computing systems $MPC_1$ or $MPC_2$ can be operated by a trusted party different from the users, the publishers 140, the content platform 150, and the digital component providers 160. For example, an industry group, governmental group, or browser developer may maintain and operate one of the computing systems $MPC_1$ and $MPC_2$. The other computing system may be operated by a different one of these groups, such that a different trusted party operates each computing system $MPC_1$ and $MPC_2$. Preferably, the different parties operating the different computing systems $MPC_1$ and $MPC_2$ have no incentive to collude to endanger user privacy. In some implementations, the computing systems $MPC_1$ and $MPC_2$ are separated architecturally and are monitored to not communicate with each other outside of performing the secure MPC processes described in this document.

Figure 4:
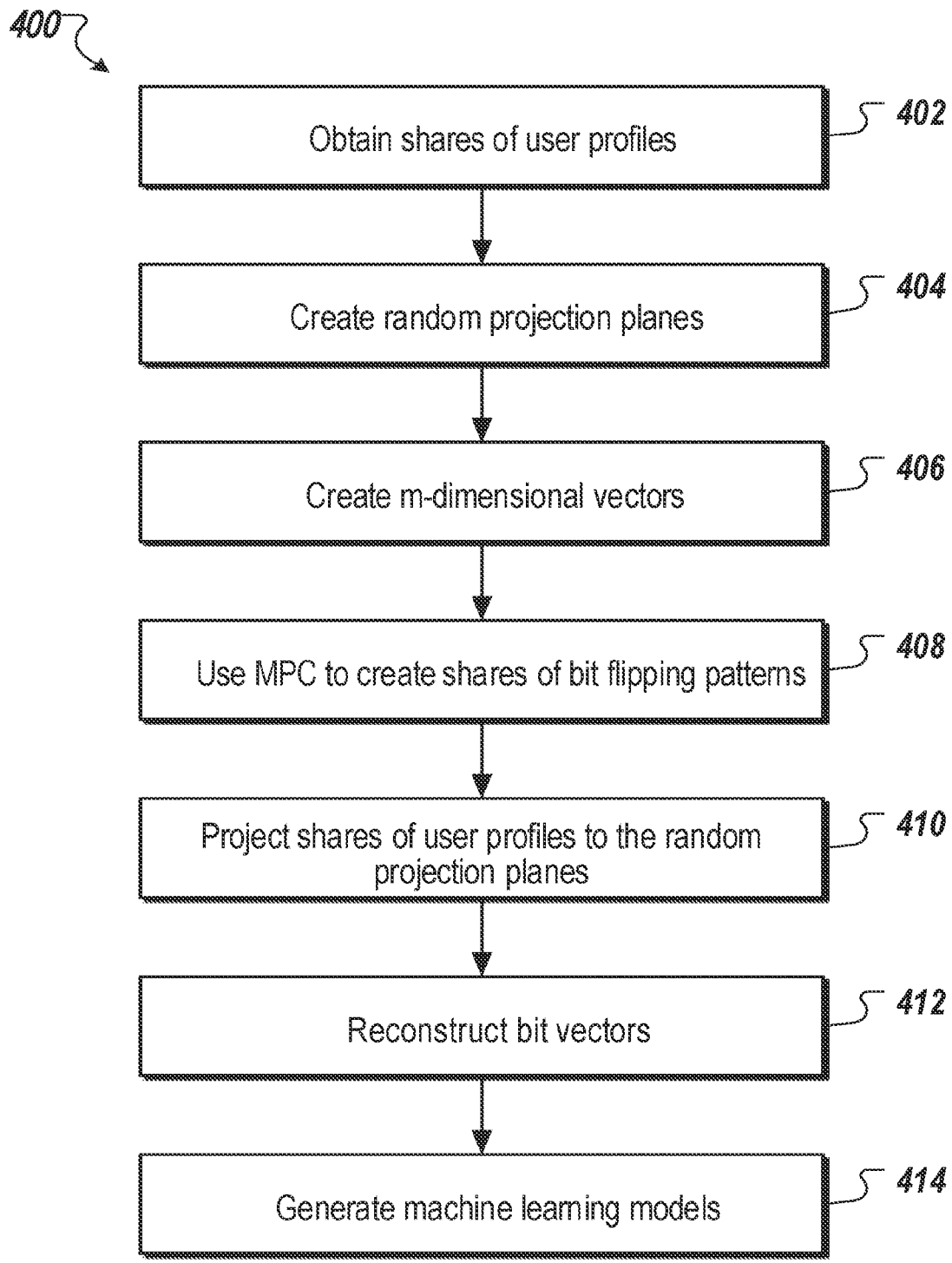
FIG. 4 is a flow diagram that illustrates an example process for generating a machine learning model.

In some implementations, the MPC cluster 130 trains one or more k-NN models for each content platform 150 and/or for each digital component provider 160. For example, each content platform 150 can manage the distribution of digital components for one or more digital component providers 160. A content platform 150 can request that the MPC cluster 130 train a k-NN model for one or more of the digital component providers 160 for which the content platform 150 manages the distribution of digital components. In general, a k-NN model represents distances between the user profiles (and optionally additional information) of a set of users. Each k-NN model of a content platform can have a unique model identifier. An example process for training a k-NN model is illustrated in FIG. 4 and described below.

After training a k-NN model for a content platform 150, the content platform 150 can query, or have the application 112 of a client device 110 query the k-NN model to identify one or more user groups for a user of the client device 110. For example, the content platform 150 can query the k-NN model to determine whether a threshold number of the "k" user profiles nearest to the user are members of a particular user group. If so, the content platform 150 may add the user to that user group. If a user group is identified for the user, the content platform 150 or the MPC cluster 130 can request that the application 112 add the user to the user group. If approved by the user and/or the application 112, the application 112 can add a user group identifier for the user group to the user group list stored at the client device 110.

In some implementations, an application 112 can provide a user interface that enables a user to manage the user groups to which the user is assigned. For example, the user interface can enable the user to remove user group identifiers, prevent all or particular resources 145, publishers 140, content platforms 150, digital component providers 160, and/or MPC clusters 130 from adding the user to a user group (e.g., prevent the entity from adding user group identifiers to the list of user group identifiers maintained by the application 112). This provides better transparency, choice/consent, and control for the user.

Further to the descriptions throughout this document, a user may be provided with controls (e.g., user interface elements with which a user can interact) allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

In some implementations, the example environment 100 can also facilitate reporting of data such as browsing events such as impressions, clicks and/or conversions by various users in respective demographic categories. In such cases, the content platform 150 (e.g., DSP or SSP, and in certain implementations a separate reporting platform) can implement or communicate with a reporting API, which can communicate with the aggregation system 180 that combines the browsing events (e.g., impressions, clicks, and/or conversions, and/or lack/absence thereof) and demographic categories to generate aggregated data. The aggregation system 180 can transmit the aggregated data, in the form of a report or in the form of data that can be easily combined and inserted in a report, to the content platform 150 (or the separate reporting platform).

Example Process for Generating and Using Machine Learning Models

Figure 2:
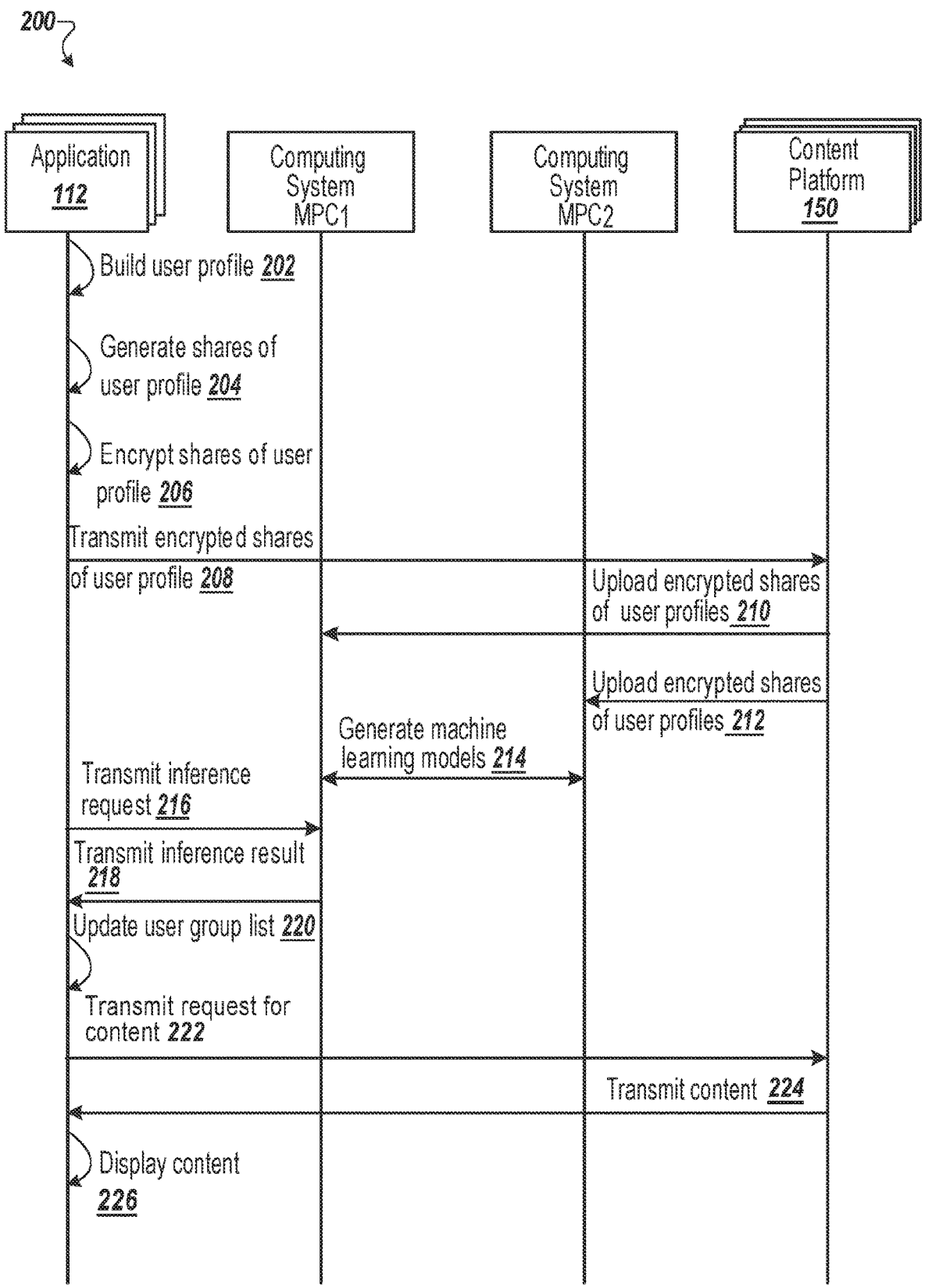
FIG. 2 is a swim lane diagram of an example process for training a machine learning model and using the machine learning model to add users to user groups.

FIG. 2 is a swim lane diagram of an example process 200 for training a machine learning model and using the machine learning model to add users to user groups. Operations of the process 200 can be implemented, for example, by the client device 110, the computing systems $MPC_1$ and $MPC_2$ of the MPC cluster 130, and a content platform 150. Operations of the process 200 can also be implemented as instructions stored on one or more computer readable media which may be non-transitory, and execution of the instructions by one or more data processing apparatus can cause the one or more data processing apparatus to perform the operations of the process 200. Although the process 200 and other processes below are described in terms of a two computing system MPC cluster 130, MPC clusters having more than two computing systems can also be used to perform similar processes.

A content platform 150 can initiate the training and/or updating of one of its machine learning models by requesting that applications 112 running on client devices 110 generate a user profile for their respective users and upload secret-shared and/or encrypted versions of the user profiles to the MPC cluster 130. For the purposes of this document, secret shares of user profiles can be considered encrypted versions of the user profiles as the secret shares are not in cleartext. In general, each application 112 can store data for a user profile and generate the updated user profile in response to receiving a request from the content platform 150. As the content of a user profile and the machine learning models differ for different content platforms 150, the application 112 running on a user's client device 110 can maintain data for multiple user profiles and generate multiple user profiles that are each specific to particular content platforms, or particular model owned by a particular content platform.

An application 112 running on a client device 110 builds a user profile for a user of the client device 110 (202). The user profile for a user can include data related to events initiated by the user and/or events that could have been initiated by the user with respect to electronic resources, e.g., web pages or application content. The events can include views of electronic resources, views of digital components, user interactions, or the lack of user interactions, with (e.g., selections of) electronic resources or digital components, conversions that occur after user interaction with electronic resources, and/or other appropriate events related to the user and electronic resources.

A user profile for a user can be specific to a content platform 150, or selected machine learning models owned by the content platform 150. For example, as described in more detail below with reference to FIG. 3, each content platform 150 can request that the application 112 generate or update a user profile specific to that content platform 150.

Figure 3:
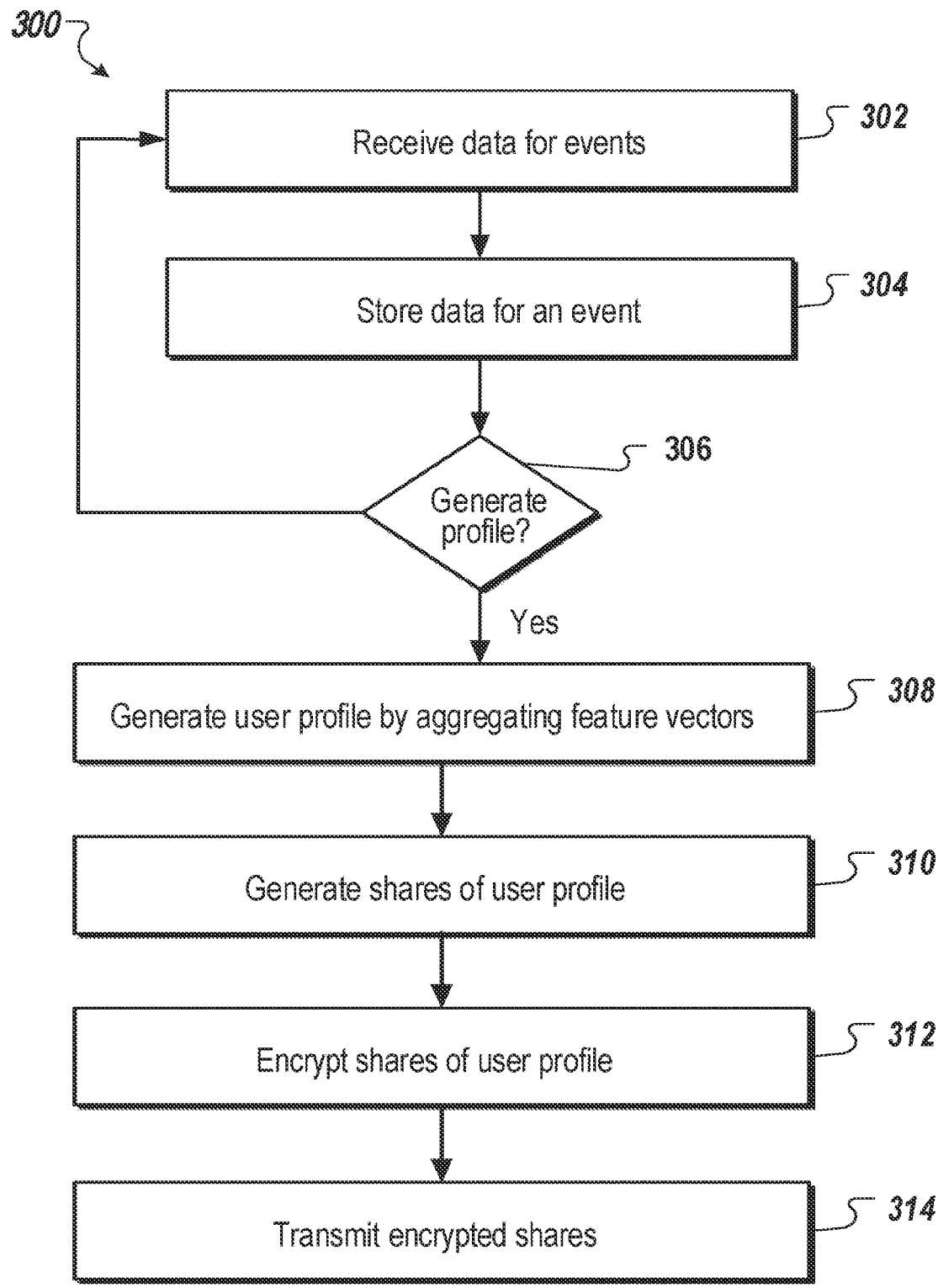
FIG. 3 is a flow diagram that illustrates an example process for generating a user profile and sending shares of the user profile to an MPC cluster.

The user profile for a user can be in the form of a feature vector. For example, the user profile can be an n-dimensional feature vector. Each of the n dimensions can correspond to a particular feature and the value of each dimension can be the value of the feature for the user. For example, one dimension may be for whether a particular digital component was presented to (or interacted with by) the user. In this example, the value for that feature could be "1" if the digital component was presented to (or interacted with by) the user or "0" if the digital component has not been presented to (or interacted with by) the user. An example process for generating a user profile for a user is illustrated in FIG. 3 and described below.

In some implementations, a content platform 150 may want to train machine learning models based on additional signals, such as contextual signals, signals related to particular digital components, or signals related to the user of which the application 112 may not be aware or to which the application 112 may not have access, such as the current weather at the user's location. For example, the content platform 150 may want to train a machine learning model to predict whether a user will interact with a particular digital component if the digital component is presented to the user in a particular context. In this example, the contextual signals can include, for each presentation of a digital component to a user, the geographic location of the client device 110 at the time (if permission is granted by the user), signals describing the content of the electronic resource with which the digital component is presented, and signals describing the digital component, e.g., the content of the digital component, the type of digital components, where on the electronic resource the digital component is presented, etc. In another example, one dimension may be for whether the digital component presented to the user is of a particular type. In this example, the value could be 1 for travel, 2 for cuisine, 3 for movie, etc. For ease of subsequent description, $P_i$ will represent both user profile and additional signals (e.g., contextual signals and/or digital component-level signals) associated with the i-th user profile.

The application 112 generates shares of the user profile $P_i$ for the user (204). In this example, the application 112 generates two shares of the user profile $P_i$, one for each computing system of the MPC cluster 130. Note that each share by itself can be a random variable that by itself does not reveal anything about the user profile. Both shares would need to be combined to get the user profile. If the MPC cluster 130 includes more computing systems that participate in the training of a machine learning model, the application 112 would generate more shares, one for each computing system. In some implementations, to protect user privacy, the application 112 can use a pseudorandom function to split the user profile $P_i$ into shares. That is, the application 112 can use pseudorandom function $PRF(P_i)$ to generate two shares $\{[P_{i,1}],[P_{i,2}]\}$. The exact splitting can depend on the secret sharing algorithm and crypto library used by the application 112.

In some implementations, the application 112 can also provide one or more labels to the MPC cluster 130. Although the labels may not be used in training the machine learning models of certain architecture (e.g. k-NN), the labels can be used to fine-tune hyperparameters controlling the model training process (e.g., the value of k), or evaluate the quality of the machine learning models trained, or make predictions, i.e. determine whether to suggest a user group for a user. The labels can include, for example, one or more of the user group identifiers for the user and for which the content platform 150 has access. That is, the labels can include the user group identifiers for the user groups managed by the content platform 150 or for which the content platform 150 has read access. In some implementations, a single label includes multiple user group identifiers for the user. In some implementations, the label for a user can be heterogeneous and include all user groups that include the user as a member and additional information, e.g., whether the user interacted with a given digital component. This enables the k-NN model to be used to predict whether another user will interact with the given digital component. A label for each user profile can indicate user group membership for a user corresponding to the user profile.

The label for the user profiles are predictive of user groups to which a user corresponding to an input will be, or should be added. For example, the labels corresponding to the k nearest neighbor user profiles to the input user profile are predictive of user groups that the user corresponding to the input user profile will or should join, e.g., based on the similarity between the user profiles. These predictive labels can be used to suggest user groups to the user or to request that the application added the user to the user groups corresponding to the labels.

If labels are included, the application 112 can also split each label, into shares, e.g., $[label_{i,1}]$ and $[label_{i,2}]$. In this way, without collusion between the computing systems $MPC_1$ and $MPC_2$, neither computing system $MPC_1$ nor $MPC_2$ can reconstruct $P_i$ from $[P_{i,1}]$ or $[P_{i,2}]$ or reconstruct $label_i$ from $[label_{i,1}]$ or $[label_{i,2}]$.

The application 112 encrypts the shares $[P_{i,1}]$ or $[P_{i,2}]$ of the user profile $P_i$ and/or the shares $[label_{i,1}]$ or $[label_{i,2}]$ of each label $label_i$ (206). In some implementations, the application 112 generates a composite message of the first share [$P_{i,1}$] of the user profile $P_i$ and the first share [$label_{i,1}$] of the label $label_i$ and encrypts the composite message using an encryption key of the computing system $MPC_1$. Similarly, application 112 generates a composite message of the second share [$P_{i,2}$] of the user profile $P_i$ and the second share [$label_{i,2}$] of the label $label_i$ and encrypts the composite message using an encryption key of the computing system $MPC_2$. These functions can be represented as PubKeyEncrypt([$P_{i,1}$]||[$label_{i,1}$], $MPC_1$) and PubKeyEncrypt([$P_{i,2}$]||[$label_{i,2}$], $MPC_2$), where PubKeyEncrypt represents a public key encryption algorithm using the corresponding public key of $MPC_1$ or $MPC_2$. The symbol "||" represents a reversible method to compose complex messages from multiple simple messages, e.g., JavaScript Object Notation (JSON), Concise Binary Object Representation (CBOR), or protocol buffer.

The application 112 provides the encrypted shares to the content platform 150 (208). For example, the application 112 can transmit the encrypted shares of the user profile and the label to the content platform 150. As each share is encrypted using an encryption key of the computing system $MPC_1$ or $MPC_2$, the content platform 150 cannot access the user's user profile or the label.

The content platform 150 can receive shares of user profiles and shares of labels from multiple client devices. The content platform 150 can initiate the training of a machine learning model by uploading the shares of the user profiles to the computing systems $MPC_1$ and $MPC_2$. Although the labels may not be used in the training process, the content platform 150 can upload the shares of the labels to the computing systems $MPC_1$ and $MPC_2$ for use when optimizing the training process (e.g., hyperparameter tuning), evaluating the model quality or querying the model later.

The content platform 150 uploads the first encrypted shares (e.g., PubKeyEncrypt([$P_{i,1}$]||[$label_{i,1}$], $MPC_1$)) received from each client device 110 to the computing system $MPC_1$ (210). Similarly, the content platform 150 uploads the second encrypted shares (e.g., PubKeyEncrypt ([$P_{i,2}$]||[$label_{i,2}$], $MPC_2$)) to the computing system $MPC_2$ (212). Both uploads can be in batches and can include the encrypted shares of user profiles and labels received during a particular time period for training the machine learning model.

In some implementations, the order in which the content platform 150 uploads the first encrypted shares to the computing system $MPC_1$ must match the order in which the content platform 150 uploads the second encrypted shares to the computing system $MPC_2$. This enables the computing systems $MPC_1$ and $MPC_2$ to properly match two shares of the same secret, e.g., two shares of the same user profile.

In some implementations, the content platform 150 may explicitly assign the same pseudorandomly or sequentially generated identifier to shares of the same secret to facilitate the matching. While some MPC techniques can rely on random shuffling of input or intermediate results, the MPC techniques described in this document may not include such random shuffling and may instead rely on the upload order to match.

In some implementations, the operations 208, 210 and 212 can be replaced by alternative process where the application 112 directly upload [$P_{i,1}$]||[$label_{i,1}$] to $MPC_1$, and [$P_{i,2}$]||[$label_{i,2}$] to $MPC_2$. This alternative process can reduce the infrastructure cost of the content platform 150 to support the operations 208, 210 and 212, and reduce the latency to start training or updating the machine learning models in $MPC_1$ and $MPC_2$.

The computing systems $MPC_1$ and $MPC_2$ generate a machine learning model (214). Each time a new machine learning model is generated based on user profile data can be referred to as a training session. The computing systems $MPC_1$ and $MPC_2$ can train a machine learning model based on the encrypted shares of the user profiles received from the client devices 110. For example, the computing systems $MPC_1$ and $MPC_2$ can use MPC techniques to train a k-NN model based on the shares of the user profiles.

To minimize or at least reduce the crypto computation, and thus the computational burden placed on the computing systems $MPC_1$ and $MPC_2$ to protect user privacy and data during both model training and inference, the MPC cluster 130 can use random projection techniques, e.g., SimHash, to quantify the similarity between two user profiles $P_i$ and $P_j$ quickly, securely, and probabilistically. The similarity between the two user profiles $P_i$ and $P_j$ can be determined by determining the Hamming distance between two bit vectors that represent the result of SimHash of two user profiles $P_i$ and $P_j$. Such Hamming distance is inversely proportional to the cosine distance between the two user profiles with high probability.

Conceptually, for each training session, m random projection hyperplanes $U=\{U_1, U_2, \ldots, U_m\}$ can be generated. The random projection hyperplanes can also be referred to as random projection planes. One objective of the multi-step computation between the computing systems $MPC_1$ and $MPC_2$ is to create a bit vector $B_i$ of length m for each user profile $P_i$ used in the training of the k-NN model. In this bit vector $B_i$, each bit $B_{i,j}$ represents the sign of a dot product of one of the projection planes $U_j$ and the user profile $P_i$, i.e., $B_{i,j}=\text{sign}(U_j \odot P_i)$ for all $j \in [1, m]$ where $\odot$ denotes the dot product of two vectors of equal length. That is, each bit represents which side of the plane $U_j$ the user profile $P_i$ is located. A bit value of one represents a positive sign and a bit value of zero represents a negative sign. In some implementations, to protect user privacy, the above SimHash algorithm can be carried out over encrypted (e.g. in secret share forms) user profile, and/or projection hyperplanes, such that neither $MPC_1$ nor $MPC_2$ can access user profile and/or projection matrix in cleartext.

In some implementations, prior to applying random projection during training, $MPC_1$ and $MPC_2$ collaboratively calculate the average (which is also referred to as mean) of all user profiles in the training dataset, i.e. mean_P. For privacy protection, the calculation of mean_P can be in secret shares. $MPC_1$ and $MPC_2$ then subtract mean_P from each user profile $P_i$, then randomly project the result, i.e. $P_i$−mean_P. The subtraction step can be referred to "zero-mean." For privacy protection, the zero-mean step can be performed in secret shares as well. If zero-mean is applied in the training process, $MPC_1$ and $MPC_2$ will also apply zero-mean at prediction time, i.e. for the user profile P in the request to predict, $MPC_1$ and $MPC_2$ will calculate P−mean_P, i.e. the same mean_P calculated during training, then apply random projection (with the same random projection matrix in secret shares chosen during training) to P−mean_P.

At each end of the multi-step computation, each of the two computing systems $MPC_1$ and $MPC_2$ generates an intermediate result that includes a bit vector for each user profile in cleartext, a share of each user profile, and a share of the label for each user profile. For example, the intermediate result for computing system $MPC_1$ can be the data shown in Table 1 below. The computing system MPC₂ would have a similar intermediate result but with a different share of each user profile and each label. To add extra privacy protection, each of the two servers in the MPC cluster 130 can only get half of the m-dimensional bit vectors in cleartext, e.g., computing system MPC₁ gets the first m/2 dimension of all the m-dimension bit vectors, computing system MPC₂ gets the second m/2 dimension of all the m-dimension bit vectors. Cleartext is text that is not computationally tagged, specially formatted, or written in code, or data, including binary files, in a form that can be viewed or used without requiring a key or other decryption device, or other decryption process.

TABLE 1

| Bit Vector in Cleartext | MPC₁ Share for $P_i$ | MPC₁ Share for label$_i$ |
| --- | --- | --- |
| ... | ... | ... |
| $B_i$ | ... | ... |
| $B_{i+1}$ | ... | ... |
| ... | ... | ... |

Given two arbitrary user profile vectors $P_i$ and $P_j$ of unit length i≠j, it has been shown that the Hamming distance between the bit vectors $B_i$ and $B_j$ for the two user profile vectors $P_i$ and $P_j$ is proportional to the cosine distance between the user profile vectors $P_i$ and $P_j$ with high probability, assuming that the number of random projections m is sufficiently large.

Based on the intermediate result shown above and because the bit vectors $B_i$ are in cleartext, each computing system MPC₁ and MPC₂ can independently create, e.g., by training, a respective k-NN model using a k-NN algorithm. The computing systems MPC₁ and MPC₂ can use the same or different k-NN algorithms. An example process for training a k-NN model is illustrated in FIG. 4 and described below. Once the k-NN models are trained, the application 112 can query the k-NN models to determine whether to add a user to a user group.

The application 112 submits an inference request to the MPC cluster 130 (216). In this example, the application 112 transmits the inference request to computing system MPC₁. In other examples, the application 112 can transmit the inference request to computing system MPC₂. The application 112 can submit the inference request in response to a request from the content platform 150 to submit the inference request. For example, the content platform 150 can request the application 112 to query the k-NN model to determine whether the user of the client device 110 should be added to a particular user group, e.g., to a demographic-based user group. This request can be referred to an inference request to infer whether the user should be added to the user group.

To initiate an inference request, the content platform 150 can send, to the application 112, an inference request token $M_{infer}$. The inference request token $M_{infer}$ enables servers in the MPC cluster 130 to validate that the application 112 is authorized to query a particular machine learning model owned by a particular domain. The inference request token $M_{infer}$ is optional if the model access control is optional. The inference request token $M_{infer}$ can have the following items shown and described in Table 2 below.

TABLE 2

| Item No. | Content | Description |
| --- | --- | --- |
| 1 | Content Platform Domain (e.g., eTLD + 1 domain) | Content platform's domain that uniquely identifies the content platform |
| 2 | Model Identifier | Unique identifier for the content platform's machine learning model |
| 3 | k | How many nearest neighbors to fetch |
| 4 | Aggregation Function | The aggregation function applied to the labels of the k nearest neighbors |
| 5 | Aggregation Function Parameters | Additional parameters used by the aggregation function |
| 6 | Token Creation Timestamp | Timestamp indicating when this token is created |
| 7 | Operation | Infer request operation |
| 8 | Digital Signature | The content platform's digital signature over items 1-7 |

In this example, the inference request token $M_{infer}$ includes seven items and a digital signature generated based on the seven items using a private key of the content platform 150. The eTLD+1 is the effective top-level domain (eTLD) plus one level more than the public suffix. An example eTLD+1 is "example.com" where ".com" is the top-level domain.

To request an inference for a particular user, the content platform 150 can generate an inference request token $M_{infer}$ and send the token to the application 112 running on the user's client device 110. In some implementations, the content platform 150 encrypts the inference request token $M_{infer}$ using a public key of the application 112 so that only the application 112 can decrypt the inference request token $M_{infer}$ using its confidential private key that corresponds to the public key. That is, the content platform can send, to the application 112, PubKeyEnc($M_{infer}$, application_public_key).

The application 112 can decrypt and verify the inference request token $M_{infer}$. The application 112 can decrypt the encrypted inference request token $M_{infer}$ using its private key. The application 112 can verify the inference request token $M_{infer}$ by (i) verifying the digital signature using a public key of the content platform 150 that corresponds to the private key of the content platform 150 that was used to generate the digital signature and (ii) ensuring that the token creation timestamp is not stale, e.g., the time indicated by the timestamp is within a threshold amount of time of a current time at which verification is taking place. If the inference request token $M_{infer}$ is valid, the application 112 can query the MPC cluster 130.

Conceptually, the inference request can include the model identifier for the machine learning model, the current user profile $P_i$, k (the number of nearest neighbors to fetch), optionally additional signals (e.g., contextual signals or digital component signals), the aggregation function, and the aggregation function parameters. However, to prevent leaking the user profile $P_i$ in cleartext form to either computing system MPC₁ or MPC₂, and thereby preserve user privacy, the application 112 can split the user profile $P_i$ into two shares $[P_{i,1}]$ and $[P_{i,2}]$ for MPC₁ and MPC₂, respectively. The application 112 can then select one of the two computing systems MPC₁ or MPC₂, e.g., randomly or pseudo-randomly, for the query. If the application 112 selects computing system MPC₁, the application 112 can send a single request to computing system MPC₁ with the first share $[P_{i,1}]$ and an encrypted version of the second share, e.g., PubKeyEncrypt($[P_{i,2}]$, $MPC_2$). In this example, the application 112 encrypts the second share $[P_{i,2}]$ using a public key of the computing system $MPC_2$ to prevent computing system $MPC_1$ from accessing $[P_{i,2}]$, which would enable computing system $MPC_1$ to reconstruct the user profile $P_i$ from $[P_{i,1}]$ and $[P_{i,2}]$.

As described in more detail below, the computing systems $MPC_1$ and $MPC_2$ collaboratively compute the k nearest neighbors to the user profile $P_i$. The computing systems $MPC_1$ and $MPC_2$ can then use one of several possible machine learning techniques (e.g., binary classification, multiclass classification, regression, etc.) to determine, based on the k nearest neighbor user profiles, whether to add the user to a user group. For example, the aggregation function can identify the machine learning technique (e.g., binary, multiclass, regression) and the aggregation function parameters can be based on the aggregation function.

In some implementations, the aggregation function parameters can include a user group identifier for a user group for which the content platform 150 is querying the k-NN model for the user. For example, the content platform 150 may want to know whether to add a user to a user group related to hiking and that has a user group identifier "hiking." In this example, the aggregation function parameter can include the "hiking" user group identifier. In general, the computing systems $MPC_1$ and $MPC_2$ can determine whether to add the user to the user group based on the number of the k nearest neighbors that are a member of the user group, e.g., based on their labels.

Figure 5:
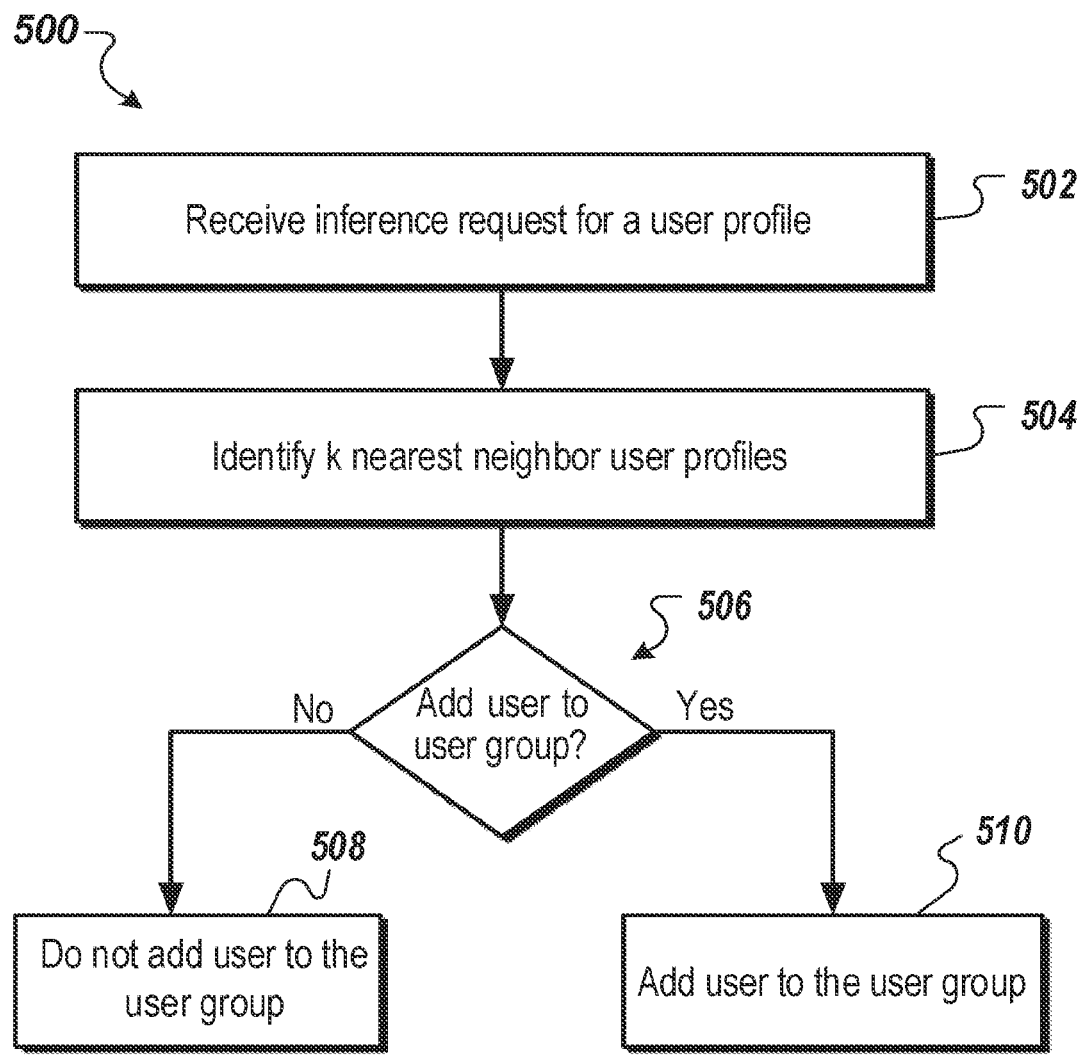
FIG. 5 is a flow diagram that illustrates an example process for adding a user to user groups using machine learning models.

The MPC cluster 130 provides an inference result to the application 112 (218). In this example, the computing system $MPC_1$ that received the query sends the inference result to the application 112. The inference result can indicate whether the application 112 should add the user to zero or more user groups. For example, the user group result can specify a user group identifier for the user group. However, in this example, the computing system $MPC_1$ would know the user group. To prevent this, the computing system $MPC_1$ may compute a share of the inference result and the computing system $MPC_2$ may compute another share of the same inference result. The computing system $MPC_2$ can provide an encrypted version of its share to the computing system $MPC_1$, where the share is encrypted using a public key of the application 112. The computing system $MPC_1$ can provide, to the application 112, its share of the inference result and the encrypted version of computing system $MPC_2$'s share of the user group result. The application 112 can decrypt computing system $MPC_2$'s share and calculate the inference result from the two shares. An example process for querying a k-NN model to determine whether to add a user to a user group is illustrated in FIG. 5 and described below. In some implementations, to prevent computing system $MPC_1$ from falsifying computing system $MPC_2$'s result, computing system $MPC_2$ digitally signs its result either before or after encrypting its result using the public key of the application 112. The application 112 verifies computing system $MPC_2$'s digital signature using the public key of $MPC_2$.

The application 112 updates the user group list for the user (220). For example, if the inference result is to add the user to a particular user group, the application 112 can add the user to the user group. In some implementations, the application 112 can prompt the user for permission to add the user to the user group.

The application 112 transmits a request for content (222). For example, the application 112 can transmit, to the content platform 150, a request for a digital component in response to loading an electronic resource that has a digital component slot. In some implementations, the request can include one or more user group identifiers for user groups that include the user as a member. For example, the application 112 can obtain one or more user group identifiers from the user group list and provide the user group identifier(s) with the request. In some implementations, techniques can be used to prevent the content platform from being able to associate the user group identifier with the user, the application 112, and/or the client device 112 from which the request is received.

The content platform 150 transmits content to the application 112 (224). For example, the content platform 150 can select a digital component based on the user group identifier(s) and provide the digital component to the application 112. In some implementations, the content platform 150, in collaboration with the application 112, selects a digital component based on the user group identifier(s), without leaking the user group identifier(s) out of the application 112.

The application 112 displays or otherwise implements the received content (226). For example, the application 112 can display a received digital component in a digital component slot of an electronic resource.

Example Process for Generating User Profiles

FIG. 3 is a flow diagram that illustrates an example process 300 for generating a user profile and sending shares of the user profile to an MPC cluster. Operations of the process 300 can be implemented, for example, by the client device 110 of FIG. 1, e.g., by the application 112 running on the client device 110. Operations of the process 300 can also be implemented as instructions stored on one or more computer readable media which may be non-transitory, and execution of the instructions by one or more data processing apparatus can cause the one or more data processing apparatus to perform the operations of the process 300.

An application 112 executing on a user's client device 110 receives data for an event (302). The event can be, for example, a presentation of an electronic resource at the client device 110, a presentation of a digital component at the client device 110, a user interaction with an electronic resource or digital component at the client device 110, or a conversion for a digital component, or the lack of user interaction with or conversion for an electronic resource or digital component presented. When an event occurs, a content platform 150, publisher 140 or digital component provider 160 can provide data related to the event to the application 112 for use in generating a user profile for the user.

The application 112 can generate a different user profile for each content platform 150. That is, the user profile of a user and for a particular content platform 150 may only include event data received from the particular content platform 150. This preserves user privacy by not sharing with content platforms data related to events of other content platforms. In some implementations, the application 112, per the request of the content platform 150, may generate a different user profile for each machine learning model owned by the content platform 150. Based on the design goal, different machine learning models may require different training data. For example, a first model may be used to determine whether to add a user to a user group. A second model may be used to predict whether a user will interact with a digital component. In this example, the user profiles for the second model can include additional data, e.g., whether the user interacted with the digital component, that the user profiles for the first model do not have.

The content platform 150 can send the event data in the form of a profile update token $M_{update}$. The profile update token $M_{update}$ has the following items shown and described in Table 3 below.

TABLE 3

| Item No. | Content | Description |
|---|---|---|
| 1 | Content Platform Domain (e.g., eTLD + 1 domain) | Content platform's domain that uniquely identifies the content platform |
| 2 | Model Identifier | Unique identifier for the content platform's machine learning model. This item can have multiple values if the same feature vector should be applicable for the training of multiple machine learning models for the same owner domain. |
| 3 | Profile Record | n-dimensional feature vector determined by the content platform based on the event |
| 4 | Token Creation Timestamp | Timestamp indicating when this token is created |
| 5 | Expiration Time | A date and time at which the feature vector will expire and not be used for the user profile calculation. |
| 6 | Profile Decay Rate | Optional rate that defines the rate at which the weight of this event's data decays in the user profile |
| 7 | Operation | Accumulate user profile |
| 8 | Digital Signature | The content platform's digital signature over items 1-7 |

The model identifier identifies the machine learning model, e.g., k-NN model, for which the user profile will be used to train or used to make a user group inference. The profile record is an n-dimensional feature vector that includes data specific to the event, e.g., the type of event, the electronic resource or digital component, time at which the event occurred, and/or other appropriate event data that the content platform 150 wants to use in training the machine learning model and making user group inferences. The digital signature is generated based on the seven items using a private key of the content platform 150.

In some implementations, to protect the update token $M_{update}$ during transmission, the content platform 150 encrypts the update token $M_{update}$ prior to sending the update token $M_{update}$ to the application 112. For example, the content platform 150 can encrypt the update token $M_{update}$ using a public key of the application, e.g., PubKeyEnc ($M_{update}$, application_public_key).

In some implementations, the content platform 150 can send the event data to the application 112 without encoding the event data or the update request in the form of a profile update token $M_{update}$. For example, a script originated from the content platform 150 running inside the application 112 may directly transmit the event data and the update request to the application 112 via a script API, where the application 112 relies on World Wide Web Consortium (W3C) origin-based security model and/or (Hypertext Transfer Protocol Secure) HTTPS to protect the event data and update request from falsification or leaking.

The application 112 stores the data for the event (304). If the event data is encrypted, the application 112 can decrypt the event data using its private key that corresponds to the public key used to encrypt the event data. If the event data is sent in the form of an update token $M_{update}$, the application 112 can verify the update token $M_{update}$ before storing the event data. The application 112 can verify the update token $M_{update}$ by (i) verifying the digital signature using a public key of the content platform 150 that corresponds to the private key of the content platform 150 that was used to generate the digital signature and (ii) ensuring that the token creation timestamp is not stale, e.g., the time indicated by the timestamp is within a threshold amount of time of a current time at which verification is taking place. If the update token $M_{update}$ is valid, the application 112 can store the event data, e.g., by storing the n-dimensional profile record. If any verification fails, the application 112 may ignore the update request, e.g., by not storing the event data.

For each machine learning model, e.g., for each unique model identifier, the application 112 can store event data for that model. For example, the application 112 can maintain, for each unique model identifier, a data structure that includes a set of n-dimensional feature vectors (e.g., the profile records of the update tokens) and, for each feature vector, the expiration time. An example data structure for a model identifier is shown in Table 4 below.

TABLE 4

| Feature Vector | Expiration |
|---|---|
| n-dimensional feature vector | Expiration time |
| . . . | . . . |

Upon receiving a valid update token $M_{update}$, the application 112 can update the data structure for the model identifier included in the update token $M_{update}$ by adding the feature vector and expiration time of the update token $M_{update}$ to the data structure. Periodically, the application 112 can purge expired feature vectors from the data structure to reduce storage size.

The application 112 determines whether to generate a user profile (306). For example, the application 112 may generate a user profile for a particular machine learning model in response to a request from the content platform 150. The request may be to generate the user profile and return shares of the user profile to the content platform 150. In some implementations, the application 112 may directly upload the generated user profiles to the MPC cluster 130, e.g., rather than sending them to the content platform 150. To ensure the security of the request to generate and return the shares of the user profile, the content platform 150 can send, to the application 112, an upload token $M_{upload}$.

The upload token $M_{upload}$ can have a similar structure as the update token $M_{update}$, but with a different operation (e.g., "update server" instead of "accumulate user profile"). The upload token $M_{upload}$ can also include an additional item for an operation delay. The operation delay can instruct the application 112 to delay calculating and uploading the shares of the user profile while the application 112 accumulates more event data, e.g., more feature vectors. This enables the machine learning model to capture user event data immediately before and after some critical events, e.g., joining a user group. The operation delay can specify the delay time period. In this example, the digital signature can be generated based on the other seven items in Table 3 and the operation delay using the private key of the content platform. The content platform 150 can encrypt the upload token $M_{upload}$ in a similar manner as the update token $M_{update}$, e.g., PubKeyEnc($M_{upload}$, application_public_key), using the application's public key to protect the upload token $M_{upload}$ during transmission.

The application 112 can receive the upload token $M_{upload}$, decrypt the upload token $M_{upload}$ if it is encrypted, and verify the upload token $M_{upload}$. This verification can be similar to the way in which the update token $M_{update}$ is verified. The application 112 can verify the upload token $M_{upload}$ by (i) verifying the digital signature using a public key of the content platform 150 that corresponds to the private key of the content platform 150 that was used to generate the digital signature and (ii) ensuring that the token creation timestamp is not stale, e.g., the time indicated by the timestamp is within a threshold amount of time of a current time at which verification is taking place. If the upload token $M_{upload}$ is valid, the application 112 can generate the user profile. If any verification fails, the application 112 may ignore the upload request, e.g., by not generating a user profile.

In some implementations, the content platform 150 can request the application 112 to upload a user profile without encoding the upload request in the form of a profile upload token $M_{upload}$. For example, a script originated from the content platform 150 running inside the application 112 may directly transmit the upload request to the application 112 via a script API, where the application 112 relies on W3C origin-based security model and/or HTTPS to protect the upload request from falsification or leaking.

If a determination is made to not generate a user profile, the process 300 can return to operation 302 and wait for additional event data from the content platform 150. If a determination is made to generate a user profile, the application 112 generates the user profile (308).

The application 112 can generate the user profile based on the stored event data, e.g., the data stored in the data structure shown in Table 4. The application 112 can access the appropriate data structure based on a model identifier included in the request, e.g., the Content Platform eTLD+1 domain of item 1 and the model identifier of item 2 of the upload token $M_{upload}$.

The application 112 can compute the user profile by aggregating the n-dimensional feature vectors in the data structure in the study period that have not yet expired. For example, the user profile may be the average of the n-dimensional feature vectors in the data structure in the study period that have not yet expired. The result is an n-dimensional feature vector representing the user in the profile space. Optionally, the application 112 may normalize the n-dimensional feature vector to unit length, e.g., using L2 normalization. The content platform 150 may specify the optional study period.

In some implementations, decay rates can be used to calculate the user profiles. As there may be many content platforms 150 that use the MPC cluster 130 to train machine learning models and each content platform 150 may have multiple machine learning models, storing user feature vector data may result in significant data storage requirements. Using decay techniques can substantially reduce that amount of data that is stored at each client device 110 for the purposes of generating user profiles for training the machine learning models.

Assume that, for a given machine learning model, there are k feature vectors $\{F_1, F_2, \ldots F_k\}$, each of which is a n-dimensional vector and their corresponding age (record age in seconds). The application 112 can compute the user profile using Relationship 1 below:

$$\sum_{i=1}^{k}\left(e^{-\frac{record\_age\_in\_seconds_i}{decay\_rate\_in\_seconds}} \times F_i\right) \quad \text{Relationship 1}$$

In this relationship, the parameter $record\_age\_in\_seconds_i$ is the amount of time in seconds that the profile record $F_i$ has been stored at the client device 110 and the parameter $decay\_rate\_in\_seconds$ is the decay rate of the profile record in seconds (e.g., received in item 6 of the update token $M_{update}$). In this way, more recent feature vectors carry more weight. This also enables the application 112 to avoid storing feature vectors and only store profile records with constant storage. The application 112 only has to store an n-dimensional vector P and a timestamp user_profile_time for each model identifier, rather than multiple individual feature vectors for each model identifier.

To initialize the n-dimensional vector user profile P and timestamp, the application can set the vector P to a vector of n dimensions where the value of each dimension is zero and set the user_profile_time to epoch. To update the user profile P with a new feature vector $F_x$ at any time, the application 112 can use Relationship 2 below:

$$P = e^{-\frac{current\_time\_user\_profile\_time}{decay\_rate\_in\_seconds}} \times P + F_x \quad \text{Relationship 2}$$

The application 112 can also update the user profile time to the current time (current_time) when updating the user profile with Relationship 2. Note that operations 304 and 308 are omitted if the application 112 calculates user profiles with the above decay rate algorithm.

The application 112 generates shares of the user profile (310). The application 112 can use a pseudorandom function to split the user profile $P_i$ (e.g., the n-dimensional vector P) into shares. That is, the application 112 can use pseudorandom function $PRF(P_i)$ to generate two shares $\{[P_{i,1}],[P_{i,2}]\}$ of the user profile $P_i$. The exact splitting can depend on the secret sharing algorithm and crypto library used by the application 112. In some implementations, the application uses Shamir's secret sharing scheme. In some implementations, the application uses an additive secret sharing scheme. If shares of one or more labels are being provided, the application 112 can also generate shares of the labels as well.

The application 112 encrypts the shares $\{[P_{i,1}],[P_{i,2}]\}$ of the user profile $P_i$ (312). For example, as described above, the application 112 can generate composite messages that include shares of the user profile and the label and encrypt the composite messages to obtain encryption results $PubKeyEncrypt([P_{i,1}]\|[label_{i,1}], MPC_1)$ and $PubKeyEncrypt([P_{i,2}]\|[label_{i,2}], MPC_2)$. Encrypting the shares using encryption keys of the MPC cluster 130 prevents the content platform 150 from being able to access the user profiles in cleartext. The application 112 transmits the encrypted shares to the content platform (314). Note that operation 314 is omitted if the application 112 transmits the secret shares directly to computing systems $MPC_1$ and $MPC_2$.

Example Process for Generating and Using Machine Learning Models

FIG. 4 is a flow diagram that illustrates an example process 400 for generating a machine learning model. Operations of the process 400 can be implemented, for example, by the MPC cluster 130 of FIG. 1. Operations of the process 400 can also be implemented as instructions stored on one or more computer readable media which may be non-transitory, and execution of the instructions by one or more data processing apparatus can cause the one or more data processing apparatus to perform the operations of the process 400.

The MPC cluster 130 obtains shares of user profiles (402). A content platform 150 can request that the MPC cluster 130 train a machine learning model by transmitting shares of user profiles to the MPC cluster 130. The content platform 150 can access the encrypted shares received from the client devices 110 for the machine learning model over a given time period and upload those shares to the MPC cluster 130.

For example, the content platform 150 can transmit, to computing system $MPC_1$, the encrypted first share of the user profile and the encrypted first share of its label (e.g., PubKeyEncrypt($[P_{i,1}]$∥$[label_{i,1}]$, $MPC_1$) for each user profile $P_i$. The label, as described herein, as well as other flow-diagrams in this disclosure, can be, or include, a user group identifier or demographic features. Similarly, the content platform 150 can transmit, to computing system $MPC_2$, the encrypted second share of the user profile and the encrypted second share of its label (e.g., PubKeyEncrypt ($[P_{i,2}]$∥$[label_{i,2}]$, $MPC_2$) for each user profile $P_i$.

In some implementations where the application 112 directly sends secret shares of user profiles to the MPC cluster 130, the content platform 150 can request that the MPC cluster 130 train a machine learning model by transmitting a training request to the MPC cluster 130.

The computing systems $MPC_1$ and $MPC_2$ create random projection planes (404). The computing systems $MPC_1$ and $MPC_2$ can collaboratively create m random projection planes $U=\{U_1, U_2, \ldots, U_m\}$. These random projection planes should remain as secret shares between the two computing systems $MPC_1$ and $MPC_2$. In some implementations, the computing systems $MPC_1$ and $MPC_2$ create the random projection planes and maintain their secrecy using the Diffie-Hellman key exchange technique.

As described in more detail below, the computing systems $MPC_1$ and $MPC_2$ will project their shares of each user profile onto each random projection plane and determine, for each random projection plane, whether the share of the user profile is on one side of the random projection plane. Each computing system $MPC_1$ and $MPC_2$ can then build a bit vector in secret shares from secret shares of the user profile based on the result for each random projection. Partial knowledge of the bit vector for a user, e.g., whether or not the user profile $P_i$ is on one side of the projection plane $U_k$ allows either computing system $MPC_1$ or $MPC_2$ to gain some knowledge about the distribution of $P_i$, which is incremental to the prior knowledge that the user profile $P_i$ has unit length. To prevent the computing systems $MPC_1$ and $MPC_2$ gaining access to this information (e.g., in implementations in which this is required or preferred for user privacy and/or data security), in some implementations, the random projection planes are in secret shares, therefore neither computing system $MPC_1$ nor $MPC_2$ can access the random projection planes in cleartext. In other implementations, a random bit flipping pattern can be applied over random projection results using secret share algorithms, as described in optional operations 406-408.

To demonstrate how to flip bits via secret shares, assume that there are two secrets x and y whose values are either zero or one with equal probability. An equality operation [x]==[y] will flip the bit of x if y==0 and will keep the bit of x if y==1. In this example, the operation will randomly flip the bit x with 50% probability. This operation can require remote procedure calls (RPCs) between the two computing systems $MPC_1$ and $MPC_2$ and the number of rounds depends on the data size and the secret share algorithm of choice.

Each computing system $MPC_1$ and $MPC_2$ create a secret m-dimensional vector (406). The computing system $MPC_1$ can create a secret m-dimension vector $\{S_1, S_2, \ldots S_m\}$, where each element $S_i$ has a value of either zero or one with equal probability. The computing system $MPC_1$ splits its m-dimensional vector into two shares, a first share $\{[S_{1,1}], [S_{2,1}], \ldots [S_{m,1}]\}$ and a second share $\{[S_{1,2}], [S_{2,2}], \ldots [S_{m,2}]\}$. The computing system $MPC_1$ can keep the first share secret and provide the second share to computing system $MPC_2$. The computing system $MPC_1$ can then discard the m-dimensional vector $\{S_1, S_2, \ldots S_m\}$.

The computing system $MPC_2$ can create a secret m-dimension vector $\{T_1, T_2, \ldots T_m\}$, where each element $T_i$ has a value of either zero or one. The computing system $MPC_2$ splits its m-dimensional vector into two shares, a first share $\{[T_{1,1}], [T_{2,1}], \ldots [T_{m,1}]\}$ and a second share $\{[T_{1,2}], [T_{2,2}], \ldots [T_{m,2}]\}$. The computing system $MPC_2$ can keep the first share secret and provide the second share to computing system $MPC_1$. The computing system $MPC_2$ can then discard the m-dimensional vector $\{T_1, T_2, \ldots T_m\}$.

The two computing systems $MPC_1$ and $MPC_2$ use secure MPC techniques to calculate shares of a bit flipping pattern (408). The computing systems $MPC_1$ and $MPC_2$ can use a secret share MPC equality test with multiple roundtrips between the computing systems $MPC_1$ and $MPC_2$ to compute shares of the bit flipping pattern. The bit flipping pattern can be based on the operation [x]==[y] described above. That is, the bit flipping pattern can be $\{S_1==T_1, S_2==T_2, \ldots S_m==T_m\}$. Let each $ST_i==(S_i==T_i)$. Each $ST_i$ has a value of either zero or one. After the MPC operation is completed, computing system $MPC_1$ has a first share $\{[ST_{1,1}], [ST_{2,1}], \ldots [ST_{m,1}]\}$ of the bit flipping pattern and computing system $MPC_2$ has a second share $\{[ST_{1,2}], [ST_{2,2}], \ldots [ST_{m,2}]\}$ of the bit flipping pattern. The shares of each $ST_i$ enable the two computing systems $MPC_1$ and $MPC_2$ to flip the bits in bit vectors in a way that is opaque to either one of the two computing systems $MPC_1$ and $MPC_2$.

Each computing system $MPC_1$ and $MPC_2$ projects its shares of each user profile onto each random projection plane (410). That is, for each user profile that the computing system $MPC_1$ received a share, the computing system $MPC_1$ can project the share $[P_{i,1}]$ onto each projection plane $U_j$. Performing this operation for each share of a user profile and for each random projection plane $U_j$ results in a matrix R of z×m dimension, where z is the number of user profiles available and m is the number of random projection planes. Each element $R_{i,j}$ in the matrix R can be determined by computing the dot product between the projection plane $U_j$ and the share $[P_{i,1}]$, e.g., $R_{i,j}=U_j\odot[P_{i,1}]$. The operation $\odot$ denotes the dot product of two vectors of equal length.

If bit flipping is used, computing system $MPC_1$ can modify the values of one or more of the elements $R_{i,j}$ in the matrix using the bit flipping pattern secretly shared between the computing systems $MPC_1$ and $MPC_2$. For each element $R_{i,j}$ in the matrix R, computing system $MPC_1$ can compute, as the value of the element $R_{i,j}$, $[ST_{j,1}]==sign(R_{i,j})$. Thus, the sign of the element $R_{i,j}$ will be flipped if its corresponding bit in the bit $[ST_{j,1}]$ in the bit flipping pattern has a value of zero. This computation can require multiple RPCs to computing system $MPC_2$.

Similarly, for each user profile that the computing system $MPC_2$ received a share, the computing system $MPC_2$ can project the share $[P_{i,2}]$ onto each projection plane $U_j$. Performing this operation for each share of a user profile and for each random projection plane $U_j$ results in a matrix R' of z×m dimension, where z is the number of user profiles available and m is the number of random projection planes. Each element $R_{i,j}'$ in the matrix R' can be determined by computing the dot product between the projection plane $U_j$ and the share $[P_{i,2}]$, e.g., $R_{i,j}'=U_j\odot[P_{i,2}]$. The operation $\odot$ denotes the dot product of two vectors of equal length.

If bit flipping is used, computing system $MPC_2$ can modify the values of one or more of the elements $R_{i,j}'$ in the matrix using the bit flipping pattern secretly shared between the computing systems $MPC_1$ and $MPC_2$. For each element $R_{i,j}'$ in the matrix R, computing system $MPC_2$ can compute, as the value of the element $R_{i,j}'$, $[ST_{j,2}]=sign(R_{i,j}')$. Thus, the sign of the element $R_{i,j}'$ will be flipped if its corresponding bit in the bit $ST_j$ in the bit flipping pattern has a value of zero. This computation can require multiple RPCs to computing system $MPC_1$.

The computing systems $MPC_1$ and $MPC_2$ reconstruct bit vectors (412). The computing systems $MPC_1$ and $MPC_2$ can reconstruct the bit vectors for the user profiles based on the matrices R and R', which have exactly the same size. For example, computing system $MPC_1$ can send a portion of the columns of matrix R to $MPC_2$ and computing system $MPC_2$ can send the remaining portion of the columns of matrix R' to $MPC_1$. In a particular example, computing system $MPC_1$ can send the first half of the columns of matrix R to computing system $MPC_2$ and computing system $MPC_2$ can send the second half of the columns of matrix R' to $MPC_1$. Although columns are used in this example for horizontal reconstruction and are preferred to protect user privacy, rows can be used in other examples for vertical reconstruction.

In this example, computing system $MPC_2$ can combine the first half of the columns of matrix R' with the first half of the columns of matrix R received from computing system $MPC_1$ to reconstruct the first half (i.e., m/2 dimension) of bit vectors in cleartext. Similarly, computing system $MPC_1$ can combine the second half of the columns of matrix R with the second half of the columns of matrix R' received from computing system $MPC_2$ to reconstruct the second half (i.e. m/2 dimension) of bit vectors in cleartext. Conceptually, the computing systems $MPC_1$ and $MPC_2$ have now combined corresponding shares in two matrixes R and R' to reconstruct bit matrix B in cleartext. This bit matrix B would include the bit vectors of the projection results (projected onto each projection plane) for each user profile for which shares were received from the content platform 150 for the machine learning model. Each one of the two servers in the MPC cluster 130 owns half of the bit matrix B in cleartext.

However, if bit flipping is used, the computing systems $MPC_1$ and $MPC_2$ have flipped bits of elements in the matrices R and R' in a random pattern fixed for the machine learning model. This random bit flipping pattern is opaque to either of the two computing systems $MPC_1$ and $MPC_2$ such that neither computing system $MPC_1$ nor $MPC_2$ can infer the original user profiles from the bit vectors of the project results. The crypto design further prevents $MPC_1$ or $MPC_2$ from inferring the original user profiles by horizontally partitioning the bit vectors, i.e. computing system $MPC_1$ holds the second half of bit vectors of the projection results in cleartext and computing system $MPC_2$ holds the first half of bit vectors of the projection results in cleartext.

The computing systems $MPC_1$ and $MPC_2$ generate machine learning models (414). The computing system $MPC_1$ can generate a k-NN model using the second half of the bit vectors. Similarly, computing system $MPC_2$ can generate a k-NN model using the first half of the bit vectors. Generating the models using bit flipping and horizontal partitioning of the matrices applies the defense-in-depth principle to protect the secrecy of the user profiles used to generate the models.

In general, each k-NN model represents cosine similarities (or distances) between the user profiles of a set of users. The k-NN model generated by computing system $MPC_1$ represents the similarity between the second half of the bit vectors and the k-NN model generated by computing system $MPC_2$ represents the similarity between the first half of the bit vectors. For example, each k-NN model can define the cosine similarity between its half of the bit vectors.

The two k-NN models generated by the computing systems $MPC_1$ and $MPC_2$ can be referred to as a k-NN model, which has a unique model identifier as described above. The computing systems $MPC_1$ and $MPC_2$ can store their models and shares of the labels for each user profile used to generate the models. The content platform 150 can then query the models to make inferences for user groups for a user. In some implementations, to protect user privacy, labels are encrypted, e.g. in the form of secret shares.

Example Process for Using Machine Learning Model to Infer User Groups

FIG. 5 is a flow diagram that illustrates an example process 500 for adding a user to user groups using machine learning models. Operations of the process 500 can be implemented, for example, by the MPC cluster 130 and the client device 110 of FIG. 1, e.g., the application 112 running on the client device 110. Operations of the process 500 can also be implemented as instructions stored on one or more computer readable media which may be non-transitory, and execution of the instructions by one or more data processing apparatus can cause the one or more data processing apparatus to perform the operations of the process 500.

The MPC cluster 130 receives an inference request for a given user profile (502). An application 112 running on a user's client device 110 can transmit the inference request to the MPC cluster 130, e.g., in response to a request from a content platform 150. For example, the content platform 150 can transmit, to the application 112, an inference request token $M_{infer}$ to request that the application 112 submit the inference request to the MPC cluster 130. The inference request can be to query whether the user should be added to any number of user groups.

The inference request token $M_{infer}$ can include shares of the given user profile of the user, the model identifier for the machine learning model (e.g., k-NN model) and the owner domain to be used for the inference, a number k of nearest neighbors of the given user profile to be used for the inference, additional signals (e.g., contextual or digital component signals), the aggregation function to be used for the inference and any aggregation function parameters to be used for the inference, and the signature over all the above information created by the owner domain using an owner domain confidential privacy key.

As described above, to prevent leaking the given user profile $P_i$ in cleartext form to either computing system $MPC_1$ or $MPC_2$, and thereby preserve user privacy, the application 112 can split the given user profile $P_i$ into two shares $[P_{i,1}]$ and $[P_{i,2}]$ for $MPC_1$ and $MPC_2$, respectively. The application 112 can then send a single inference request to computing system $MPC_1$ with the first share $[P_{i,1}]$ of the given user profile and an encrypted version of the second share, e.g., PubKeyEncrypt($[P_{i,2}]$, $MPC_2$) of the given user profile. The inference request may also include the inference request token $M_{infer}$ so that the MPC cluster 130 can authenticate the inference request. By sending an inference request that includes the first share and the encrypted second share, the number of outgoing requests sent by the application 112 is reduced, resulting in computational, bandwidth, and battery savings at the client device 110.

In other implementations, the application 112 can send the first share $[P_{i,1}]$ of the given user profile to computing system $MPC_1$ and the second share $[P_{i,2}]$ of the given user profile to computing system $MPC_2$. By sending the second share $[P_{i,2}]$ of the given user profile to computing system $MPC_2$ without going through computing system $MPC_1$, the second share does not need to be encrypted to prevent computing system $MPC_1$ from accessing the second share $[P_{i,2}]$ of the given user profile.

Each computing system $MPC_1$ and $MPC_2$ identifies the k nearest neighbors to the given user profile in secret share representation (504). The computing system $MPC_1$ can compute its half of a bit vector of the given user profile using the first share $[P_{i,1}]$ of the given user profile. To generate the bit vector, computing system $MPC_1$ can use operations 410 and 412 of the process 400 of FIG. 4. That is, computing system $MPC_1$ can use the random projection vectors generated for the k-NN model to project the share $[P_{i,1}]$ of the given user profile and create a secret share of a bit vector for the given user profile. If bit flipping was used to generate the k-NN model, the computing system $MPC_1$ can then use the first share $\{[ST_{1,1}], [ST_{2,1}], \ldots [ST_{m,1}]\}$ of the bit flipping pattern that was used to generate the k-NN model to modify the elements of the secret share of a bit vector for the given user profile.

Similarly, the computing system $MPC_1$ can provide, to computing system $MPC_2$, the encrypted second share $PubKeyEncrypt([P_{i,2}], MPC_2)$ of the given user profile. The computing system $MPC_2$ can decrypt the second share $[P_{i,2}]$ of the given user profile using its private key and compute its half of the bit vector for the given user profile using the second share $[P_{i,2}]$ of the given user profile. That is, computing system $MPC_2$ can use the random projection vectors generated for the k-NN model to project the share $[P_{i,2}]$ of the given user profile and create a bit vector for the given user profile. If bit flipping was used to generate the k-NN model, the computing system $MPC_2$ can then use the second share $\{[ST_{1,2}], [ST_{2,2}], \ldots [ST_{m,2}]\}$ of the bit flipping pattern that was used to generate the k-NN model to modify the elements of the bit vector for the given user profile. The computing systems $MPC_1$ and $MPC_2$ then reconstruct the bit vector with horizontal partition, as described in operation 412 in FIG. 4. After the completion of reconstruction, computing system $MPC_1$ has the first half of the overall bit vector for the given user profile and computing system $MPC_2$ has the second half of the overall bit vector for the given user profile.

Each computing system $MPC_1$ and $MPC_2$ uses its half of the bit vector for the given user profile and its k-NN model to identify the k' nearest neighbor user profiles, where k'=a×k, where a is empirically determined based on actual production data and statistical analysis. For example a=3 or another appropriate number. The computing system $MPC_1$ can compute a Hamming distance between the first half of the overall bit vector and the bit vector for each user profile of the k-NN model. The computing system $MPC_1$ then identifies the k' nearest neighbors based on the computed Hamming distances, e.g., the k' user profiles having the lowest Hamming distances. In other words, the computing system $MPC_1$ identifies a set of nearest neighbor user profiles based on a share of a given user profile and a k-nearest neighbor model trained using a plurality of user profiles. An example result in tabular form is shown in Table 5 below.

TABLE 5

| Row ID | Hamming Distance (in cleartext) | Shares of User Profile | Shares of Label |
|---|---|---|---|
| i | $d_{i,1}$ | $[P_{i,1}]$ | $[label_{i,1}]$ |
| ... | ... | ... | ... |

In Table 5, each row is for a particular nearest neighbor user profile and includes the Hamming distance between the first half of the bit vector for each user profile and bit vector for the given user profile computed by computing system $MPC_1$. The row for a particular nearest neighbor user profile also includes the first share of that user profile and the first share of the label associated with that user profile. The label, as described herein, can be, or include, a user group identifier or demographic features.

Similarly, the computing system $MPC_2$ can compute a Hamming distance between the second half of the overall bit vector and the bit vector for each user profile of the k-NN model. The computing system $MPC_2$ then identifies the k' nearest neighbors based on the computed Hamming distances, e.g., the k' user profiles having the lowest Hamming distances. An example result in tabular form is shown in Table 5 below.

TABLE 6

| Row ID | Hamming Distance (in cleartext) | Shares of User Profile | Shares of Label |
|---|---|---|---|
| j | $d_{j,2}$ | $[P_{j,2}]$ | $[label_{j,2}]$ |
| ... | ... | ... | ... |

In Table 6, each row is for a particular nearest neighbor user profile and includes the Hamming distance between that user profile and the given user profile computed by computing system $MPC_2$. The row for a particular nearest neighbor user profile also includes the second share of that user profile and the second share of the label associated with that user profile.

The computing systems $MPC_1$ and $MPC_2$ can exchange the list of row identifiers (row ID) and Hamming distance pairs with each other. Thereafter, each computing system $MPC_1$ and $MPC_2$ can independently select k nearest neighbors with the same algorithm and input data. For example, computing system $MPC_1$ can find row identifiers common to partial query results from both computing systems $MPC_1$ and $MPC_2$. For each i in the common row identifiers, computing system $MPC_1$ calculates combined Hamming distance $d_i$ from the two partial Hamming distances, e.g., $d_i=d_{i,1}+d_{i,2}$. The computing system $MPC_1$ can then order the common row identifiers based on the combined Hamming distance $d_i$ and select the k nearest neighbors. The row identifiers for the k nearest neighbors can be represented as ID=$\{id_1, \ldots id_k\}$. It can be proven that if a is sufficiently large, the k nearest neighbors determined in the above algorithm are the true k nearest neighbors with high probability. However, larger value for a leads to high computation cost. In some implementations, $MPC_1$ and $MPC_2$ engage in Private Set Intersection (PSI) algorithms to determine row identifiers common to partial query results from both computer systems $MPC_1$ and $MPC_2$. Furthermore, in some implementations, $MPC_1$ and $MPC_2$ engage in enhanced Private Set Intersection (PSI) algorithms to calculate $d_i=d_{i,1}+d_{i,2}$ for row identifiers common to partial query results from both computer systems $MPC_1$ and $MPC_2$, and reveal nothing to either $MPC_1$ or $MPC_2$ but the top k nearest neighbors determined by $d_i$.

A determination is made whether to add the user to a user group (506). This determination can be made based on the k nearest neighbor profiles and their associated labels. The determination is also based on the aggregation function used and any aggregation parameters for that aggregation function. The aggregation functions can be chosen based on the nature of the machine learning problem, for example binary classification, regression (e.g., using arithmetic mean or root mean square), multiclass classification, and weighted k-NN. Each way of determining whether to add a user to a user group can include different interactions between the MPC cluster 130 and the application 112 running on the client 110, as described in more detail below. Adding different users to a common user group can advantageously ensure that users with similar demographics are categorized together.

If a determination is made to not add the user to the user group, the application 112 may not add the user to the user group (508). If a determination is made to add the user to the user group, the application 112 can add the user to the user group, e.g., by updating the user group list stored at the client device 110 to include the user group identifier of the user group (510).

As noted above, the application 112 can submit an inference request to the MPC cluster 130, which in response can query a machine learning model (e.g., k-NN model) to send an inference result that can indicate whether the application 112 should add the user to zero or more user groups. In some implementations, in cases where the inference result indicates that the application 112 should add the user to multiple user groups, the MPC cluster 130 can, prior to generating or transmitting the inference result, prevent the user from being added to (i.e., classified in) opposite groups (e.g., if the user is self-declared or determined to be 30-35 years old, the user may not be categorized in a user group that is for 50-60 year olds).

Example Binary Classification Inference Techniques

For binary classification, the inference request can include, as aggregation function parameters, a threshold, $L_{true}$, and $L_{false}$. The label values are boolean type, i.e. either true or false. The threshold parameter can represent a threshold percentage of k nearest neighbor profiles that must have a label of true value in order for the user to be added to the user group $L_{true}$. Otherwise the user will be added to user group $L_{false}$. In one approach, the MPC cluster 130 could instruct the application 112 to add the user to the user group $L_{true}$ ($L_{false}$ otherwise) if the number of nearest neighbor user profiles that has a label value that is true is greater than a product of the threshold and k. However, computing system $MPC_1$ would learn the inference result, e.g., the user group that the user should join.

To preserve user privacy, the inference request can include the threshold in cleartext, a first share $[L_{true,1}]$ and $[L_{false,1}]$ for computing system $MPC_1$, and an encrypted second share PubKeyEncrypt($[L_{true,2}]\|[L_{false,2}]\|$application_public_key, $MPC_2$) for computing system $MPC_2$. In this example, the application 112 can generate a composite message from $[L_{true,2}]$, $[L_{false,2}]$ and the public key of the application 112, as denoted by the symbols $\|$, and encrypt this composite message using a public key of computing system $MPC_2$. The inference response from computing system $MPC_1$ to the application 112 can include a first share of the inference result $[L_{result,1}]$ determined by computing system $MPC_1$ and a second share of the inference result $[L_{result,2}]$ determined by computing system $MPC_2$.

To prevent the second share from being accessed by computing system $MPC_1$ and therefore enabling computing system $MPC_1$ to obtain the inference result in cleartext, computing system $MPC_2$ can send an encrypted (and optionally digitally signed) version of the second share of the inference result $[L_{result,2}]$, e.g., PubKeySign(PubKeyEncrypt($[L_{result,2}]$, application_public_key), $MPC_2$) to computing system $MPC_1$ for inclusion in the inference response sent to the application 112. In this example, the application 112 can verify the digital signature using the public key of computing system $MPC_2$ that corresponds to the private key of computing system $MPC_2$ used to generate the digital signature, and decrypt the second share of the inference result $[L_{result,2}]$ using the private key of the application 112 corresponding to the public key (application_public_key) used to encrypt the second share of the inference result $[L_{result,2}]$.

The application 112 can then reconstruct the inference result $L_{result}$ from the first share $[L_{result,1}]$ and the second share $[L_{result,2}]$. Using the digital signature enables the application 112 to detect falsification of the result from computing system $MPC_2$, e.g., by computing system $MPC_1$. Depending on the level of security desired, what parties operate the computing systems of the MPC cluster 130, and the security model assumed, the digital signature may not be required.

The computing systems $MPC_1$ and $MPC_2$ can use MPC techniques to determine the shares $[L_{result,1}]$ and $[L_{result,2}]$ of the binary classification result. In binary classification, the value of $label_i$ for a user profile is either zero (false) or one (true). Assuming that the selected k nearest neighbors are identified by identifiers $\{id_1, \ldots id_k\}$ the computing systems $MPC_1$ and $MPC_2$ can calculate a sum of the labels (sum_of_labels) for the k nearest neighbor user profiles, where the sum is represented by Relationship 3 below:

$$\text{sum\_of\_labels} = \Sigma_{i \in \{id1, \ldots idk\}} \text{label}_i \quad \text{Relationship 3:}$$

To determine the sum, computing system $MPC_1$ sends ID (i.e., $\{id_1, \ldots, id_k\}$) to computing system $MPC_2$. The computing system $MPC_2$ can verify that the number of row identifiers in ID is greater than a threshold to enforce k-anonymity. The computing system $MPC_2$ can then calculate a second share of the sum of labels [sum_of_labels$_2$] using Relationship 4 below:

$$[\text{sum\_of\_labels}_2] = \Sigma_{i \in \{id1, \ldots idk\}} [\text{label}_{i,1}] \quad \text{Relationship 4:}$$

The computing system $MPC_1$ can also calculate a first share of the sum of labels [sum_of_labels$_1$] using Relationship 5 below:

$$[\text{sum\_of\_labels}_1] = \Sigma_{i \in \{id1, \ldots idk\}} [\text{label}_{i,1}] \quad \text{Relationship 5:}$$

If the sum of the labels sum_of_labels is confidential information that the computing systems $MPC_1$ and $MPC_2$ should know as little as possible, $MPC_1$ and $MPC_2$ can execute a crypto protocol to compute whether sum_of_labels$_1$<threshold×k, i.e. computing system $MPC_1$ can calculate whether the first share of the sum of labels [sum_of_labels$_1$] is below the threshold, e.g., [below_threshold$_1$]=[sum_of_labels$_1$]<threshold×k. Similarly, computing system $MPC_2$ can calculate whether the second share of the sum of labels [sum_of_labels$_2$] is below the threshold, e.g., [below_threshold$_2$]=[sum_of_labels$_2$]<threshold×k. The computing system $MPC_1$ can proceed to calculate inference result $[L_{result,1}]$ by [below_threshold$_1$]×$[L_{false, 1}]$+(1-[below_threshold$_1$])×$[L_{true, 1}]$. Similarly, computing system $MPC_2$ can calculate $[L_{result,2}]$ by [below_threshold$_2$]×$[L_{false, 2}]$+(1-[below_threshold$_2$])×$[L_{true, 2}]$.

If the sum of the labels sum_of_labels is not confidential information, computing systems $MPC_1$ and $MPC_2$ can reconstruct the sum of labels from [sum_of_labels$_1$] and [sum_of_labels$_2$]. The computing systems $MPC_1$ and $MPC_2$ can then set the parameter below_threshold to sum_of_labels<threshold×k, e.g., a value of one if it is below the threshold or a value of zero if not below the threshold.

After computing the parameter below_threshold, the computing systems $MPC_1$ and $MPC_2$ can proceed to determine the inference result $L_{result}$. For example, computing system MPC$_2$ can set [L$_{result,2}$] to either [L$_{true,2}$] or [L$_{false,2}$] according to the value of below threshold. For example, computing system MPC$_2$ can set [L$_{result,2}$] to [L$_{true,2}$] if the sum of labels is not below the threshold or to [L$_{false,2}$] if the sum of labels is below the threshold. The computing system MPC$_2$ can then return an encrypted second share of the inference result (PubKeyEncrypt([L$_{result,2}$], application_public_key)) or a digitally signed version of this result to computing system MPC$_1$.

Similarly, computing system MPC$_1$ can set [L$_{result,1}$] to either [L$_{true,1}$] or [L$_{false,1}$] according to the value of below_threshold. For example, computing system MPC$_1$ can set [L$_{result,1}$] to [L$_{true,1}$] if the sum of labels is not below the threshold or to [L$_{false,1}$] if the sum of labels is below the threshold. The computing system MPC$_1$ can transmit the first share of the inference result [L$_{result,1}$] and the encrypted second share of the inference result [L$_{result,2}$] as an inference response to the application 112. The application 112 can then compute the inference result based on the two shares, as described above.

Example Multiclass Classification Inference Techniques

For multiclass classification, the label associated with each user profile can be categorical feature. The content platform 150 can specify a lookup table that maps any possible categorical value to a corresponding user group identifier. The lookup table can be one of the aggregation function parameters included in the inference request.

Within the k nearest neighbors found, the MPC cluster 130 finds the most frequent label value. The MPC cluster 130 can then find, in the lookup table, the user group identifier corresponding to the most frequent label value and request that the application 112 add the user to the user group corresponding to the user group identifier, e.g., by adding the user group identifier to the user group list stored at the client device 110.

Similar to binary classification, it may be preferable to hide the inference result L$_{result}$ from the computing systems MPC$_1$ and MPC$_2$. To do so, the application 112 or the content platform 150 can create two lookup tables that each maps categorical values to a respective share of the inference result L$_{result}$. For example, the application can create a first lookup table that maps the categorical values to a first share [L$_{result1}$] and a second lookup table that maps the categorical values to a second share [L$_{result2}$]. The inference request from the application to computing system MPC$_1$ can include the first lookup table in cleartext for computing system MPC$_1$ and an encrypted version of the second lookup table for computing system MPC$_2$. The second lookup table can be encrypted using a public key of computing system MPC$_2$. For example, a composite message that includes the second lookup table and a public key of the application can be encrypted using the public key of the computing system MPC$_2$, e.g., PubKeyEncrypt (lookuptable2∥application_public_key, MPC$_2$).

The inference response sent by computing system MPC$_1$ can include the first share [L$_{result1}$] of the inference result generated by the computing system MPC$_1$. Similar to binary classification, to prevent the second share from being accessed by computing system MPC$_1$ and therefore enabling computing system MPC$_1$ to obtain the inference result in cleartext, computing system MPC$_2$ can send an encrypted (and optionally digitally signed) version of the second share of the inference result [L$_{result,2}$], e.g., PubKeySign(PubKeyEncrypt([L$_{result,2}$], application_public_key), MPC$_2$) to computing system MPC$_1$ for inclusion in the inference result sent to the application 112. The application 112 can reconstruct the inference result L$_{result}$ from [L$_{result1}$] and [L$_{result2}$].

Assume there are w valid labels $\{l_1, l_2, \ldots l_w\}$ for a multiclass classification problem. To determine the shares [L$_{result1}$] and [L$_{result2}$] of the inference result L$_{result}$ in multiclass classification, computing system MPC$_1$ sends ID (i.e., $\{id_1, \ldots id_k\}$) to computing system MPC$_2$. The computing system MPC$_2$ can verify that the number of row identifiers in ID is greater than a threshold to enforce k-anonymity. In general, the k in k-NN may be significantly larger than the k in k-anonymity. The computing system MPC$_2$ can then calculate a second frequency share [frequency$_{j,2}$] of the j-th label [l$_{j,2}$] which is defined using Relationship 6 below.

[frequency$_{j,2}$]=$\Sigma_{i\in\{id_1, \ldots id_k\}}$[label$_{i,2}$]==$l_j$)   Relationship 6:

Similarly, computing system MPC$_1$ calculates a first frequency share [frequency$_{j,1}$] of the j-th label [l$_{j,1}$] which is defined using Relationship 7 below.

[frequency$_{j,1}$]=$\Sigma_{i\in\{id_1, \ldots id_k\}}$[label$_{i,1}$]==$l_j$)   Relationship 7:

Assuming that the frequency of a label (frequency) within the k nearest neighbors is not sensitive, the computing systems MPC$_1$ and MPC$_2$ can reconstruct frequency$_i$ from the two shares [frequency$_{i,1}$] and [frequency$_{i,2}$] for that label. The computing systems MPC$_1$ and MPC$_2$ can then determine an index parameter (index) where frequency$_{index}$ has the largest value, e.g., index=argmax$_i$(frequency$_i$).

The computing system MPC$_2$ can then lookup, in its lookup table, the share [L$_{result,2}$] corresponding to the label having the highest frequency and return PubKeyEncrypt ([L$_{result,2}$], application_public_key) to the computing system MPC$_1$. The computing system MPC$_1$ can similarly lookup, in its lookup table, the share [L$_{result,1}$] corresponding to the label having the highest frequency. The computing system MPC$_1$ can then send, to the application 112, an inference response that includes the two shares (e.g., [L$_{result,1}$] and PubKeyEncrypt([L$_{result,2}$], application_public_key). As described above, the second share can be digitally signed by MPC$_2$ to prevent computing system MPC$_1$ from falsifying the response of computing system MPC$_2$. The application 112 can then compute the inference result based on the two shares, as described above, and add the user to the user group identified by the inference result.

Example Regression Inference Techniques

For regression, the label associated with each user profile P must be numerical. The content platform 150 can specify an ordered list of thresholds, e.g., $(-\infty<t_0<t_1<\ldots<t_n<\infty)$, and a list of user group identifiers, e.g., $\{L_0, L_1, \ldots L_n, L_{n+1}\}$. In addition, the content platform 150 can specify an aggregation function, e.g., arithmetic mean or root mean square.

Within the k nearest neighbors found, the MPC cluster 130 calculates the mean (result) of the label values and then looks up the mapping using the result to find the inference result L$_{result}$. For example, the MPC cluster 130 can use Relationship 8 below to identify the label based on the mean of the label values:

If result≤$t_0$,L$_{result}$←$L_0$;

If result>$t_n$,L$_{result}$←$L_{n+1}$;

If $t_x$<result≤$t_{x+1}$,L$_{result}$←$L_{x+1}$   Relationship 8:

That is, if the result is less than or equal to threshold $t_0$, the inference result L$_{result}$ is $L_0$. If the result is greater than threshold $t_n$, the inference result L$_{result}$ is $L_{n+1}$. Otherwise, if the result is greater than threshold $t_x$ and less than or equal to threshold $t_{x+1}$, the inference result L$_{result}$ is $L_{x+1}$. The computing system MPC$_1$ then requests that the application 112 add the user to the user group corresponding to the inference result $L_{result}$, e.g., by sending an inference response that includes the inference result $L_{result}$ to the application 112.

Similar to the other classification techniques described above, the inference result $L_{result}$ can be hidden from the computing systems $MPC_1$ and $MPC_2$. To do so, the inference request from the application 112 can include first share of the labels $[L_{i,1}]$ for computing system $MPC_1$ and encrypted second shares of the labels $[L_{i,2}]$ (e.g., PubKeyEncrypt $([L_{0,2}\|\ldots\|L_{n+1,2}\|\text{application\_public\_key}, MPC_2))$ for computing system $MPC_2$.

The inference result sent by computing system $MPC_1$ can include the first share $[L_{result1}]$ of the inference result generated by the computing system $MPC_1$. Similar to binary classification, to prevent the second share from being accessed by computing system $MPC_1$ and therefore enabling computing system $MPC_1$ to obtain the inference result in cleartext, computing system $MPC_2$ can send an encrypted (and optionally digitally signed) version of the second share of the inference result $[L_{result,2}]$, e.g., PubKeySign(PubKeyEncrypt($[L_{result,2}]$, application_public_key), $MPC_2$) to computing system $MPC_1$ for inclusion in the inference result sent to the application 112. The application 112 can reconstruct the inference result $L_{result}$ from $[L_{result,1}]$ and $[L_{result,2}]$.

When the aggregation function is arithmetic mean, the computing systems $MPC_1$ and $MPC_2$ compute the sum of the labels sum_of_labels, similar to binary classification. If the sum of the labels is not sensitive, the computing systems $MPC_1$ and $MPC_2$ can calculate the two shares [sum_of_labels$_1$] and [sum_of_labels$_2$] and then reconstruct sum of labels based on the two shares. The computing systems $MPC_1$ and $MPC_2$ can then compute the average of the labels by dividing the sum of the labels by the quantity of the nearest neighbor labels, e.g., by k.

The computing system $MPC_1$ can then compare the average to the thresholds using Relationship 8 to identify the first share of the label corresponding to the average and set the first share $[L_{result,1}]$ to the first share of the identified label. Similarly, the computing system $MPC_2$ can compare the average to the thresholds using Relationship 8 to identify the second share of the label corresponding to the average and set the second share $[L_{result,2}]$ to the second share of the identifier label. The computing system $MPC_2$ can encrypt the second share $[L_{result,2}]$ using the public key of the application 112, e.g., PubKeyEncrypt($[L_{result,2}]$, application_public_key) and send the encrypted second share to computing system $MPC_1$. The computing system $MPC_1$ can provide the first share and the encrypted second share (which can optionally be digitally signed as described above) to the application 112. The application 112 can then add the user to the user group identified by the label (e.g., user group identifier) $L_{result}$.

If the sum of the labels is sensitive, the computing systems $MPC_1$ and $MPC_2$ may not be able to construct sum_of_labels in cleartext. Instead, computing system $MPC_1$ can calculate a mask $[\text{mask}_{i,1}]=[\text{sum\_of\_labels}_1]<t_i\times k$ for $\forall i\in[0, n]$. This computation can require one or more roundtrips between the computing systems $MPC_1$ and $MPC_2$. Next, computing system $MPC_1$ can calculate $[\text{acc}_{i,1}]=(1==\Sigma_{j=0}^{i}[\text{mask}_{j,1}])$ and computing system $MPC_2$ can calculate $[\text{acc}_{i,2}]=(1==\Sigma_{j=0}^{i}[\text{mask}_{j,2}])$. The equality test in this operation can require multiple roundtrips between the computing systems $MPC_1$ and $MPC_2$.

In addition, computing system $MPC_1$ can calculate $[\text{use\_default}_1]=(0==\Sigma_{j=0}^{n}[\text{mask}_{j,1}])$ and computing system $MPC_2$ can calculate $[\text{use\_default}_2]=(0==\Sigma_{j=0}^{n}[\text{mask}_{j,2}])$.

The MPC cluster 130 would then return $L_i$ if and only if $\text{acc}_i==1$, for $\forall i\in[0, n]$ and would return $L_{n+1}$ if use_default==1. This condition can be represented in Relationship 9 below.

$$\text{result}=\text{use\_default}\times L_{n+1}+\Sigma_{i=0}^{n}\text{acc}_i\times L_i \quad \text{Relationship 9:}$$

The corresponding cryptographic implementation can be represented by Relationships 10 and 11 below.

$$[L_{result,1}]=[\text{use\_default}_1]\times L_{n+1}+\Sigma_{i=0}^{n}([\text{acc}_{i,1}]\times L_i) \quad \text{Relationship 10:}$$

$$[L_{result,2}]=[\text{use\_default}_2]\times L_{n+1}+\Sigma_{i=0}^{n}([\text{acc}_{i,2}]\times L_i) \quad \text{Relationship 11:}$$

These computations do not require any roundtrip computations between the computing systems $MPC_1$ and $MPC_2$ if $L_i$ are in cleartext, and require one roundtrip computation if $L_i$ are in secret shares. The computing system $MPC_1$ can provide the two shares of the result (e.g., $[L_{result,1}]$ and $[L_{result,2}]$ to the application 112, with the second share encrypted and optionally digitally signed by $MPC_2$ as described above. In this way, the application 112 can determine the inference result $L_{result}$ without the computing systems $MPC_1$ or $MPC_2$ learning anything about the immediate or final result.

For root mean square, computing system $MPC_1$ sends ID (i.e., $\{id_1, \ldots id_k\}$) to computing system $MPC_2$. The computing system $MPC_2$ can verify that the number of row identifiers in ID is greater than a threshold to enforce k-anonymity. The computing system $MPC_2$ can calculate a second share of a sum_of_square_labels parameter (e.g., the sum of the squares of the label values) using Relationship 12 below.

$$[\text{sum\_of\_square\_labels}_2]=\Sigma_{i\in\{id_1,\ldots id_k\}}[\text{label}_{i,2}]^2 \quad \text{Relationship 12:}$$

Similarly, computing system $MPC_1$ can calculate a first share of the sum_of_square_labels parameter using Relationship 13 below.

$$[\text{sum\_of\_square\_labels}_1]=\Sigma_{i\in\{id_1,\ldots id_k\}}[\text{label}_{i,1}]^2 \quad \text{Relationship 13:}$$

Assuming that the sum_of_square_labels parameter is not sensitive, the computing systems $MPC_1$ and $MPC_2$ can reconstruct the sum_of_square_labels parameter from the two shares [sum_of_square_labels$_1$] and [sum_of_square_labels$_2$]. The computing systems $MPC_1$ and $MPC_2$ can compute the root mean square of the labels by dividing the sum_of_squares_labels by the quantity of the nearest neighbor labels, e.g., by k, then calculating the square root.

Regardless of whether the average is calculated via arithmetic mean or root mean square, the computing system $MPC_1$ can then compare the average to the thresholds using Relationship 8 to identify the label corresponding to the average and set the first share $[L_{result,1}]$ to the identified label. Similarly, the computing system $MPC_2$ can compare the average to the thresholds using Relationship 8 to identify the label (or secret share of the label) corresponding to the average and set the second share $[L_{result,2}]$ to the (secret share of the) identifier label. The computing system $MPC_2$ can encrypt the second share $[L_{result,2}]$ using the public key of the application 112, e.g., PubKeyEncrypt($[L_{result,2}]$, application_public_key) and send the encrypted second share to computing system $MPC_1$. The computing system $MPC_1$ can provide the first share and the encrypted second share (which can optionally be digitally signed as described above) to the application 112 as the inference result. The application 112 can then add the user to the user group identified by the label (e.g., user group identifier) of the $L_{result}$. If the sum_of_square_labels parameter is sensitive, the computing systems $MPC_1$ and $MPC_2$ can perform a similar cryptographic protocol as used in the arithmetic mean example to compute the shares of the inference result.

In the above techniques to infer the result of classification and regressions problems, all k nearest neighbors have equal influence, e.g., equal weight, over the final inference result. For many classification and regression problems, model quality can be improved if each of the k neighbors is assigned a weight that monotonically decreases when the Hamming distance between the neighbor and the query parameter $P_i$ increases. A common kernel function with this property is Epanechnikov (parabolic) kernel function. Both the Hamming distance and the weight can be calculated in cleartext.

Sparse Feature Vector User Profiles

When features of electronic resources are included in user profiles and used to generate the machine learning models, the resulting feature vectors can include high cardinality categorical features, such as domains, URLs, and IP addresses. These feature vectors are sparse, with most of the elements having a value of zero. The application 112 could split the feature vectors into two or more dense feature vectors, but the machine learning platform would consume too much client device upload bandwidth to be practical. To prevent this problem, the systems and techniques described above can be adapted to better handle sparse feature vectors.

When providing feature vectors for events to the client device, computer-readable code (e.g., scripts) of a content platform 150 that is included in an electronic resource can invoke an application (e.g., browser) API to specify the feature vector for the event. This code, or content platform 150, can determine whether (some part of) the feature vector is dense or sparse. If the feature vector (or some part of it) is dense, the code can pass in a vector of numerical values as the API parameter. If the feature vector (or some part of it) is sparse, the code can pass in a map, e.g., indexed key/value pairs for those feature elements with non-zero feature values, where the keys are the names or indices of such feature elements. If the feature vector (or some part of it) is sparse, and the non-zero feature values are always the same value, e.g., 1, the code can pass in a set, whose elements are the names or indices of such feature elements.

When aggregating feature vectors to generate a user profile, the application 112 can handle dense and sparse feature vectors differently. The user profile (or some part of it) calculated from dense vectors remains to be a dense vector. The user profile (or some part of it) calculated from maps remains to be a map, until the fill rate is sufficiently high that map does not save storage cost anymore. At that point, the application 112 will convert the sparse vector representation into dense vector representation.

The user profile (or some part of it) calculated from sets can be a map, if the aggregation function is sum. For example, each feature vector can have a categorical feature "domain visited". The aggregation function, i.e. sum, will calculate the number of times that the user visited the publisher domain. The user profile (or some part of it) calculated from sets can remain to be a set, if the aggregation function is logical OR. For example, each feature vector can have a categorical feature "domain visited". The aggregation function, i.e. logical OR, will calculate all publisher domains that the user visited, regardless of the frequency of visits.

To send user profiles to the MPC cluster 130 for ML training and prediction, the application 112 may split the dense part of user profiles with any standard crypto libraries that support secret shares. To split the sparse part of user profiles without significantly increasing the client device upload bandwidth and computation cost, a Function Secret Sharing (FSS) technique can be used. In this example, the content platform 150 assigns a unique index to each possible element in the sparse part of the user profile, starting with 1 sequentially. Assume that the valid range of the indices are in the range of [1, N] inclusively.

For the i-th element with non-zero value $P_i$ in a user profile calculated by the application, $1 \leq i \leq N$, the application 112 can create two Pseudo-Random Functions (PRF) $g_i$ and $h_i$ with the following properties:

$g_i(j)+h_i(j)=0$ for any $j$ where $1 \leq j \leq N$ and $j \neq i$ $g_i(j)+h_i(j)=P_i$ otherwise.

Using FSS, either $g_i$ or $h_i$ can be represented concisely, e.g., by $\log_2(N) \times \text{size\_of\_tag}$ bits and it is impossible to infer i or $P_i$ from either $g_i$ or $h_i$. To prevent brute force security attack, size_of_tag is typically 96 bits or larger. Out of the N dimensions, assume that there are n dimensions with non-zero value, where n<<N. For each of the n dimensions, the application 112 can construct two pseudo-random functions g and h as described above. Furthermore, the application 112 can package the concise representation of all n functions g into a vector G, and package the concise representation of n functions h into another vector H in the same order.

In addition, the application 112 can split the dense part of the user profile P into two additive secret shares $[P_1]$ and $[P_2]$. The application 112 can then send $[P_1]$ and G to computing system $MPC_1$ and send $[P_2]$ and H to $MPC_2$. Transmitting G requires $|G| \times \log_2(N) \times \text{size\_of\_tag} = n \times \log_2(N) \times \text{size\_of\_tag}$ bits, which may be far smaller than N bits needed if the application 112 transmits the sparse part of the user profile in a dense vector, when n<<N.

When computing system $MPC_1$ receives $g_1$ and computing system $MPC_2$ receives $h_1$, the two computing systems $MPC_1$ and $MPC_2$ can create Shamir's secret shares independently. For any j where $1 \leq j \leq N$, computing system $MPC_1$ creates a point on two-dimensional coordinate $[1, 2 \times g_i(j)]$ and computing system $MPC_2$ creates a point on two-dimensional coordinate $[-1, 2 \times h_i(j)]$. If the two computing systems $MPC_1$ and $MPC_2$ collaboratively construct a line $y=a_0+a_1 \times x$ that passes through both points, Relationships 14 and 15 are formed.

$$2 \times g_i(j) = a_0 + a_1 \qquad \text{Relationship 14:}$$

$$2 \times h_i(j) = a_0 - a_1 \qquad \text{Relationship 15:}$$

If the two relationships are added together, it results in $2 \times g_i(j) + 2 \times h_i(j) = (a_0+a_1)+(a_0-a_1)$, which simplifies to $a_0 = g_i(j)+h_i(j)$. Therefore, $[1, 2 \times g_i(j)]$ and $[-1, 2 \times h_i(j)]$ are two secret shares of the i-th non-zero element in the sparse array, i.e., $P_i$.

During the random projection operations of the machine learning training process, the computing system $MPC_1$ can independently assemble its vectors of secret shares for the user profile from both $[P_1]$ and G. Per the above description, it is known that $|G|=n$, where n is the number of non-zero elements in the sparse part of the user profile. In addition, it is known that the sparse part of the user profile is N dimension, where n<<N.

Assume that $G=\{g_1, \ldots g_n\}$. For the j-th dimension where $1 \leq j \leq N$, and $1 \leq k \leq n$, let $[Sp_{j,1}] = \Sigma_{k=1}^{n} g_k(j)$. Similarly, let $H=\{h_1, \ldots h_n\}$. The computing system $MPC_2$ can independently calculate $[SP_{j,2}] = \Sigma_{k=1}^{n} h_k(j)$. It is easy to prove that $[SP_{j,1}]$ and $[SP_{j,2}]$ are additive secret shares of $SP_j$, i.e., the secret value of the j-th element in the original sparse part of the user profile.

Let $[SP_1]=\{[SP_{1,1}], \ldots [SP_{N,1}]\}$, i.e., the reconstructed secret share in dense representation of the sparse part of the user profile. By concatenating $[P_1]$ and $[SP_1]$, computing system $MPC_1$ can reconstruct the full secret share of the original user profile. The computing system $MPC_1$ can then randomly project $[P_1]\|[SP_1]$. Similarly, computing system $MPC_2$ can randomly project $[P_2]\|[SP_2]$. After projection, the techniques described above can be used to generate the machine learning models in a similar manner.

Figure 6:
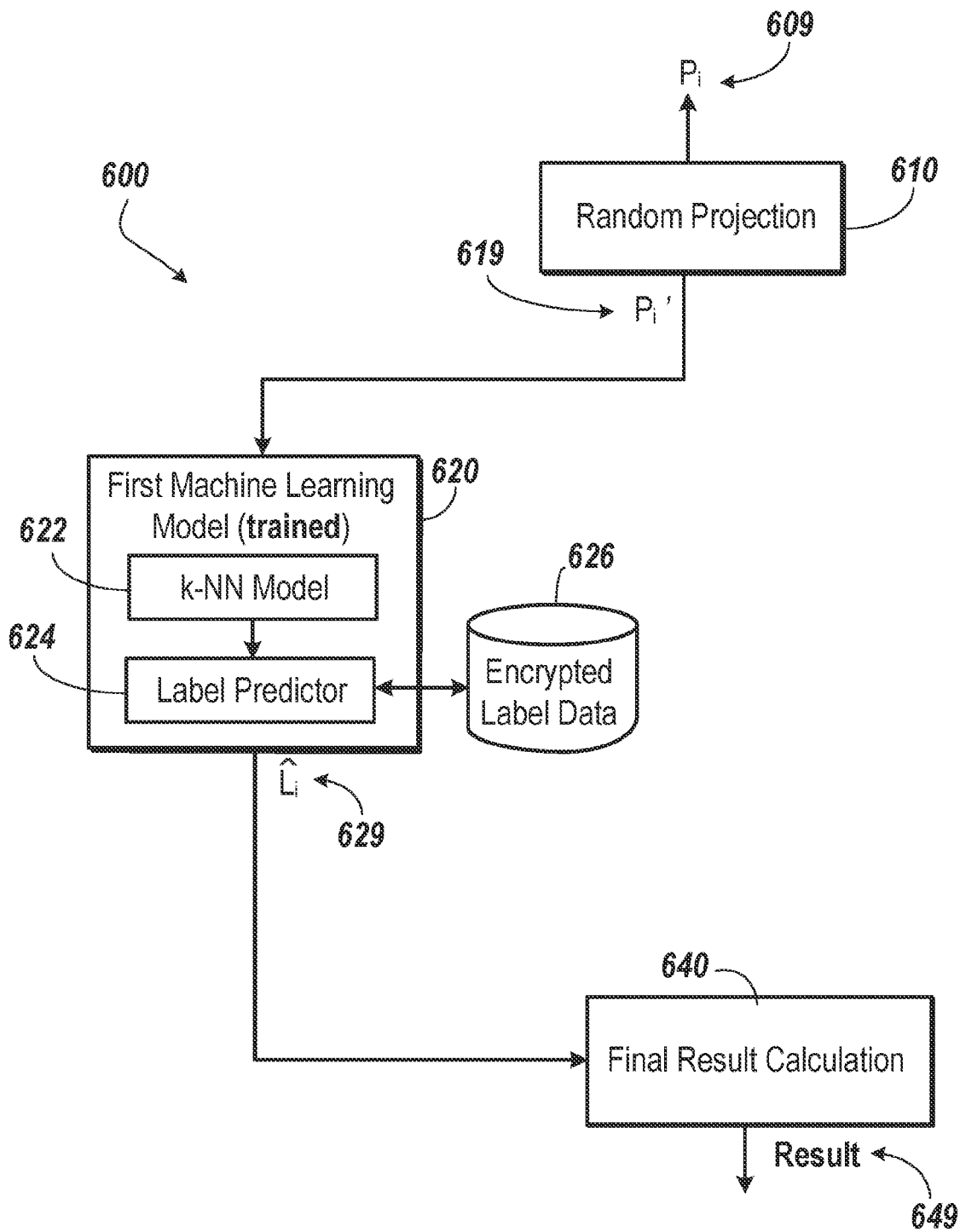
FIG. 6 is a conceptual diagram of an exemplary framework for generating an inference result for a user profile.

FIG. 6 is a conceptual diagram of an exemplary framework for generating an inference result for a user profile in a system 600. More particularly, the diagram depicts random projection logic 610, a first machine learning model 620, and final result calculation logic 640 that collectively make up system 600. In some implementations, the functionality of the system 600 may be provided in a secure and distributed manner by way of multiple computing systems in an MPC cluster. The techniques described in reference to system 600 may, for example, be similar to those which have been described above with reference to FIGS. 2-5. For example, the functionality associated with random projection logic 610 may correspond to that of one or more of the random projection techniques described above with reference to FIGS. 2 and 4. Similarly, in some examples, the first machine learning model 620 may correspond to one or more of the machine learning models described above with reference to FIGS. 2, 4, and 5, such as one or more of those described above in connection with steps 214, 414, and 504. In some examples, encrypted label data set 626, which may be maintained and utilized by the first machine learning model 620 and stored in one or more memory units, can include at least one true label for each user profile used to generate or train, or evaluate the quality of training or fine-tune the process of training the first machine learning model 620, such as those which may be associated with k nearest neighbor profiles as described above with reference to step 506 of FIG. 5. That is, the encrypted label data set 626 may include at least one true label for each of n user profiles, where n is the total number of user profiles that were used to train the first machine learning model 620. For example, the encrypted label data set 626 may include at least one true label ($L_j$) for the $j^{th}$ user profile ($P_j$) in the n user profiles, at least one true label ($L_k$) for the $k^{th}$ user profile ($P_k$) in the n user profiles, at least one true label ($L_l$) for the $l^{th}$ user profile ($P_l$) in the n user profiles, where $1 \leq j$, k, $l \leq n$, and so on. Such true labels, as associated with the user profiles that were used to generate or train the first machine learning model 620 and included as part of the encrypted label data set 626, can be encrypted, e.g., represented as secret shares. Additionally, in some examples, final result calculation logic 640 may correspond to logic employed in connection with performing one or more operations for generating an inference result, such as one or more of those described above with reference to step 218 in FIG. 2. The first machine learning model 620 and final result calculation logic 640 can be configured to employ one or more inference techniques including binary classification, regression, and/or multiclass classification techniques.

In the example of FIG. 6, the system 600 is depicted as performing one or more operations at inference time. Random projection logic 610 can be employed to apply a random projection transformation to a user profile 609 ($P_i$) to obtain a transformed user profile 619 ($P_i'$). The transformed user profile 619, as obtained by employing random projection logic 610, can be in cleartext. For example, random projection logic 610 may be employed at least in part to obfuscate feature vectors, such as feature vectors included or indicated in the user profile 609 and other user profiles, with random noises to protect user privacy.

The first machine learning model 620 can be trained and subsequently leveraged to receive transformed user profile 619 as input and generate at least one predicted label 629 ($\hat{L}_i$) in response thereto. The at least one predicted label 629, as obtained using the first machine learning model 620, can be encrypted. In some implementations, the first machine learning model 620 includes a k-nearest neighbor (k-NN) model 622 and a label predictor 624. In such implementations, the k-NN model 622 can be employed by the first machine learning model 620 to identify a number k of nearest neighbor user profiles that are considered to be most similar to the transformed user profile 619. In some examples, a model other than a k-NN model, such as those rooted in one or more prototype methods, may be employed as model 622. The label predictor 624 can then identify a true label for each of the k nearest neighbor user profiles from among the true labels included in encrypted label data set 626 and determine the at least one predicted label 629 based on the identified labels. In some implementations, the label predictor 624 can apply a softmax function to data that it receives and/or generates in determining the at least one predicted label 629.

For implementations in which the first machine learning model 620 and final result calculation logic 640 are configured to employ regression techniques, the at least one predicted label 629 may correspond to a single label that, for example, represents an integer number, such as a sum of the true labels for the k nearest neighbor user profiles as determined by the label predictor 624. Such a sum of the true labels for the k nearest neighbor user profiles as determined by the label predictor 624 is effectively equivalent to an average of the true labels for the k nearest neighbor user profiles as scaled by a factor of k. Similarly, for implementations in which the first machine learning model 620 and final result calculation logic 640 are configured to employ binary classification techniques, the at least one predicted label 629 may correspond to a single label that, for example, represents an integer number determined by the label predictor 624 based at least in part on such a sum. In the case of binary classification, each of the true labels for the k nearest neighbor user profiles may be a binary value of either zero or one, such that the aforementioned average may be an integer value between zero and one (e.g., 0.3, 0.8, etc.) that, for example, is effectively representative of a predicted probability that the true label for the user profile received as input by the first machine learning model 620 (e.g., transformed user profile 619) is equal to one. Additional detail pertaining to the nature of the at least one predicted label 629 and the ways in which the at least one predicted label 629 may be determined for implementations in which the first machine learning model 620 and final result calculation logic 640 are configured to employ regression techniques, as well as for implementations in which the first machine learning model 620 and final result calculation logic 640 are configured to employ binary classification techniques, are provided below with reference to FIGS. 9-11.

For implementations in which the first machine learning model 620 and final result calculation logic 640 are configured to employ multiclass classification techniques, the at least one predicted label 629 may correspond to a vector or set of predicted labels as determined by the label predictor 624. Each predicted label in such a vector or set of predicted labels may correspond to a respective category and be determined by the label predictor 624 based at least in part on a majority vote or a frequency at which true labels that correspond to the respective category in vectors or sets of true labels for user profiles in the k nearest neighbor user profiles are true labels of a first value (e.g., one), as determined by the label predictor 624. Much like binary classification, in the case of multiclass classification, each true label in each vector or set of true labels for user profiles in the k nearest neighbor user profiles may be a binary value of either zero or one. Additional detail pertaining to the nature of the at least one predicted label 629 and the ways in which the at least one predicted label 629 may be determined for implementations in which the first machine learning model 620 and final result calculation logic 640 are configured to employ multiclass classification techniques are provided below with reference to FIGS. 9-11.

Final result calculation logic 640 can be employed to generate an inference result 649 (Result$_i$) based on the at least one predicted label 629. For example, final result calculation logic 640 can be employed to evaluate the at least one predicted label 629 against one or more thresholds and determine the inference result 649 based on the evaluation results. In some examples, the inference result 649 may be indicative of whether or not a user associated with the user profile 609 is to be added to one or more user groups. In some implementations, the at least one predicted label 629 can be included or otherwise indicated in the inference result 649.

In some implementations, the system 600, as depicted in FIG. 6, can represent a system as implemented by an MPC cluster, such as the MPC cluster 130 of FIG. 1. As such, it is to be understood that, in at least some of these implementations, some or all of the functionality described herein with reference to elements shown in FIG. 6 may be provided in a secure and distributed manner by way of two or more computing systems of an MPC cluster. For example, each of two or more computing systems of an MPC cluster may provide a respective share of the functionality described herein with reference to FIG. 6. In this example, the two or more computing systems may operate in parallel to implement selected secret share algorithms so as to collaboratively perform operations similar or equivalent to those described herein with reference to FIG. 6. In at least some of the aforementioned implementations, the user profile 609 may represent a share of a user profile. In such implementations, one or more of the other pieces of data or quantities described herein with reference to FIG. 6 may also be representative of secret shares thereof. It is to be understood that, in providing the functionality described herein with reference to FIG. 6, additional operations may be performed by the two or more computing systems for the purposes of protecting user privacy. Examples of one or more of the aforementioned implementations are described in further detail below, for example, with reference to FIG. 12, and elsewhere herein. In general, "shares" as described below and elsewhere herein may, in at least some implementations, correspond to secret shares.

While the training process for k-NN models, such as k-NN model 622, may be relatively fast and simple in that no knowledge of labels is required, the quality of such models can, in some situations, leave room for improvement. As such, in some implementations, one or more of the systems and techniques described in further detail below may be leveraged to boost the performance of the first machine learning model 620.

Figure 7:
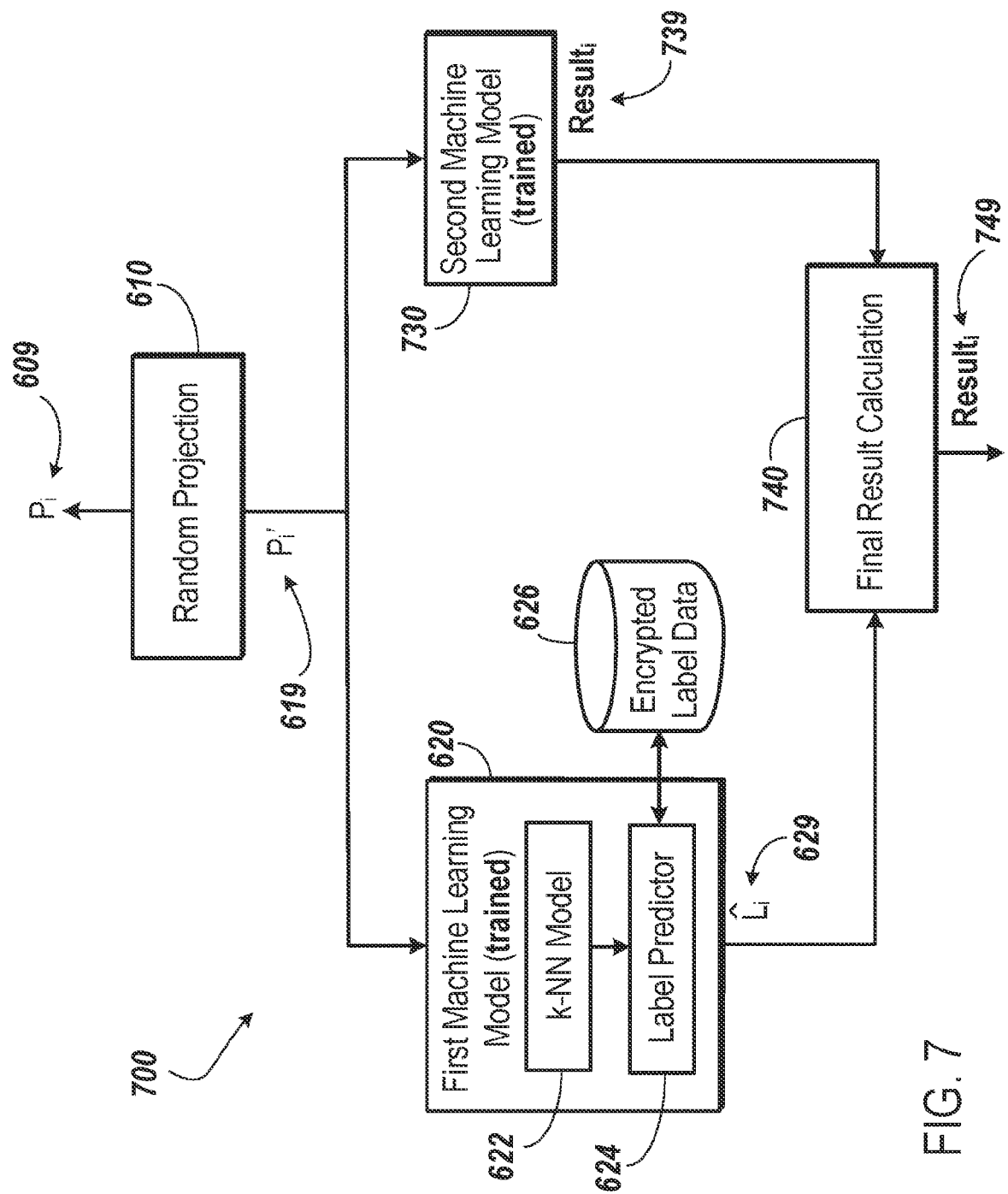
FIG. 7 is a conceptual diagram of an exemplary framework for generating an inference result for a user profile with boosted performance.

FIG. 7 is a conceptual diagram of an exemplary framework for generating an inference result for a user profile with boosted performance in a system 700. In some implementations, one or more of elements 609-629 as depicted in FIG. 7 may be similar or equivalent to one or more of elements 609-629 as described above with reference to FIG. 6, respectively. Much like the system 600, the system 700 includes random projection logic 610 and first machine learning model 620, and is depicted as performing one or more operations at inference time.

However, unlike system 600, the system 700 further includes a second machine learning model 730 that is trained and subsequently leveraged to boost the performance of the first machine learning model 620 by receiving transformed user profile 619 as input and generating, as output, a predicted residue value 739 (Residue$_i$) that is indicative of a predicted amount of error in the at least one predicted label 629. The predicted residue value 739, as obtained using the second machine learning model 730, can be in cleartext. Final result calculation logic 740, which is included in the system 700 in place of final result calculation logic 640, can be employed to generate inference result 749 (Result$_i$) based on the at least one predicted label 629 and based further on the predicted residue value 739. Given that the predicted residue value 739 is indicative of a predicted amount of error in the at least one predicted label 629, relying upon the at least one predicted label 629 and in tandem with the predicted residue value 739 may enable final result calculation logic 740 to effectively offset or counteract at least some of the error that may be expressed in the at least one predicted label 629, thereby enhancing one or both of the accuracy and reliability of the inference result 749 that is produced by the system 700.

For instance, final result calculation logic 740 can be employed to compute a sum of the at least one predicted label 629 and the predicted residue value 739. In some examples, final result calculation logic 740 can be further employed to evaluate such a computed sum against one or more thresholds and determine the inference result 749 based on the results of the evaluation. In some implementations, such a computed sum of the at least one predicted label 629 and the predicted residue value 739 can be included or otherwise indicated in the inference result 649 in FIG. 6 or 749 in FIG. 7.

The second machine learning model 730 may include or correspond to one or more of a deep neural network (DNN), a gradient-boosting decision tree, and a random forest model. That is, the first machine learning model 620 and the second machine learning model 730 may architecturally differ from one another. In some implementations, the second machine learning model 730 can be trained using one or more gradient boosting algorithms, one or more gradient descent algorithms, or a combination thereof.

The second machine learning model 730 can be trained using the same set of user profiles that were used to train the first machine learning model 620 and data indicating differences between the true labels for such a set of user profiles and predicted labels for such a set of user profiles as determined using the first machine learning model 620. As such, the process of training the second machine learning model 730 is performed after at least a portion of the process of training the first machine learning model 620 is performed. The data that is used for training the second machine learning model 730, such as data indicating differences between predicted labels determined using the first machine learning model 620 and true labels, may be generated or otherwise obtained through a process of evaluating the performance of the first machine learning model 620 as trained. An example of such a process is described in further detail below with reference to FIGS. 10-11.

As mentioned above, random projection logic 610, as included in systems 600 and 700, may be employed at least in part to obfuscate feature vectors, such as feature vectors included or indicated in the user profile 609 and other user profiles, with random noises to protect user privacy. To enable machine learning training and prediction, the random projection transformation that is applied by way of random projection logic 610 needs to preserve some notion of distance among feature vectors. One example of a random projection technique that can be employed in random projection logic 610 includes the SimHash technique. This technique and others described above can serve to obfuscate feature vectors while preserving the cosine distance between such feature vectors.

While the preservation of cosine distance between feature vectors may prove sufficient for training and using k-NN models, such as the k-NN model 622 of the first machine learning model 620, it may be less ideal for training and using other types of models, such as one or more models of the second machine learning model 730. As such, in some implementations, it may be desirable to employ a random projection technique in random projection logic 610 that can serve to obfuscate feature vectors while preserving the Euclidean distance between such feature vectors. One example of such a random projection technique includes the Johnson-Lindenstrauss (J-L) technique or transformation.

As mentioned above, one property of the J-L transformation is that it preserves the Euclidean distance between feature vectors with probability. In addition, the J-L transformation is lossy, non-reversible, and incorporates random noise. As such, even if two or more servers or computing systems of an MPC cluster were to collude, they would not be able to obtain an exact reconstruction of an original user profile ($P_i$) from a transformed version of the user profile ($P_i'$) obtained using the J-L transformation technique. In this way, employing the J-L transformation technique for purposes of transforming user profiles in one or more of the systems described herein may serve to provide user privacy protection. Furthermore, the J-L transformation technique can be used as a dimension reduction technique. As such, one advantageous byproduct of employing the J-L transformation technique for purposes of transforming user profiles in one or more of the systems described herein is that it may actually serve to significantly increase the speed at which subsequent processing steps can be performed by such systems.

In general, given an arbitrarily small $\epsilon>0$, there exists a J-L transformation that can be applied to transform $P_i$ to $P_i'$, $P_j$ to $P_j'$ for arbitrary $1 \leq i, j \leq n$, where n is the number of training examples, and:

$$(1-\epsilon) \times |P_i-P_j|^2 \leq |P_i'-P_j'|^2 \leq (1+\epsilon) \times |P_i-P_j|^2$$

That is, applying the J-L transformation may change the Euclidean distance between the two arbitrarily selected training examples by no more than a small fraction $\epsilon$. For at least the foregoing reasons, in some implementations, the J-L transformation technique may be employed in random projection logic 610 as described herein.

In some implementations, the system 700, as depicted in FIG. 7, can represent a system as implemented by an MPC cluster, such as the MPC cluster 130 of FIG. 1. As such, it is to be understood that, in at least some of these implementations, some or all of the functionality described herein with reference to elements shown in FIG. 7 may be provided in a secure and distributed manner by way of two or more computing systems of an MPC cluster. For example, each of two or more computing systems of an MPC cluster may provide a respective share of the functionality described herein with reference to FIG. 7. In this example, the two or more computing systems may operate in parallel to implement selected secret share algorithms so as to collaboratively perform operations similar or equivalent to those described herein with reference to FIG. 7. In at least some of the aforementioned implementations, the user profile 609 may represent a secret share of a user profile. In such implementations, one or more of the other pieces of data or quantities described herein with reference to FIG. 7 may also be representative of secret shares thereof. It is to be understood that, in providing the functionality described herein with reference to FIG. 7, additional operations may be performed by the two or more computing systems for the purposes of protecting user privacy. Examples of one or more of the aforementioned implementations are described in further detail below, for example, with reference to FIG. 12, and elsewhere herein.

Figure 8:
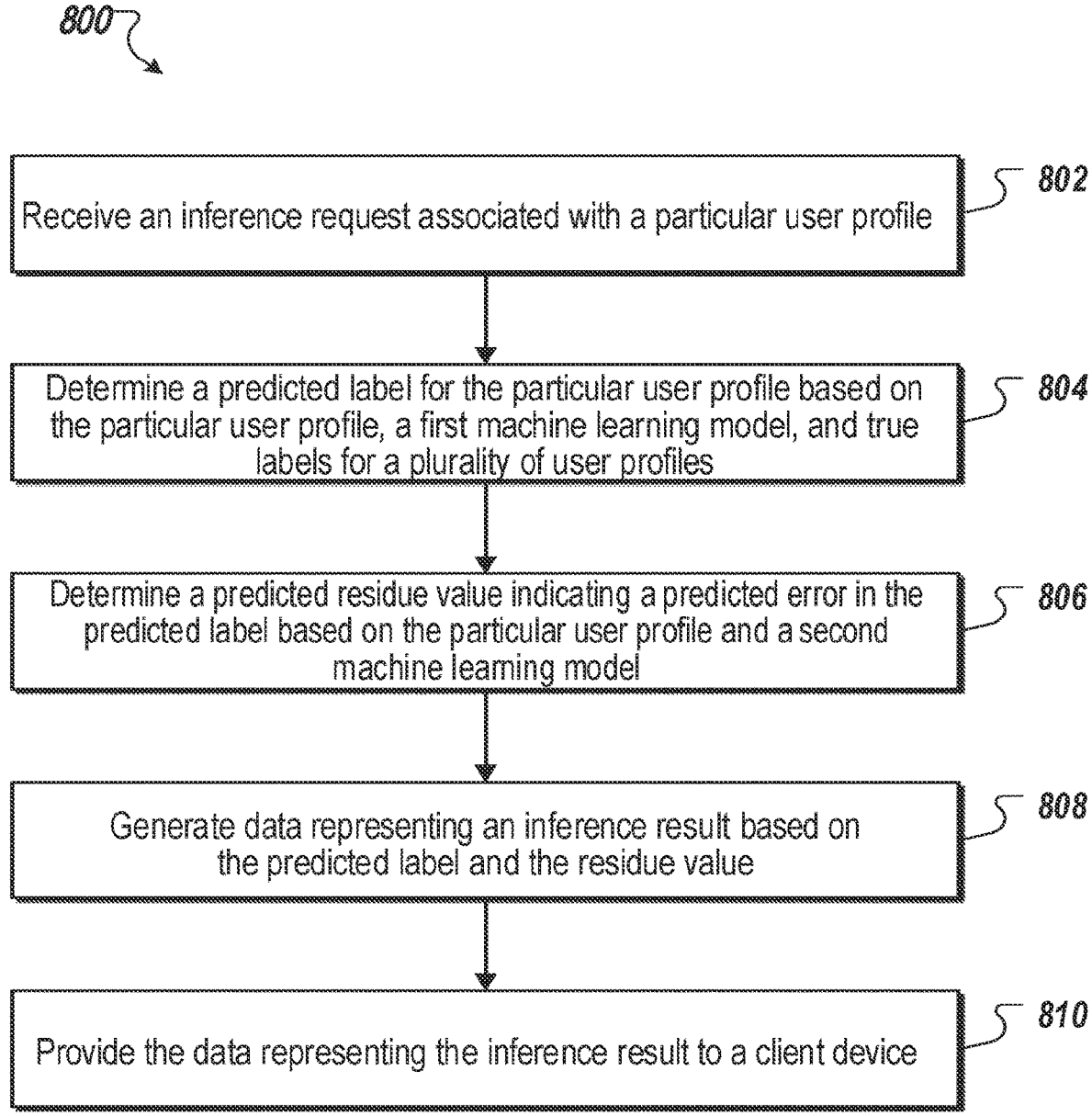
FIG. 8 is a flow diagram that illustrates an example process for generating an inference result for a user profile with boosted performance at an MPC cluster.

FIG. 8 is a flow diagram that illustrates an example process 800 for generating an inference result for a user profile with boosted performance at an MPC cluster. One or more of the operations described with reference to FIG. 8 may, for example, be performed at inference time. Operations of the process 800 can be implemented, for example, by an MPC cluster, such as the MPC cluster 130 of FIG. 1, and can also correspond to one or more of the operations described above with reference to FIG. 7. One or more of the operations described with reference to FIG. 8 may, for example, be performed at inference time.

In some implementations, some or all of the functionality described herein with reference to elements shown in FIG. 8 may be provided in a secure and distributed manner by way of two or more computing systems of an MPC cluster, such as the MPC cluster 130 of FIG. 1. For example, each of two or more computing systems of an MPC cluster may provide a respective share of the functionality described herein with reference to FIG. 8. In this example, the two or more computing systems may operate in parallel to implement selected secret share algorithms so as to collaboratively perform operations similar or equivalent to those described herein with reference to FIG. 8. It is to be understood that, in providing the functionality described herein with reference to FIG. 8, additional operations may be performed by the two or more computing systems for the purposes of protecting user privacy. Examples of one or more of the aforementioned implementations are described in further detail below, for example, with reference to FIG. 12, and elsewhere herein. Operations of the process 800 can also be implemented as instructions stored on one or more computer readable media which may be non-transitory, and execution of the instructions by one or more data processing apparatus can cause the one or more data processing apparatus to perform the operations of the process 800.

The MPC cluster receives an inference request associated with a particular user profile (802). For example, this may correspond to one or more operations that are similar or equivalent to one or more operations that are performed in connection with the MPC cluster 130 receiving an inference request from the application 112, as described above with reference to FIG. 1.

The MPC cluster determines a predicted label for the particular user profile based on the particular user profile, a first machine learning model trained using a plurality of user profiles, and one or more of a plurality of true labels for the plurality of user profiles (804). The label, as described herein, can be, or include, a demographic-based user group identifier or demographic features. For example, this may correspond to one or more operations that are similar or equivalent to one or more operations that are performed in connection with the first machine learning model 620 being utilized to obtain at least one predicted label 629 ($\hat{L}_i$), as described above with reference to FIGS. 6-7.

In this example, the plurality of true labels for the plurality of user profiles may correspond to true labels that are included as part of encrypted label data 626, which are the true labels for the plurality of user profiles that were used to train the first machine learning model 620. The one or more true labels, from among the plurality of true labels, on which the determination of the predicted label for the particular user profile is based, for instance, may include at least one true label for each of k nearest neighbor user profiles identified by way of the k-NN model 622 of the first machine learning model 620. In some examples, each of the plurality of true labels is encrypted, as is the case in the examples of FIGS. 6-7. Some of the various ways in which true labels for k nearest neighbor user profiles can be leveraged to determine predicted labels are described in detail above. As made evident in the above, the way or manner in which such true labels are leveraged to determine predicted labels may at least in part depend on the type(s) of inference technique(s) that are employed (e.g., regression techniques, binary classification techniques, multiclass classification techniques, etc.).

The MPC cluster determines a predicted residue value indicating a predicted error in the predicted label based on the particular user profile and a second machine learning model trained using the plurality of user profiles and data indicating differences between the plurality of true labels for the plurality of user profiles and a plurality of predicted labels as determined for the plurality of user profiles using the first machine learning model (806). For example, this may correspond to one or more operations that are similar or equivalent to one or more operations that are performed in connection with the second machine learning model 730 being utilized to obtain predicted residue value 739 (Residue$_i$), as described above with reference to FIG. 7. As such, in some implementations, the second machine learning model includes at least one of a deep neural network, a gradient-boosting decision tree, and a random forest model.

The MPC cluster generates data representing an inference result based on the predicted label and the predicted residue value (808). For example, this may correspond to one or more operations that are similar or equivalent to one or more operations that are performed in connection with final result calculation logic 740 being employed to generate an inference result 749 (Result$_i$), as described above with reference to FIG. 7. As such, in some examples, the inference result includes or corresponds to a sum of the predicted label and the predicted residue value.

The MPC cluster provides the data representing the inference result to a client device (810). For example, this may correspond to one or more operations that are similar or equivalent to one or more operations that are performed in connection with the MPC cluster 130 providing an inference result to the client device 110 on which the application 112 runs, as described above with reference to FIGS. 1-2.

In some implementations, the process 800 further includes one or more operations in which the MPC cluster applies a transformation to the particular user profile to obtain a transformed version of the particular user profile. In these implementations, to determine the predicted label, the MPC cluster determines the predicted label based at least in part on the transformed version of the particular user profile.

For example, this may correspond to one or more operations that are similar or equivalent to one or more operations that are performed in connection with random projection logic 610 being employed to apply a random projection transformation to the user profile 609 (P$_i$) to obtain the transformed user profile 619 (P$_i$'), as described above with reference to FIGS. 6-7. As such, in some examples, the aforementioned transformation may be a random projection. Furthermore, in at least some of these examples, the aforementioned random projection may be a Johnson-Lindenstrauss (J-L) transformation. In at least some of the aforementioned implementations, to determine the predicted label, the MPC cluster provides the transformed version of the particular user profile as input to the first machine learning model to obtain the predicted label for the particular user profile as output. For example, this may correspond to one or more operations that are similar or equivalent to one or more operations that are performed in connection with the first machine learning model 620 receiving transformed user profile 619 (P$_i$') as input and generating at least one predicted label 629 ($\hat{L}_i$) in response thereto, as described above with reference to FIGS. 6-7.

As mentioned above, in some implementations, the first machine learning model includes a k-nearest neighbor model. In at least some of these implementations, to determine the predicted label, the MPC cluster identifies a number k of nearest neighbor user profiles that are considered most similar to the particular user profile among the plurality of user profiles based at least in part on the particular user profile and the k-nearest neighbor model, and determines the predicted label based at least in part on a true label for each of the k nearest neighbor user profiles. In some such implementations, to determine the predicted label based at least in part on a true label for each of the k nearest neighbor user profiles, the MPC cluster determines a sum of the true labels for the k nearest neighbor user profiles. For example, this may correspond to one or more operations that are similar or equivalent to one or more operations that are performed in connection with the first machine learning model 620 being utilized to obtain at least one predicted label 629 ($\hat{L}_i$) in one or more implementations where one or more regression and/or binary classification techniques are employed, as described above with reference to FIGS. 6-7. In some examples, the predicted label includes or corresponds to the sum of the true labels for the k nearest neighbor user profiles.

In some of the aforementioned implementations, to determine the predicted label based at least in part on the true label for each of the k nearest neighbor user profiles, the MPC cluster determines a set of predicted labels based at least in part on a set of true labels for each of the k nearest neighbor user profiles corresponding to a set of categories, respectively, and, to determine the set of predicted labels, the MPC cluster performs operations for each category in the set. Such operations can include one or more operations in which the MPC cluster determines a majority vote or a frequency at which true labels that correspond to the category in the sets of true labels for user profiles in the k nearest neighbor user profiles are true labels of a first value. For example, this may correspond to one or more operations that are similar or equivalent to one or more operations that are performed in connection with the first machine learning model 620 being utilized to obtain at least one predicted label 629 ($\hat{L}_i$) in one or more implementations where one or more multiclass classification techniques are employed, as described above with reference to FIGS. 6-7.

Figure 9:
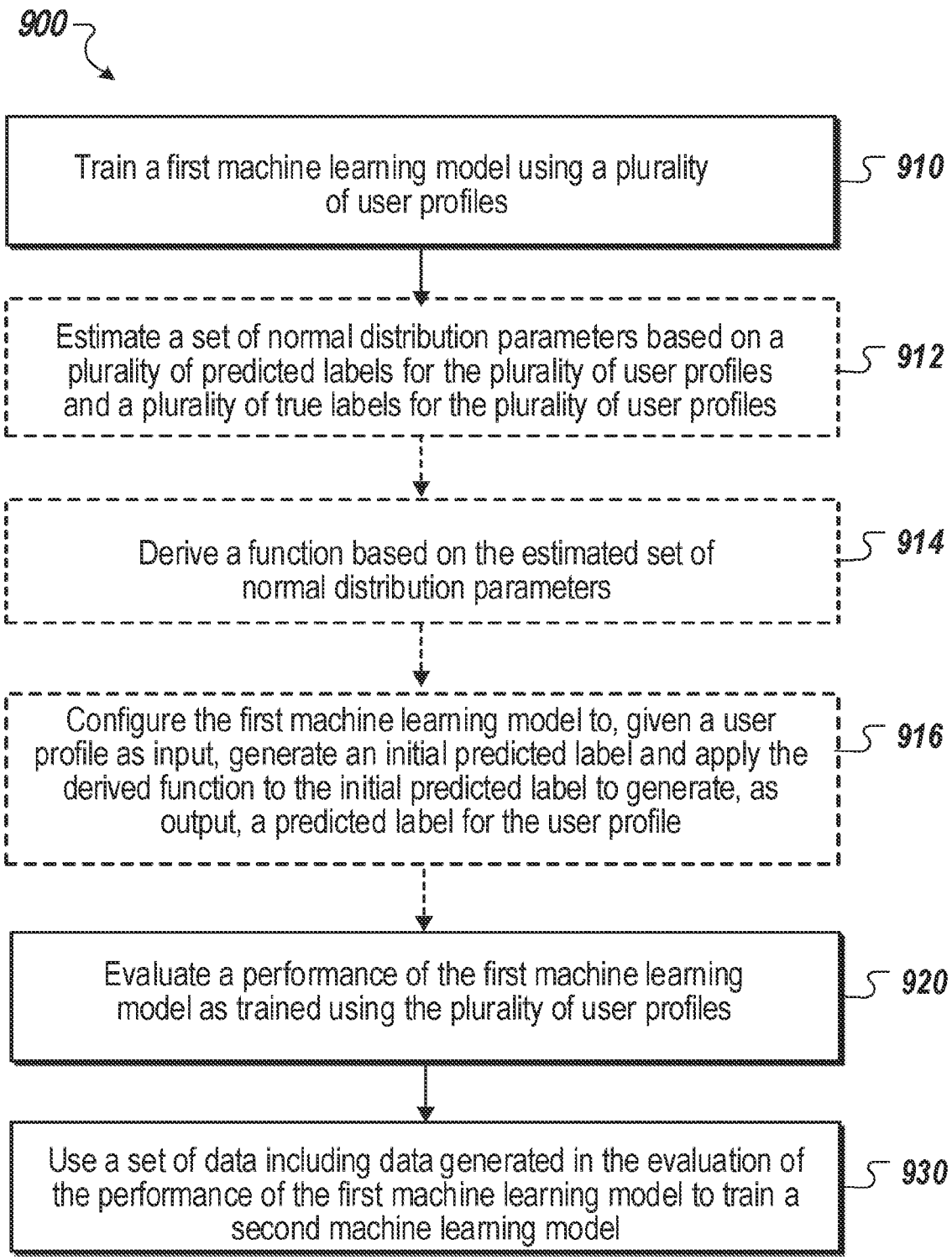
FIG. 9 is a flow diagram that illustrates an example process for preparing for and carrying out a training of a second machine learning model for boosting inference performance at an MPC cluster.

FIG. 9 is a flow diagram that illustrates an example process 900 for preparing for and carrying out a training of a second machine learning model for boosting inference performance at an MPC cluster. Operations of the process 900 can be implemented, for example, by an MPC cluster, such as the MPC cluster 130 of FIG. 1, and can also correspond to one or more of the operations described above with reference to FIGS. 2, 4, 6, and 7. In some implementations, some or all of the functionality described herein with reference to elements shown in FIG. 9 may be provided in a secure and distributed manner by way of two or more computing systems of an MPC cluster, such as the MPC cluster 130 of FIG. 1. For example, each of two or more computing systems of an MPC cluster may provide a respective secret share of the functionality described herein with reference to FIG. 9. In this example, the two or more computing systems may operate in parallel to implement selected secret share algorithms so as to collaboratively perform operations similar or equivalent to those described herein with reference to FIG. 9. It is to be understood that, in providing the functionality described herein with reference to FIG. 9, additional operations may be performed by the two or more computing systems for the purposes of protecting user privacy. Examples of one or more of the aforementioned implementations are described in further detail below, for example, with reference to FIG. 12, and elsewhere herein. Operations of the process 900 can also be implemented as instructions stored on one or more computer readable media which may be non-transitory, and execution of the instructions by one or more data processing apparatus can cause the one or more data processing apparatus to perform the operations of the process 900.

The MPC cluster trains a first machine learning model using a plurality of user profiles (910). For example, the first machine learning model may correspond to the first machine learning model 620, as described above. Similarly, the plurality of user profiles that are used in the training of the first machine learning model may correspond to a number n user profiles that are used to train the first machine learning model 620, the true labels for which may be included in the encrypted label data set 626, as described above. The label, as described herein, can be, or include, a user group identifier or demographic features.

The MPC cluster evaluates a performance of the first machine learning model as trained using the plurality of user profiles (920). Additional details pertaining to what such an evaluation may entail are provided below with reference to FIGS. 10-11.

In some implementations, data generated in such an evaluation can be utilized by the MPC cluster or another system in communication with the MPC cluster to determine whether or not the performance of the first machine learning model, such as the first machine learning model 620, warrants boosting, for example, by way of a second machine learning model, such as the second machine learning model 730. Examples of data generated in such an evaluation that can be utilized in this way are described in further detail below with reference to the profile and residue data set 1070 of FIG. 10 and step 1112 of FIG. 11.

For instance, in some situations, the MPC cluster or another system in communication with the MPC cluster may determine, based on data generated in such an evaluation, that performance (e.g., prediction accuracy) of the first machine learning model satisfies one or more thresholds, and thus does not warrant boosting. In such situations, the MPC cluster may refrain from training and implementing a second machine learning model based on this determination.

However, in other situations, the MPC cluster or another system in communication with the MPC cluster may determine, based on data generated in such an evaluation, that performance (e.g., prediction accuracy) of the first machine learning model satisfies one or more thresholds, and thus does warrant boosting. In these situations, the MPC cluster may receive an upgrade in functionality comparable to that which would be gained in transitioning from the system 600 to the system 700, as described above with reference to FIGS. 6-7, based on this determination. To receive such an upgrade in functionality, the MPC cluster may proceed with training and implementing a second machine learning model, such as the second machine learning model 730, for boosting the performance of the first machine learning model. In some examples, data generated in such an evaluation may additionally or alternatively be provided to one or more entities associated with the MPC cluster. In some such examples, the one or more entities may make their own determinations regarding whether or not the performance of the first machine learning model warrants boosting, and proceed accordingly. Other configurations are possible.

The MPC cluster uses a set of data including data generated in the evaluation of the performance of the first machine learning model to train a second machine learning model (930). Examples of such data can include that which is described below with reference to the profile and residue data set 1070 of FIG. 10 and step 1112 of FIG. 11.

In some implementations, the process 900 further includes additional steps 912-916, which are described in further detail below. In such implementations, steps 912-916 are performed prior to steps 920 and 930, but can be performed after step 910.

Figure 10:
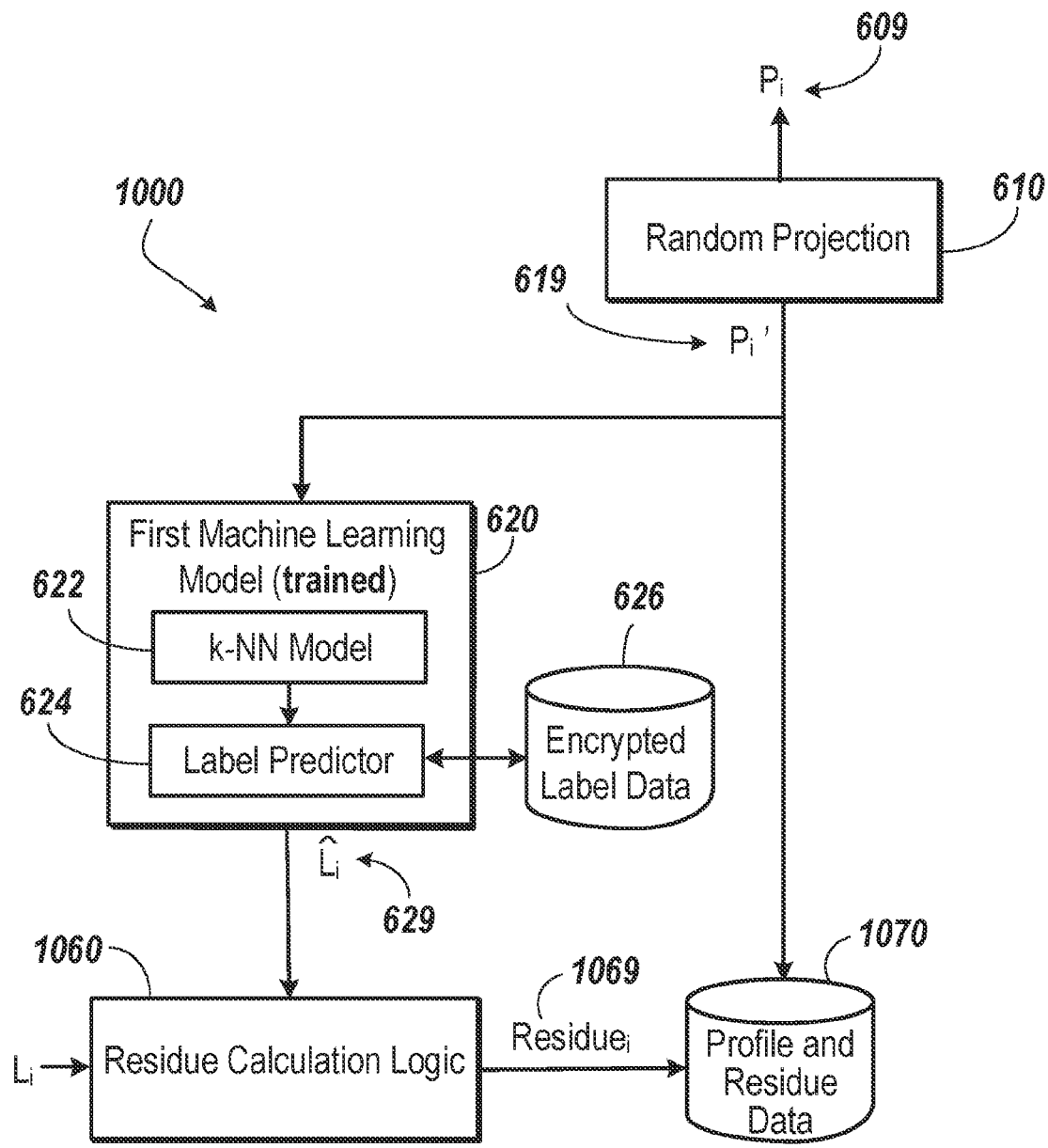
FIG. 10 is a conceptual diagram of an exemplary framework for evaluating a performance of a first machine learning model.

FIG. 10 is a conceptual diagram of an exemplary framework for evaluating a performance of a first machine learning model in a system 1000. In some implementations, one or more of elements 609-629 as depicted in FIG. 10 may be similar or equivalent to one or more of elements 609-629 as described above with reference to FIG. 6-7, respectively. In some examples, one or more of the operations described herein with reference to FIG. 10 may correspond to one or more of those described above with reference to step 920 of FIG. 9. Much like the systems 600 and 700, the system 1000 includes random projection logic 610 and first machine learning model 620.

However, unlike systems 600 and 700, the system 1000 further includes residue calculation logic 1060. Also, in the example of FIG. 10, the user profile 609 ($P_i$) corresponds to one of the plurality of user profiles that were used to train the first machine learning model 620, whereas, in the examples of FIGS. 6 and 7, the user profile 609 ($P_i$) might not necessarily correspond to one of the plurality of user profiles that were used to train the first machine learning model 620, but instead simply correspond to a user profile that is associated with an inference request received at inference time. The aforementioned plurality of user profiles that were used to train the first machine learning model 620 can, in some examples, correspond to the plurality of user profiles described above with reference to step 910 of FIG. 9. Residue calculation logic 1060 can be employed to generate a residue value 1069 ($Residue_i$) that is indicative of an amount of error in the at least one predicted label 629 based on the at least one predicted label 629 and at least one true label 1059 ($L_i$). The label, as described herein, can be, or include, a demographic-based user group identifier or demographic features. Both the at least one predicted label 629 ($\hat{L}_i$) and the at least one true label 1059 ($L_i$) can be encrypted.

For example, residue calculation logic 1060 can employ secret shares to calculate a difference in value between the at least one predicted label 629 and the at least one true label 1059. In some implementations, the residue value 1069 may correspond to the aforementioned difference in value.

The residue value 1069 can be stored in association with the transformed user profile 619, for example, in memory as part of the profile and residue data set 1070. In some examples, data included in the profile and residue data set 1070 may correspond to one or both of data as described above with reference to step 930 of FIG. 9 and data as described below with reference to step 1112 of FIG. 11. In some implementations, the residue values 1069 are in the form of secret shares to protect user privacy and data security.

In some implementations, the system 1000, as depicted in FIG. 10, can represent a system as implemented by an MPC cluster, such as the MPC cluster 130 of FIG. 1. As such, it is to be understood that, in at least some of these implementations, some or all of the functionality described herein with reference to elements shown in FIG. 10 may be provided in a secure and distributed manner by way of two or more computing systems of an MPC cluster. For example, each of two or more computing systems of an MPC cluster may provide a respective share of the functionality described herein with reference to FIG. 10. In this example, the two or more computing systems may operate in parallel to implement selected secret share algorithms so as to collaboratively perform operations similar or equivalent to those described herein with reference to FIG. 10. In at least some of the aforementioned implementations, the user profile 609 may represent a secret share of a user profile. In such implementations, one or more of the other pieces of data or quantities described herein with reference to FIG. 10 may also be representative of secret shares thereof. It is to be understood that, in providing the functionality described herein with reference to FIG. 10, additional operations may be performed by the two or more computing systems for the purposes of protecting user privacy. Examples of one or more of the aforementioned implementations are described in further detail below, for example, with reference to FIG. 12, and elsewhere herein.

Figure 11:
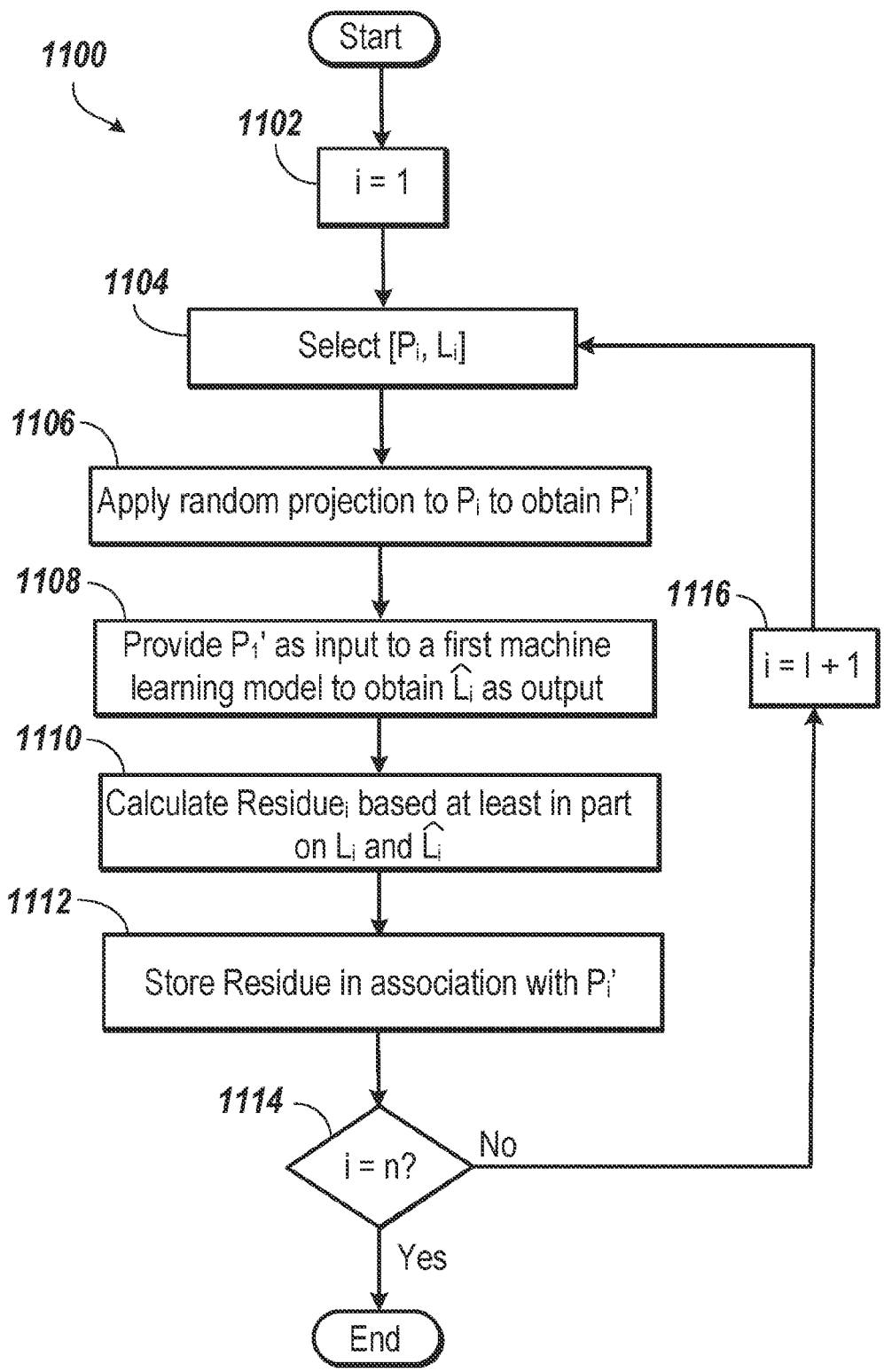
FIG. 11 is a flow diagram that illustrates an example process for evaluating a performance of a first machine learning model at an MPC cluster.

FIG. 11 is a flow diagram that illustrates an example process 1100 for evaluating a performance of a first machine learning model at an MPC cluster. Operations of the process 1100 can be implemented, for example, by an MPC cluster, such as the MPC cluster 130 of FIG. 1, and can also correspond to one or more of the operations described above with reference to FIGS. 9-10. In some examples, one or more of the operations described herein with reference to FIG. 11 may correspond to one or more of those described above with reference to step 920 of FIG. 9. In some implementations, some or all of the functionality described herein with reference to elements shown in FIG. 11 may be provided in a secure and distributed manner by way of two or more computing systems of an MPC cluster, such as the MPC cluster 130 of FIG. 1. For example, each of two or more computing systems of an MPC cluster may provide a respective share of the functionality described herein with reference to FIG. 11. In this example, the two or more computing systems may operate in parallel to implement selected secret share algorithms so as to collaboratively perform operations similar or equivalent to those described herein with reference to FIG. 11. It is to be understood that, in providing the functionality described herein with reference to FIG. 11, additional operations may be performed by the two or more computing systems for the purposes of protecting user privacy. Examples of one or more of the aforementioned implementations are described in further detail below, for example, with reference to FIG. 12, and elsewhere herein. Operations of the process 1100 can also be implemented as instructions stored on one or more computer readable media which may be non-transitory, and execution of the instructions by one or more data processing apparatus can cause the one or more data processing apparatus to perform the operations of the process 1100.

The MPC cluster selects the $i^{th}$ user profile and at least one corresponding true label ($[P_i, L_i]$), where i is initially set to a value of one (1102-1104) and incremented through recursion until i equals n (1114-1116), where n is the total number of user profiles that were used to train the first machine learning model. A label can be, or include, a demographic-based user group identifier or demographic features. In other words, the process 1100 includes performing steps 1106-1112, as described below, for each of the n user profiles that were used to train the first machine learning model.

In some implementations, the $i^{th}$ user profile may represent a secret share of a user profile. In such implementations, one or more of the other pieces of data or quantities described herein with reference to FIG. 11 may also be representative of shares thereof.

The MPC cluster applies a random projection to the $i^{th}$ user profile ($P_i$) to obtain a transformed version of the $i^{th}$ user profile ($P_i'$) (1106). For example, this may correspond to one or more operations that are similar or equivalent to one or more operations that are performed in connection with random projection logic 610 being employed to apply a random projection transformation to the user profile 609 ($P_i$) to obtain the transformed user profile 619 ($P_i'$), as described above with reference to FIG. 10.

The MPC cluster provides the transformed version of the $i^{th}$ user profile ($P_i'$) as input to a first machine learning model to obtain at least one predicted label ($\widehat{L}_i$) for the transformed version of $i^{th}$ user profile ($P_i'$) as output (1108). For example, this may correspond to one or more operations that are similar or equivalent to one or more operations that are performed in connection with the first machine learning model 620 receiving transformed user profile 619 ($P_i'$) as input and generating at least one predicted label 629 ($\widehat{L}_i$) in response thereto, as described above with reference to FIG. 10.

The MPC cluster calculates a residue value ($Residue_i$) based at least in part on at least one true label ($L_i$) for the $i^{th}$ user profile ($P_i$) and the at least one predicted label ($\widehat{L}_i$) (1110). For example, this may correspond to one or more operations that are similar or equivalent to one or more operations that are performed in connection with residue calculation logic 1060 being employed to calculate residue value 1069 ($Residue_i$) based at least in part on at least one true label 1059 ($L_i$) and the at least one predicted label 629 ($\widehat{L}_i$), as described above with reference to FIG. 10.

The MPC cluster stores the calculated residue value ($Residue_i$) in association with the transformed version of $i^{th}$ user profile ($P_i'$) (1112). For example, this may correspond to one or more operations that are similar or equivalent to one or more operations that are performed in connection with residue value 1069 ($Residue_i$) being stored in association with the transformed user profile 619 ($P_i'$), for example, in memory as part of the profile and residue data set 1070, as described above with reference to FIG. 10. In some examples, this data may correspond to data as described above with reference to step 930 of FIG. 9. As such, in these examples, some or all of the data that is stored in this step may be leveraged as data for training a second machine learning model, such as the second machine learning model 730.

Referring once again to steps 1108-1110, for at least some implementations in which the first machine learning model is configured to employ regression techniques, the at least one predicted label ($\widehat{L}_i$) that the MPC cluster obtains at step 1108 can correspond to a single predicted label representing an integer number. In these implementations, the residue value (Residue$_i$) that the MPC cluster calculates at step 1110 can correspond to an integer number indicative of a difference in value between the at least one true label ($L_i$) and the at least one predicted label ($\widehat{L}_i$). In at least some of the aforementioned implementations, at step 1108, the first machine learning model identifies a number k of nearest neighbor user profiles that are considered to be most similar to the transformed version of $i^{th}$ user profile ($P_i'$), identifies at least one true label for each of the k nearest neighbor user profiles, calculates a sum of the true labels for the k nearest neighbor user profiles, and uses this sum as the at least one predicted label ($\widehat{L}_i$). As mentioned above, such a sum of the true labels for the k nearest neighbor user profiles as determined in this step is effectively equivalent to an average of the true labels for the k nearest neighbor user profiles as scaled by a factor of k. In some examples, this sum may be utilized as the at least one predicted label ($\widehat{L}_i$) instead of the average of the true labels for the k nearest neighbor user profiles such that a division operation need not be performed. Given that the at least one predicted label ($\widehat{L}_i$) is effectively equivalent to an average of the true labels for the k nearest neighbor user profiles as scaled by a factor of k, for at least some implementations in which the first machine learning model is configured to employ regression techniques, the calculation that is performed by the MPC cluster at step 1110 is given by:

$$\text{Residue}_i = kL_i - \widehat{L}_i$$

Similarly, for at least some implementations in which the first machine learning model is configured to employ binary classification techniques, the at least one predicted label ($\widehat{L}_i$) that the MPC cluster obtains at step 1108 can correspond to a single predicted label that, for example, represents an integer number determined based at least in part on a sum of the true labels for the k nearest neighbor user profiles. As mentioned above with reference to implementations in which the first machine learning model is configured to employ regression techniques, such a sum of the true labels for the k nearest neighbor user profiles is effectively equivalent to an average of the true labels for the k nearest neighbor user profiles as scaled by a factor of k.

However, unlike implementations where the first machine learning model is configured to employ regression techniques, in implementations where the first machine learning model is configured to employ binary classification techniques, each of the true labels for the k nearest neighbor user profiles may be a binary value of either zero or one, such that the aforementioned average may be an integer value between zero and one (e.g., 0.3, 0.8, etc.). Although the MPC cluster could, in implementations where binary classification techniques are employed, calculate and use the sum of the true labels for the k nearest neighbor user profiles (sum_of_labels) as the at least one predicted label ($\widehat{L}_i$) at step 1108, and use the formula described above with reference to implementations where regression techniques are employed (Residue$_i$=$kL_i - \widehat{L}_i$) to obtain a residue value (Residue$_i$) at step 1110 that is mathematically viable, such a residue value (Residue$_i$) may potentially pose privacy concerns, for instance, later on when used to determine whether boosting the first machine learning model is warranted or later on when used to train a second machine learning model such as the second machine learning model 730. More specifically, because each of the true labels for the k nearest neighbor user profiles may be a binary value of either zero or one, in implementations where binary classification techniques are employed, the sign of such a residue value (Residue$_i$) may potentially be indicative of the value of the at least one true label ($L_i$), and thus may potentially be inferred by one or more systems and/or entities that may handle data indicating residue value (Residue$_i$) in some capacity at or subsequent to step 1112.

For instance, consider a first example where binary classification techniques are to be employed and $L_i$=1, k=15, and $\widehat{L}_i$=12. In this first example, the at least one predicted label ($\widehat{L}_i$) corresponds to the sum of the true labels for the k nearest neighbor user profiles (sum_of_labels), which is effectively equivalent to an average of the true labels for the k nearest neighbor user profiles as scaled by a factor of k, where the aforementioned average is a non-integer value of 0.8. If the same formula as described above (Residue$_i$=$kL_i - \widehat{L}_i$) was to be utilized in this first example to calculate the residue value (Residue$_i$), e.g., at step 1110, then the residue value (Residue$_i$) in this first example would be given by: Residue$_i$=(15)(1)–12=3. Thus, in this first example, the residue value (Residue$_i$) would be equal to a value of (positive) 3. Now, consider a second example where binary classification techniques are to be employed and $L_i$=0, but k and $\widehat{L}_i$ are once again equal to values of 15 and 12, respectively. If, once again, the same formula as described above (Residue$_i$=$kL_i - \widehat{L}_i$) was to be utilized in this second example to calculate the residue value (Residue$_i$), e.g., at step 1110, then the residue value (Residue$_i$) in this second example would be given by: Residue$_i$=(15)(0)–12=–12. Thus, in this first example, the residue value (Residue$_i$) would be equal to a value of –12. Indeed, in the case of the first and second examples described above, a positive residue value (Residue$_i$) may correlate to $L_i$=1, while a negative residue value (Residue$_i$) may correlate to $L_i$=0.

To understand why inferring $L_i$ from Residue$_i$ is possible, consider an example in which the residues for user profiles used to train the first machine learning model whose true labels are equal to 0 are assumed to satisfy a Normal Distribution with the notation $N$ ($\mu_0$, $\sigma_0$), where $\mu_0$ and $\sigma_0$ are the mean and standard deviation of the Normal Distribution of prediction errors (e.g., residue values) for true labels that are equal to 0 (zero) and are associated with user profiles that were used to train the first machine learning model, respectively, and the residues for training examples whose labels are equal to 1 are assumed to satisfy $N$ ($\mu_1$, $\sigma_0$, where $\mu_1$ and $\sigma_1$ are the mean and standard deviation of the Normal Distribution of prediction errors for true labels that are equal to 1 (one) and are associated with user profiles that were used to train the first machine learning model, respectively. Under such assumptions, it is clear that $\mu_0$<0, $\mu_1$>0, and there is no guarantee that $\sigma_0$=$\sigma_1$.

In light of the foregoing, as described below, in some implementations, a different approach can be taken to performing one or more operations associated with steps 1108-1110 for implementations where binary classification techniques are employed. In some implementations, to force the residues for the two classes of training examples to have the same normal distribution, the MPC cluster can apply a transformation f to the sum of the true labels for the k nearest neighbor user profiles (sum_of_labels) so that residue values calculated based on $L_i$ and $\hat{L}_i$ cannot be used to predict $L_i$. The transformation f, when applied to an initial predicted label (e.g., sum of the true labels in the case of binary classification, majority vote of true labels in the case of multiclass classification, etc.), can serve to remove bias that might exist in the first machine learning model's prediction. To achieve such as goal, the transformation f needs to satisfy the following properties:

$f(\mu_0)=0$ (i)

$f(\mu_1)=1$ (ii)

$\sigma_0 \times f'(\mu_0) = \sigma_1 \times f'(\mu_1)$ (iii)

where f' is the derivative of f.

One example of a transformation with the above properties that may be employed in such implementations is the second degree polynomial transformation of the shape $f(x)=a_2x^2+a_1x+a_0$, where $f'(x)=2a_2x+a_1$. In some examples, the MPC cluster can deterministically find the values of coefficients $\{a_2, a_1, a_0\}$ based on three linear equations from the three constraints as follows:

Let $D = \dfrac{1}{(\mu_1 - \mu_0)^2(\sigma_0 + \sigma_1)}$, $a'_2 = \sigma_0 - \sigma_1$ (i)

$a'_1 = 2(\sigma_1\mu_1 - \sigma_0\mu_0)$ (ii)

$a'_0 = \mu_0(\mu_0\sigma_0 + \mu_0\sigma_1 - 2\mu_1\sigma_1)$ (iii)

In these examples, the MPC cluster can calculate coefficients $\{a_2, a_1, a_0\}$ as: $\{a_2, a_1, a_0\}=D\times\{a_2', a_1', a_0'\}$. The MPC cluster can calculate $\{a_2', a_1', a_0'\}$ and D using addition and multiplication operations, e.g., over secret shares. The transformation $f(x)=a_2x^2+a_1x+a_0$ is also mirror-symmetrical around:

$$x = -\frac{a_1}{2a_2} = \frac{-2(\sigma_1\mu_1 - \sigma_0\mu_0)}{2(\sigma_0 - \sigma_1)} = \frac{\sigma_1\mu_1 - \sigma_0\mu_0}{\sigma_1 - \sigma_0}.$$

In order to calculate the aforementioned coefficients and other values dependent thereon, the MPC cluster may first estimate the mean and standard deviation of the probability distribution of prediction errors (e.g., residue values) for true labels that are equal to zero, $\mu_0$ and $\sigma_0$, respectively, as well was the mean and standard deviation of the probability distribution of prediction errors (e.g., residue values) for true labels that are equal to one, $\mu_1$ and $\sigma_1$, respectively. In some examples, the variance $\sigma_0^2$ of the probability distribution of prediction errors for true labels that are equal to zero may be determined in addition to or instead of the standard deviation $\sigma_0$, and the variance $\sigma_1^2$ of the probability distribution of prediction errors for true labels that are equal to one may be determined in addition to or instead of the standard deviation $\sigma_1$.

In some instances, a given probability distribution of prediction errors may correspond to a normal distribution and, in other instances, a given probability distribution of prediction errors may correspond to a probability distribution other than a normal distribution, such as a Bernoulli distribution, uniform distribution, binomial distribution, hypergeometric distribution, geometric distribution, exponential distribution, and the like. In such other instances, the distribution parameters that are estimated may, in some examples, include parameters other than mean, standard deviation, and variance, such as one or more parameters that are specific to characteristics of the given probability distribution of prediction errors. For example, the distribution parameters that are estimated for a given probability distribution of prediction errors that corresponds to a uniform distribution may include minimum and maximum value parameters (a and b), while the distribution parameters that are estimated for a given probability distribution of prediction errors that corresponds to an exponential distribution may include at least one rate parameter ($\lambda$). In some implementations, one or more operations that are similar to one or more operations that are performed in connection with process 1110 of FIG. 11 may be performed such that data indicative of prediction errors of the first machine learning model can be obtained and utilized for estimating such distribution parameters. In at least some of the aforementioned implementations, data indicative of prediction errors of the first machine learning model can be obtained and utilized to (i) identify, from among several different types of probability distributions (e.g., normal distribution, Bernoulli distribution, uniform distribution, binomial distribution, hypergeometric distribution, geometric distribution, exponential distribution, etc.), a particular type of probability distribution that most closely corresponds to the shape of the probability distribution of a given subset of the prediction errors indicated by the data, and (ii) estimate one or more parameters of the probability distribution of the given subset of the prediction errors indicated by the data in accordance with the particular type of probability distribution identified. Other configurations are possible.

Referring once again to examples in which the estimated distribution parameters include mean and standard deviation, in these example, to estimate such distribution parameters for true labels that are equal to zero, the MPC cluster can calculate:

$$\mu_0 = \frac{sum_0}{count_0}$$

$$\sigma_0^2 = \frac{sum\_of\_square_0}{count_0} - \mu_0^2$$

where:

$sum_0 = \Sigma_i(\Sigma_{j \in k-NN \text{ to } P_i}L_j) \times (1-L_i)$ $count_0 = \Sigma_i(1-L_i)$ $sum\_of\_square_0 = \Sigma_i(\Sigma_{j \in k-NN \text{ to } P_i}L_j)^2 \times (1-L_i)$ In some examples, the MPC cluster calculates standard deviation $\sigma_0$ based on variance $\sigma_0^2$, e.g., by computing the square root of variance $\sigma_0^2$. Similarly, to estimate such distribution parameters for true labels that are equal to one, the MPC cluster can calculate:

$$\mu_1 = \frac{sum_1}{count_1}$$

$$\sigma_1^2 = \frac{sum\_of\_square_1}{count_1} - \mu_1^2$$

where:

$sum_1 = \Sigma_i(\Sigma_{j \in k-NN \text{ to } P_i}L_j) \times L_i$ $count_1 = \Sigma L_i$ $sum\_of\_square_1 = \Sigma_i(\Sigma_{j \in k-NN \text{ to } P_i}L_j)^2 \times L_i$ In some examples, the MPC cluster calculates standard deviation $\sigma_1$ based on variance $\sigma_1^2$, e.g., by computing the square root of variance $\sigma_1^2$.

Once such distribution parameters are estimated, the coefficients $\{a_2, a_1, a_0\}$ can be calculated, stored, and later utilized to apply the corresponding transformation f to the sum of the true labels for the k nearest neighbor user profiles (sum_of_labels). In some examples, these coefficients are utilized to configure the first machine learning model, such that, going forward, the first machine learning model applies the corresponding transformation f to the sum of the true labels for the k nearest neighbor user profiles responsive to input.

Much like binary classification, in the case of multiclass classification, each true label in each vector or set of true labels for user profiles in the k nearest neighbor user profiles may be a binary value of either zero or one. For this reason, an approach similar to that described above with reference to binary classification may also be taken in implementations where multiclass classification techniques, such that residue values calculated based on $L_i$ and $\hat{L}_i$ cannot be used to predict $L_i$. However, in the case of multiclass classification, a respective function or transformation f may be defined and utilized for each category. For instance, if each vector or set of true labels for each user profile were to contain w different true labels corresponding to w different categories, respectively, w different transformations f may be determined and utilized. Also, instead of calculating sums of the true labels, in the case of multiclass classification, a frequency value is calculated for each category. Additional details on how such a frequency value may be calculated are provided above, as well as immediately below. Other configurations are possible.

For an arbitrary chosen $j^{th}$ label, the MPC cluster can partition training examples into two groups, based on whether $l_j$ is the training label for the training examples. For the group of training examples where $l_j$ is the training label, the MPC cluster can assume that the frequency$_j$ is in a normal distribution and calculate the mean $\mu_1$ and variance $\sigma_1$. On the other hand, for the group of training examples where $l_j$ is not the training label, the MPC cluster can assume that the frequency$_j$ is in a normal distribution and calculate the mean $\mu_0$ and variance $\sigma_0$.

Similar to binary classification, in the case of multiclass classification, the k-NN models' prediction is most likely biased, (e.g., $\mu_0 > 0$, where it should have been 0, and $\mu_1 < k$, where it should have been k). In addition, there is no guarantee that $\sigma_0 == \sigma_1$. As such, similar to binary classification, in the case of multiclass classification, the MPC cluster applies a transformation f over the predicted frequency$_j$ so that, after the transformation, the Residue$_j$ for the two groups have substantially the same normal distribution. To achieve such as goal, the transformation f needs to satisfy the following properties:

$f(\mu_0)=0$ (i)

$f(\mu_1)=k$ (ii)

$\sigma_0 \times f'(\mu_0) = \sigma_1 \times f'(\mu_1)$ (iii)

where f' is the derivative of f.

The above three properties are very similar to their counterparts in the binary classification case. In the case of multiclass classification, one example of a transformation with the above properties that may be employed is the second degree polynomial transformation of the shape $f(x) = a_2x^2 + a_1x + a_0$, where $f'(x) = 2a_2x + a_1$. In some examples, the MPC cluster can deterministically calculate the values of coefficients $\{a_2, a_1, a_0\}$ based on three linear equations from the three constraints as follows:

Let $D = \dfrac{k}{(\mu_1 - \mu_0)^2(\sigma_0 + \sigma_1)}$, $a'_2 = \sigma_0 - \sigma_1$ (i)

$a'_1 = 2(\sigma_1\mu_1 - \sigma_0\mu_0)$ (ii)

$a'_0 = \mu_0(\mu_0\sigma_0 + \mu_0\sigma_1 - 2\mu_1\sigma_1)$ (iii)

Note that the transformation for binary classification and multiclass classification are nearly the same, the only difference being that, in multiclass classification with k-NN models, the value of D can, in some implementations, be enlarged by a factor of k.

Referring once again to FIG. 9, in some implementations, one or more of steps 912-916 may correspond to one or more of the operations described above with approaches for defining at least one function or transformation that can be employed by the MPC cluster such that residue values calculated based on $L_i$ and $\hat{L}_i$ cannot be used to predict $L_i$. In particular, steps 912-916 may be performed for implementations in which one or more binary and/or multiclass classification techniques are to be employed. As mentioned above, steps 912-916 are performed prior to steps 920 and 930, and may be performed after step 910.

The MPC cluster estimates a set of distribution parameters based on a plurality of true labels for a plurality of user profiles (912). For example, this may correspond to one or more operations that are similar or equivalent to one or more operations that are performed in connection with the MPC cluster calculating one or more of parameters $\mu_0$, $\sigma_0^2$, $\sigma_0$, $\mu_1$, $\sigma_1^2$, and $\sigma_1$, as described above, based on the true labels associated with the same user profiles utilized in step 910.

The MPC cluster derives a function based on the estimated set of distribution parameters (914). For example, this may correspond to one or more operations that are similar or equivalent to one or more operations that are performed in connection with the MPC cluster calculating parameters or coefficients, such as $\{a_2, a_1, a_0\}$, which effectively define a function. As such, in some implementations, to derive a function at step 914, the MPC cluster derives a set of parameters of a function, e.g., $\{a_2, a_1, a_0\}$.

The MPC cluster configures the first machine learning model to, given a user profile as input, generate an initial predicted label and apply the derived function to the initial predicted label to generate, as output, a predicted label for the user profile (916). For example, this may correspond to one or more operations that are similar or equivalent to one or more operations that are performed in connection with the MPC cluster configuring the first machine learning model, such that, going forward, the first machine learning model applies the corresponding transformation f to the sum of the true labels for the k nearest neighbor user profiles responsive to input (in the case of binary classification). In the case of multiclass classification, the transformation f may represent one of w different functions that the MPC cluster configures the first machine learning model to apply to a respective one of w different values in vector or set corresponding to w different categories. As described above, each of one of these w different values may correspond to a frequency value.

With steps 912-916 having been performed, and the first machine learning model having been configured in such a manner, data that is generated in step 920 and subsequently utilized, e.g., in step 930, may not be used to predict true labels ($L_i$).

Referring once again to FIG. 8, in some implementations, the process 800 may include one or more steps that correspond to one or more of the operations described above with reference to FIGS. 9-11.

In some implementations, the process 800 further includes one or more operations in which the MPC cluster evaluates a performance of the first machine learning model. For example, this may correspond to one or more operations that are similar or equivalent to one or more operations that are performed in connection with the MPC cluster performing step 920 as described above with reference to FIG. 9. In these implementations, to evaluate the performance of the first machine learning model, for each of the plurality of user profiles, the MPC cluster determines a predicted label for the user profile based at least in part on (i) the user profile, (ii) the first machine learning model, and (iii) one or more of the plurality of true labels for the plurality of user profiles, and determines a residue value for the user profile indicating a prediction error in the predicted label based at least in part on the predicted label determined for the user profile and a true label for the user profile included in the plurality of true labels. For example, this may correspond to one or more operations that are similar or equivalent to one or more operations that are performed in connection with the MPC cluster performing steps 1108-1106 as described above with reference to FIG. 11. In addition, in these implementations, the process 800 further includes one or more operations in which the MPC cluster trains the second machine learning model using data indicating the residue values determined for the plurality of user profiles in evaluating the performance of the first machine learning model. For example, this may correspond to one or more operations that are similar or equivalent to one or more operations that are performed in connection with the MPC cluster performing step 930 as described above with reference to FIG. 9.

In at least some of the aforementioned implementations, the residue value for the user profile is indicative of a difference in value between the predicted label determined for the user profile and the true label for the user profile. For instance, this may be the case for examples in which regression techniques are employed.

In at least some of the aforementioned implementations, before the MPC cluster evaluates the performance of the first machine learning model, the process 800 further includes one or more operations in which the MPC cluster derives a function based at least in part on the plurality of true labels, and configures the first machine learning model to, given a user profile as input, use the function to generate, as output, a predicted label for the user profile. For example, this may correspond to one or more operations that are similar or equivalent to one or more operations that are performed in connection with the MPC cluster performing steps 914-916 as described above with reference to FIG. 9. As such, in some implementations, to derive a function at this step, the MPC cluster derives a set of parameters of a function, e.g., $\{a_2, a_1, a_0\}$.

In at least some of the aforementioned implementations, the process 800 further includes one or more operations in which the MPC cluster estimates a set of distribution parameters based at least in part on the plurality of true labels. In such implementations, to derive the function based at least in part on the plurality of true labels, the MPC cluster derives the function based at least in part on the estimated set of distribution parameters. For example, this may correspond to one or more operations that are similar or equivalent to one or more operations that are performed in connection with the MPC cluster performing steps 912-914 as described above with reference to FIG. 9. As such, the aforementioned set of distribution parameters can include one or more parameters of a probability distribution of prediction errors for true labels of a first value in the plurality of true labels, e.g., a mean ($\mu_0$) and a variance ($\sigma_0$) of a normal distribution of prediction errors for true labels of a first value in the plurality of true labels, and one or more parameters of a probability distribution of prediction errors for true labels of a second value in the plurality of true labels, e.g., a mean ($\mu_1$) and a variance ($\sigma_1$) of a normal distribution of prediction errors for true labels of a second, different value in the plurality of true labels. As described above, in some examples, the aforementioned set of distribution parameters can include other types of parameters. Furthermore, in at least some of the aforementioned implementations, the function is a second degree polynomial function, e.g., $f(x)=a_2x^2+a_1x+a_0$, where $f'(x)=2a_2x+a_1$.

In at least some of the aforementioned implementations, to configure the first machine learning model to, given a user profile as input, use the function to generate, as output, a predicted label for the user profile, the MPC cluster configures the first machine learning model to, given a user profile as input: (i) generate an initial predicted label for the user profile, and (ii) apply the function to the initial predicted label for the user profile to generate, as output, a predicted label for the user profile. For example, for examples in which binary classification techniques are employed, this may correspond to one or more operations in which the MPC cluster configures the first machine learning model to, given a user profile as input: (i) calculate a sum of the true labels for the k nearest neighbor user profiles (sum_of_labels), and (ii) apply the function (transformation f) to the initial predicted label for the user profile to generate, as output, a predicted label for the user profile ($\hat{L}_i$ =f(sum_of_labels)). Similar operations may be performed for cases in which multiclass classification techniques are employed. In some implementations, to apply function to the initial predicted label for the user profile, the MPC cluster applies a function, as defined based on the derived set of parameters, e.g., $\{a_2, a_1, a_0\}$. In some examples, to determine the predicted label based at least in part on the true label for each of the k nearest neighbor user profiles, the MPC cluster determines a sum of the true labels for the k nearest neighbor user profiles. For instance, this may be the case for implementations in which regression or binary classification techniques are employed. In some of the aforementioned examples, the predicted label for the particular user profile may correspond to the sum of the true labels for the k nearest neighbor user profiles. For instance, this may be the case for implementations in which regression classification techniques are employed ($\hat{L}_i$ =sum_of_labels). In other such examples, to determine the predicted label based at least in part on the true label for each of the k nearest neighbor user profiles, the MPC cluster applies a function to the sum of the true labels for the k nearest neighbor user profiles to generate a predicted label for the particular user profile. For instance, this may be the case for implementations in which binary classification techniques are employed ($\hat{L}_t$ =f(sum_of_labels)).

As mentioned above, in some of the aforementioned implementations, to determine the predicted label based at least in part on the true label for each of the k nearest neighbor user profiles, the MPC cluster determines a set of predicted labels based at least in part on a set of true labels for each of the k nearest neighbor user profiles corresponding to a set of categories, respectively, and, to determine the set of predicted labels, the MPC cluster performs operations for each category in the set. Such operations can include one or more operations in which the MPC cluster determines a frequency at which true labels that correspond to the category in the sets of true labels for user profiles in the k nearest neighbor user profiles are true labels of a first value. For example, this may correspond to one or more operations that are similar or equivalent to one or more operations that are performed in connection with the first machine learning model 620 being utilized to obtain at least one predicted label 629 ($\hat{L}_t$ ) in one or more implementations where one or more multiclass classification techniques are employed, as described above with reference to FIGS. 6-7. In at least some of the aforementioned implementations, to determine the set of predicted labels, for each category in the set, the MPC cluster applies a function corresponding to the category to the determined frequency to generate a predicted label corresponding to the category for the particular user profile. For instance, the respective function may correspond to one of w different functions derived by the MPC cluster for w different categories as described above with reference to step 914 of FIG. 9.

Figure 12:
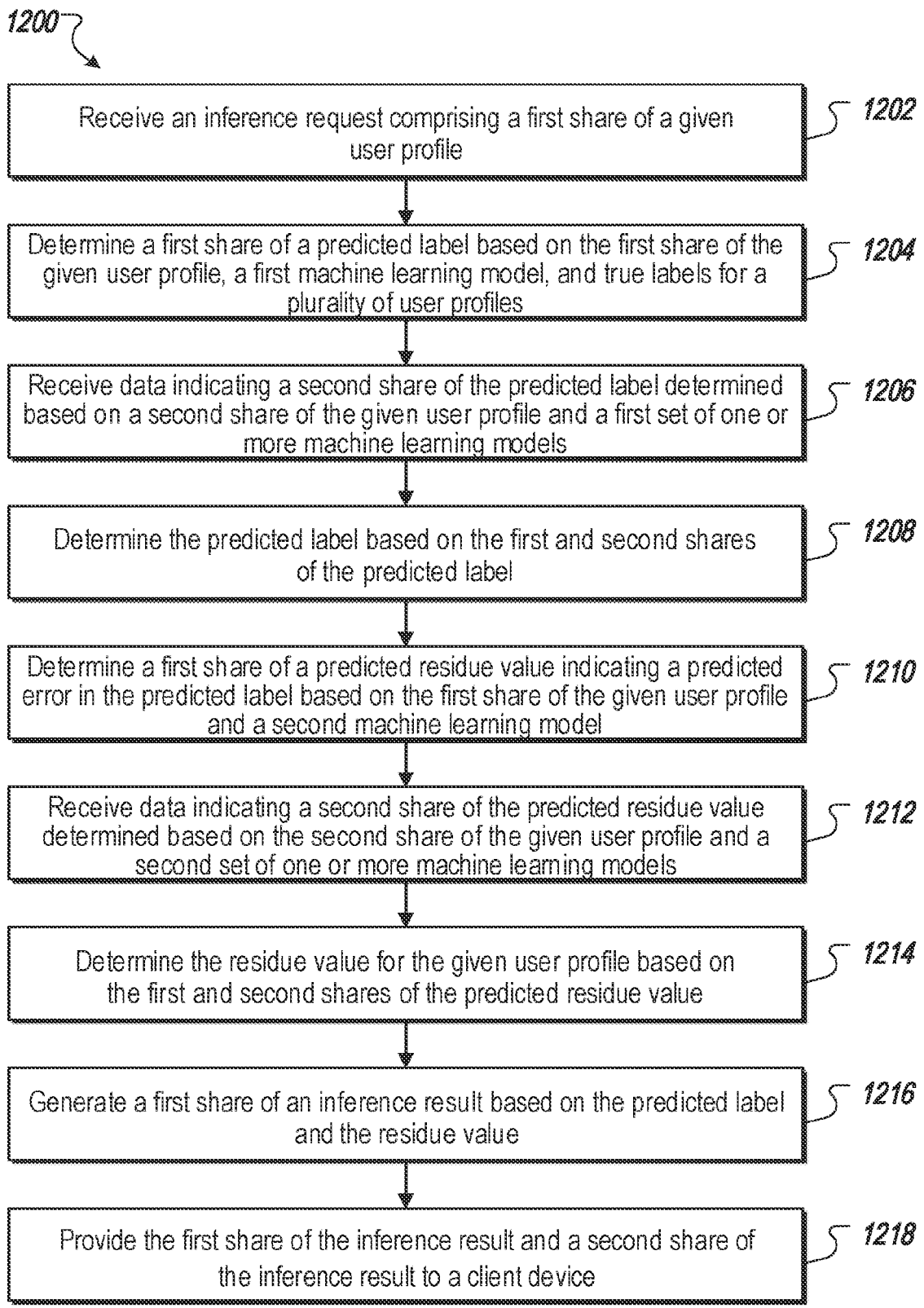
FIG. 12 is a flow diagram that illustrates an example process for generating an inference result for a user profile with boosted performance at a computing system of an MPC cluster.

FIG. 12 is a flow diagram that illustrates an example process 1200 for generating an inference result for a user profile with boosted performance at a computing system of an MPC cluster. One or more of the operations described with reference to FIG. 12 may, for example, be performed at inference time. At least some of the operations of the process 1200 can be implemented, for example, by a first computing system of an MPC cluster, such as MPC$_1$ of the MPC cluster 130 of FIG. 1, and can also correspond to one or more of the operations described above with reference to FIG. 8. However, in process 1200, one or more operations can be performed over secret shares, so as to provide user data privacy protection. In general, "shares" as described below and elsewhere herein may, in at least some implementations, correspond to secret shares. Other configurations are possible. One or more of the operations described with reference to FIG. 12 may, for example, be performed at inference time.

The first computing system of the MPC cluster receives an inference request associated with a given user profile (1202). For example, this may correspond to one or more operations that are similar or equivalent to one or more operations that are performed in connection with MPC$_1$ of the MPC cluster 130 receiving an inference request from the application 112, as described above with reference to FIG. 1. In some implementations, this may correspond to one or more operations that are similar or equivalent to one or more operations that are performed in connection with step 802 as described above with reference to FIG. 8.

The first computing system of the MPC cluster determines a predicted label for the given user profile (1204-1208). The label can be, or include, a demographic-based user group identifier or demographic features associated with the user profile. In some implementations, this may correspond to one or more operations that are similar or equivalent to one or more operations that are performed in connection with step 804 as described above with reference to FIG. 8. However, in steps 1204-1208, the determination of the predicted label for the given user profile can be performed over secret shares, so as to provide user data privacy protection. To determine the predicted label for the given user profile, the first computing system of the MPC cluster (i) determines a first share of the predicted label based at least in part on the first share of the given user profile, a first machine learning model trained using a plurality of user profiles, and one or more of a plurality of true labels for the plurality of user profiles (1204), (ii) receives, from a second computing system of the MPC cluster, data indicating a second share of the predicted label determined by the second computing system of the MPC cluster based at least in part on a second share of the given user profile and a first set of one or more machine learning models, and (iii) determines the predicted label based at least in part on the first and second shares of the predicted label (1208). For example, the second computing system of the MPC cluster may correspond to MPC$_2$ of the MPC cluster 130 of FIG. 1.

In this example, the plurality of true labels for the plurality of user profiles may correspond to true labels that are included as part of encrypted label data 626, which are the true labels for the plurality of user profiles that were used to train and/or evaluate the first machine learning model 620. In some examples, the plurality of true labels may correspond to shares of another set of true labels. The one or more true labels, from among the plurality of true labels, on which the determination of the predicted label for the given user profile is based, for instance, may include at least one true label for each of k nearest neighbor user profiles identified by way of the k-NN model 622 of the first machine learning model 620. In some examples, each of the plurality of true labels is encrypted, as is the case in the examples of FIGS. 6-7. Some of the various ways in which true labels fork nearest neighbor user profiles can be leveraged to determine predicted labels are described in detail above. As made evident in the above, the way or manner in which such true labels are leveraged to determine predicted labels may at least in part depend on the type(s) of inference technique(s) that are employed (e.g., regression techniques, binary classification techniques, multiclass classification techniques, etc.). Additional details regarding secret share exchanges that may be performed in association with k-NN computations are provided above with reference to FIGS. 1-5.

The first computing system of the MPC cluster determines a predicted residue value indicating a predicted error in the predicted label (1210-1214). In some implementations, this may correspond to one or more operations that are similar or equivalent to one or more operations that are performed in connection with step 806 as described above with reference to FIG. 8. However, in steps 1210-1214, the determination of the predicted reside value can be performed over secret shares, so as to provide user data privacy protection. To determine the predicted residue value, the first computing system of the MPC cluster (i) determines a first share of the predicted residue value for the given user profile based at least in part on the first share of the given user profile and a second machine learning model trained using the plurality of user profiles and data indicating differences between the plurality of true labels for the plurality of user profiles and a plurality of predicted labels as determined for the plurality of user profiles using the first machine learning model (1210), (ii) receives, from the second computing system of the MPC cluster, data indicating a second share of the predicted residue value for the given user profile determined by the second computing system of the MPC cluster based at least in part on the second share of the given user profile and a second set of one or more machine learning models (1212), and (iii) determines the predicted residue value for the given user profile based at least in part on the first and second shares of the predicted residue value (1214).

The first computing system of the MPC cluster generates data representing an inference result based on the predicted label and the predicted residue value (1216). In some implementations, this may correspond to one or more operations that are similar or equivalent to one or more operations that are performed in connection with step 808 as described above with reference to FIG. 8. As such, in some examples, the inference result includes or corresponds to a sum of the predicted label and the predicted residue value.

The first computing system of the MPC cluster provides the data representing the inference result to a client device (1218). In some implementations, this may correspond to one or more operations that are similar or equivalent to one or more operations that are performed in connection with step 810 as described above with reference to FIG. 8. For example, this may correspond to one or more operations that are similar or equivalent to one or more operations that are performed in connection with the MPC cluster 130 providing an inference result to the client device 110 on which the application 112 runs, as described above with reference to FIGS. 1-2.

In some implementations, the process 1200 further includes one or more operations in which the first computing system of the MPC cluster applies a transformation to the first share of the given user profile to obtain a first transformed share of the given user profile. In these implementations, to determine the predicted label, the first computing system of the MPC cluster determines a first share of the predicted label based at least in part on the first transformed share of the given user profile. For example, this may correspond to one or more operations that are similar or equivalent to one or more operations that are performed in connection with random projection logic 610 being employed to apply a random projection transformation to the user profile 609 ($P_i$) to obtain the transformed user profile 619 ($P_i'$), as described above with reference to FIGS. 6-8.

In at least some of the aforementioned implementations, to determine the first share of the predicted label, the first computing system of the MPC cluster provides the first transformed share of the given user profile as input to the first machine learning model to obtain the first share of the predicted label for the given user profile as output. For example, this may correspond to one or more operations that are similar or equivalent to one or more operations that are performed in connection with the first machine learning model 620 receiving transformed user profile 619 ($P_i'$) as input and generating at least one predicted label 629 ($\widehat{L}_i$) in response thereto, as described above with reference to FIGS. 6-7.

In some examples, the aforementioned transformation may be a random projection. Furthermore, in at least some of these examples, the aforementioned random projection may be a Johnson-Lindenstrauss (J-L) transformation.

In some implementations, to apply the J-L transformation, the MPC cluster can generate a project matrix R in ciphertext. To project n dimensional $P_i$ to k dimension, the MPC cluster can generate an n×k random matrix R. For example, the first computing system (e.g., $MPC_1$) can create n×k random matrix A, where $A_{i,j}=1$ with 50% probability and $A_{i,j}=0$ with 50% probability. The first computing system can split A into two shares $[A_1]$ and $[A_2]$, discard A, keep $[A_1]$ confidentially, and give $[A_2]$ to the second computing system (e.g., $MPC_2$). Similarly, the second computing system can create n×k random matrix B, the elements of which have the same distribution of the elements of A. The second computing system can split B into two shares $[B_1]$ and $[B_2]$, discard B, keep $[B_2]$ confidentially, and give $[B_1]$ to the first computing system.

The first computing system can then calculate $[R_1]$ as $2\times([A_1]==[B_1])-1$. Similarly, the second computing system can then calculate $[R_2]$ as $2\times([A_2]==[B_2])-1$. In this way, $[R_1]$ and $[R_2]$ are two secret shares of R whose elements are either 1 or −1 with equal probability.

The actual random projection is between secret shares of $P_i$ of dimension 1×n and projection matrix R of dimension n×k to produce results of 1×k. Assuming that n>>k, the J-L transformation reduces the dimension of training data from n to k. To carry out the above projection in encrypted data, the first computing system can calculate $[P_{i,1}][R_{i,1}]$, which requires multiplication between two shares and addition between two shares.

As mentioned above, in some implementations, the first machine learning model includes a k-nearest neighbor model maintained by the first computing system of the MPC cluster, and the first set of one or more machine learning models includes a k-nearest neighbor model maintained by the second computing system of the MPC cluster. In some examples, the two aforementioned k-nearest neighbor models may be identical or nearly identical to one another. That is, in some examples, the first and second computing systems maintain copies of the same k-NN model, and each store their own shares of true labels. In some examples, a model rooted in one or more prototype methods may be implemented in place of one or both of the aforementioned k-nearest neighbor models.

In at least some of these implementations, to determine the predicted label, the first computing system of the MPC cluster (i) identifies a first set of nearest neighbor user profiles based at least in part on the first share of the given user profile and the k-nearest neighbor model maintained by the first computing system of the MPC cluster, (ii) receives, from the second computing system of the MPC cluster, data indicating a second set of nearest neighbor profiles identified by the second computing system of the MPC cluster based at least in part on the second share of the given user profile and the k-nearest neighbor model maintained by the second computing system of the MPC cluster, (iii) identifies a number k of nearest neighbor user profiles that are considered most similar to the given user profile among the plurality of user profiles based at least in part on the first and second sets of nearest neighbor profiles, and determines the first share of the predicted label based at least in part on a true label for each of the k nearest neighbor user profiles. For example, this may correspond to one or more operations that are similar or equivalent to one or more operations that are performed in connection with the first machine learning model 620 being utilized to obtain at least one predicted label 629 ($\widehat{L}_i$) in one or more implementations where one or more regression and/or binary classification techniques are employed, as described above with reference to FIGS. 6-8. In some examples, the predicted label includes or corresponds to the sum of the true labels for the k nearest neighbor user profiles.

In some of the aforementioned implementations, to determine the first share of the predicted label, the first computing system of the MPC cluster (i) determines a first share of a sum of the true labels for the k nearest neighbor user profiles, (ii) receives, from the second computing system of the MPC cluster, a second share of the sum of the true labels for the k nearest neighbor user profiles, and (iii) determines the sum of the true labels for the k nearest neighbor user profiles based at least in part on the first and second shares of the sum of the true labels for the k nearest neighbor user profiles. For example, this may correspond to one or more operations that are similar or equivalent to one or more operations that are performed in connection with the first machine learning model 620 being utilized to obtain at least one predicted label 629 ($\widehat{L}_i$) in one or more implementations where one or more multiclass classification techniques are employed, as described above with reference to FIGS. 6-8.

In some implementations, the second machine learning model includes at least one of a deep neural network (DNN), a gradient-boosting decision tree (GBDT), and a random forest model maintained by the first computing system of the MPC cluster, and the second set of one or more machine learning models includes at least one of a DNN, a GBDT, and a random forest model maintained by the second computing system of the MPC cluster. In some examples, the two models (e.g., DNNs, GBDTs, random forest models, etc.) maintained by the first and second computing systems may be identical or nearly identical to one another.

In some implementations, the process 1200 further includes one or more operations in which the MPC cluster evaluates a performance of the first machine learning model and trains the second machine learning model using data indicating the predicted residue values determined for the plurality of user profiles in evaluating the performance of the first machine learning model. For example, this may correspond to one or more operations that are similar or equivalent to one or more operations that are performed in connection with the MPC cluster performing step 920 as described above with reference to FIGS. 8-9. However, in such implementations, one or more operations can be performed over secret shares, so as to provide user data privacy protection. In these implementations, to evaluate the performance of the first machine learning model, for each of the plurality of user profiles, the MPC cluster determines a predicted label for the user profile and determines a residue value for the user profile indicating a prediction error in the predicted label. To determine the predicted label for the user profile, the first computing system of the MPC cluster (i) determines a first share of a predicted label for the user profile based at least in part on a first share of the user profile, the first machine learning model, and one or more of the plurality of true labels for the plurality of user profiles, (ii) receives, from the second computing system of the MPC cluster, data indicating a second share of the predicted label for the user profile determined by the second computing system of the MPC cluster based at least in part on a second share of the user profile and the first set of one or more machine learning models maintained by the second computing system of the MPC cluster, and (iii) determines the predicted label for the user profile based at least in part on the first and second shares of the predicted label. To determine the residue value for the user profile indicating the error in the predicted label, the first computing system of the MPC cluster (i) determines a first share of the residue value for the user profile based at least in part on the predicted label determined for the user profile and a first share of a true label for the user profile included in the plurality of true labels, (ii) receives, from the second computing system of the MPC cluster, data indicating a second share of the residue value for the user profile determined by the second computing system of the MPC cluster based at least in part on the predicted label determined for the user profile and a second share of the true label for the user profile, and (iii) determines the residue value for the user profile based at least in part on the first and second shares of the residue value. For example, this may correspond to one or more operations that are similar or equivalent to one or more operations that are performed in connection with the MPC cluster performing steps 1108-1106 as described above with reference to FIG. 11. In addition, in these implementations, the process 1200 further includes one or more operations in which the MPC cluster trains the second machine learning model using data indicating the residue values determined for the plurality of user profiles in evaluating the performance of the first machine learning model. For example, this may correspond to one or more operations that are similar or equivalent to one or more operations that are performed in connection with the MPC cluster performing step 930 as described above with reference to FIG. 9.

In at least some of the aforementioned implementations, the first share of the residue value for the user profile is indicative of a difference in value between the predicted label determined for the user profile by the first machine learning model and the first share of the true label for the user profile, and the second share of the residue value for the user profile is indicative of a difference in value between the predicted label determined for the user profile by the first machine learning model and the second share of the true label for the user profile. For instance, this may be the case for examples in which regression techniques are employed.

In at least some of the aforementioned implementations, before the MPC cluster evaluates the performance of the first machine learning model, the process 1200 further includes one or more operations in which the MPC cluster (i) derives a function and (ii) configures the first machine learning model to, given a user profile as input, generate an initial predicted label for the user profile and apply the function to the initial predicted label for the user profile to generate, as output, a first share of a predicted label for the user profile. For example, this may correspond to one or more operations that are similar or equivalent to one or more operations that are performed in connection with the MPC cluster performing steps 914-916 as described above with reference to FIGS. 8-9. To derive the function, the first computing system of the MPC cluster (i) derives a first share of the function based at least in part on a first share of each of the plurality of true labels, (ii) receives, from the second computing system of the MPC cluster, data indicating a second share of the function derived by the second computing system of the MPC cluster based at least in part on a second share of each of the plurality of true labels, and (iii) derives the function based at least in part on the first and second shares of the function. For example, for examples in which binary classification techniques are employed, this may correspond to one or more operations in which the MPC cluster configures the first machine learning model to, given a user profile as input: (i) calculate a sum of the true labels for the k nearest neighbor user profiles (sum_of_labels), and (ii) apply the function (transformation f) to the initial predicted label for the user profile to generate, as output, a predicted label for the user profile ($\widehat{L}_i$ =f(sum_of_labels)). Similar operations may be performed for cases in which multiclass classification techniques are employed.

When implemented over secret shares, the first computing system (e.g., $MPC_1$) can calculate:

$$[sum_{0,1}]=\Sigma_i(\Sigma_{j\in k\text{-}NN\ to\ P_i}[L_{j,1}])\times(1-[L_{i,1}])$$

$$[count_{0,1}]=\Sigma_i(1-[L_{i,1}])$$

$$[sum\_of\_square_{0,1}]=\Sigma_i(\Sigma_{j\in k\text{-}NN\ to\ P_i}[L_{j,1}])^2\times(1-[L_{i,1}])$$

Similarly, when implemented over secret shares, the second computing system (e.g., $MPC_2$) can calculate:

$$[sum_{0,2}]=\Sigma_i(\Sigma_{j\in k\text{-}NN\ to\ P_i}[L_{j,2}])\times(1-[L_{i,2}])$$

$$[count_{0,2}]=\Sigma_i(1-[L_{i,2}])$$

$$[sum\_of\_square_{0,2}]=\Sigma_i(\Sigma_{j\in k\text{-}NN\ to\ P_i}[L_{j,2}])^2\times(1-[L_{i,2}])$$

The MPC cluster can then reconstruct $sum_0$, $count_0$, $sum\_of\_square_0$ as described above in cleartext, and calculate distribution $\mathcal{N}(\mu_0, \sigma_0^2)$.

Similarly, to calculate distribution $\mathcal{N}(\mu_1, \sigma_1^2)$, the first computing system (e.g., $MPC_1$) can calculate:

$$[sum_{1,1}]=\Sigma_i(\Sigma_{j\in k\text{-}NN\ to\ P_i}[L_{j,1}])\times[L_{i,1}]$$

$$[count_{1,1}]=\Sigma_i[L_{i,1}]$$

$$[sum\_of\_square_{1,1}]=\Sigma_i(\Sigma_{j\in k\text{-}NN\ to\ P_i}[L_{j,1}])^2\times[L_{i,1}]$$

And, the second computing system (e.g., $MPC_2$) can calculate:

$$[sum_{1,2}]=\Sigma_i(\Sigma_{j\in k\text{-}NN\ to\ P_i}[L_{j,2}])\times[L_{i,2}]$$

$$[count_{1,2}]=\Sigma_i[L_{i,2}]$$

$$[sum\_of\_square_{1,2}]=\Sigma_i(\Sigma_{j\in k\text{-}NN\ to\ P_i}[L_{j,2}])^2\times[L_{i,2}]$$

The MPC cluster can then reconstruct $sum_1$, $count_1$, $sum\_of\_square_1$ as described above in cleartext, and calculate distribution $\mathcal{N}(\mu_1, \sigma_1^2)$.

In at least some of the aforementioned implementations, when evaluating the performance of the first machine learning model, the MPC cluster can employ one or more fixed point calculation techniques to determine the residue value for each user profile. More specifically, when evaluating the performance of the first machine learning model, to determine the first share of the residue value for each user profile, the first computing system of the MPC cluster scales the corresponding true label, or share thereof, by a particular scaling factor, scales coefficients $\{a_2, a_1, a_0\}$ associated with the function by the particular scaling factor and rounds the scaled coefficients to the nearest integer. In such implementations, the second computing system of the MPC cluster may perform similar operations to determine the second share of the residue value for each user profile. The MPC cluster can thus calculate the residue value with secret shares, reconstruct the cleartext residue value from the two secret shares, and divide the cleartext residue value by the scaling factor.

In at least some of the aforementioned implementations, the process 1200 further includes one or more operations in which the first computing system of the MPC cluster estimates a first share of a set of distribution parameters based at least in part on the first share of each of the plurality of true labels. In some such implementations, to derive the first share of the function based at least in part on the first share of each of the plurality of true labels, the first computing system of the MPC cluster derives a first share of the function based at least in part on the first share of the set of distribution parameters. For example, this may correspond to one or more operations that are similar or equivalent to one or more operations that are performed in connection with the MPC cluster performing steps 912-914 as described above with reference to FIGS. 8-9. As such, the aforementioned set of distribution parameters can include one or more parameters of a probability distribution of prediction errors for true labels of a first value in the plurality of true labels, e.g., a mean ($\mu_0$) and a variance ($\sigma_0$) of a normal distribution of prediction errors for true labels of a first value in the plurality of true labels, and one or more parameters of a probability distribution of prediction errors for true labels of a second value in the plurality of true labels, e.g., a mean ($\mu_1$) and a variance ($\sigma_1$) of a normal distribution of prediction errors for true labels of a second, different value in the plurality of true labels. As described above, in some examples, the aforementioned set of distribution parameters can include other types of parameters. Furthermore, in at least some of the aforementioned implementations, the function is a second degree polynomial function, e.g., $f(x)=a_2x^2+a_1x+a_0$, where $f'(x)=2a_2x+a_1$, although, in some examples, other functions may be employed.

In some examples, to determine the first share of the predicted label, the first computing system of the MPC cluster (i) determines a first share of a sum of the true labels for the k nearest neighbor user profiles, (ii) receives, from the second computing system of the MPC cluster, a second share of the sum of the true labels for the k nearest neighbor user profiles, and (iii) determines the sum of the true labels for the k nearest neighbor user profiles based at least in part on the first and second shares of the sum of the true labels for the k nearest neighbor user profiles. For instance, this may be the case for implementations in which regression or binary classification techniques are employed. In some of the aforementioned examples, the first share of the predicted label may correspond to the sum of the true labels for the k nearest neighbor user profiles. For instance, this may be the case for implementations in which regression classification techniques are employed ($\widehat{L}_t$ =sum_of_labels). In other such examples, to determine the first share of the predicted label, the MPC cluster applies a function to the sum of the true labels for the k nearest neighbor user profiles to generate a predicted label for the given user profile. For instance, this may be the case for implementations in which binary classification techniques are employed ($\widehat{L}_t$ =f(sum_of_labels)).

As mentioned above, in some of the aforementioned implementations, to determine the first share of the predicted label based at least in part on the true label for each of the k nearest neighbor user profiles, the first computing system of the MPC cluster determines a first share of a set of predicted labels based at least in part on a set of true labels for each of the k nearest neighbor user profiles corresponding to a set of categories. To determine the first share of a set of predicted labels, for each category in the set, the first computing system of the MPC cluster (i) determines a first share of a frequency at which true labels that correspond to the category in the sets of true labels for user profiles in the k nearest neighbor user profiles are true labels of a first value, (ii) receives, a second share of the frequency at which true labels that correspond to the category in the sets of true labels for user profiles in the k nearest neighbor user profiles are true labels of the first value, and (iii) determines the frequency at which true labels that correspond to the category in the sets of true labels for user profiles in the k nearest neighbor user profiles are true labels of the first value based at least in part on the first and second shares of the frequency at which true labels that correspond to the category in the sets of true labels for user profiles in the k nearest neighbor user profiles are true labels of the first value. Such operations can include one or more operations in which the first computing system of the MPC cluster determines a frequency at which true labels that correspond to the category in the sets of true labels for user profiles in the k nearest neighbor user profiles are true labels of a first value. For example, this may correspond to one or more operations that are similar or equivalent to one or more operations that are performed in connection with the first machine learning model 620 being utilized to obtain at least one predicted label 629 ($\widehat{L}_i$) in one or more implementations where one or more multiclass classification techniques are employed, as described above with reference to FIGS. 6-8.

In at least some of the aforementioned implementations, to determine the first share of the set of predicted labels, for each category in the set, the first computing system of the MPC cluster applies a function corresponding to the category to the frequency at which true labels that correspond to the category in the sets of true labels for user profiles in the k nearest neighbor user profiles are true labels of the first value to generate a first share of a predicted label corresponding to the category for the given user profile. For instance, the respective function may correspond to one of w different functions derived by the MPC cluster for w different categories as described above with reference to step 914 of FIGS. 8-9.

For multiclass classification problems, when evaluating the performance (e.g., quality) of the first machine learning model, for each training example/query, the MPC cluster can find the k nearest neighbors and calculate the frequency of their labels over secret shares.

For instance, consider an example in which there are assumed to be w valid labels (e.g., classes) for a multiclass classification problem $\{l_1, l_2, \ldots l_w\}$. Among the k neighbors identified by $\{id_1, id_2, \ldots id_k\}$, the first computing system (e.g., $MPC_1$) can calculate the frequency of the $j^{th}$ label as $[l_{j,1}]$ as:

[frequency$_{j,1}$]=$\Sigma_{i \in \{id_1, \ldots id_k\}}$([label$_{i,1}$]==$l_j$)

The first computing system can calculate the frequency from the true label [label$_1$] as:

[expected_frequency$_{j,1}$]=$k \times$([label$_1$]==$j$)

Therefore, the first computing system can calculate:

[Residue$_{j,1}$]=[expected_frequency$_{j,1}$]−[frequency$_{j,1}$]

And, [Residue$_{j,1}$] is equivalent to:

[Residue$_{j,1}$]=$k \times$([label$_1$]==$j$)−$\Sigma_{i \in \{id_1, \ldots id_k\}}$([label$_{i,1}$]==$l_j$)

Similarly, the second computing system (e.g., $MPC_2$) can calculate:

[Residue$_{j,2}$]=$k \times$([label$_2$]==$j$)−$\Sigma_{i \in \{id_1, \ldots id_k\}}$([label$_{i,2}$]==$l_j$)

In the case of binary classification and regression, for each inference, the residue value can be a secret message of integer type. On the contrary, in the case of multiclass classification, for each inference, the residue value can be a secret message of integer vectors, as shown above.

Demographic Reporting

A digital component provider 160 may have several campaigns (e.g. digital component distribution campaigns) that may involve different digital components. For each campaign and digital component displayed on client devices 110 to various users, the digital component provider 160 may desire feedback indicating performance of that digital component, or the campaign including that digital component. To provide such feedback, the content platform 150 can implement demographic reporting to generate and provide, to digital component providers 160, a report indicating the effectiveness of each campaign and/or each digital component for various demographic-based user groups. In one example, the report can include a table—such as the one shown below in Table 7—and analytics associated with data shown in the table. Each content provider 160 is displayed one or more reports that are specific to campaigns and/or digital components for that specific content provider 160.

TABLE 7

| Campaign ID | Digital Component ID | Demographic Category | Impressions per day | Clicks per day | Conversions per day |
|---|---|---|---|---|---|
| CID1234 (ID for winter 2020 collection) | DID15627 (ID for digital component with fashion model Jane Doe) | Females | 8000 | 5000 | 1000 |
| " | " | College Educated | 5000 | 2800 | 800 |
| " | " | Income above $X | 2500 | 2000 | 600 |
| " | DID98150 (ID for digital component with fashion model Jennifer Doe) | Females | 10000 | 7000 | 4000 |
| " | " | College Educated | 7500 | 5200 | 2500 |
| " | " | Income above $Y | 4000 | 3000 | 200 |
| CID2345 (ID for Spring 2021 collection) | DID15615 (ID for digital component with fashion model Carol Doe) | Females | 800 | 500 | 80 |
| " | " | College Educated | 500 | 280 | 50 |
| " | " | Income above $Z | 250 | 200 | 40 |

While a digital component provider 160, who is shown the report, is described as including multiple campaigns involving one or more digital components, in other implementations any digital component provider 160 may have any number of campaigns, any demographic categories (e.g., age range; gender; parental status; household income; lifestyle interests, such as technophiles, sports fans, cooking enthusiasts, and/or the like; in-market segments such as product-purchase interests; and/or any other categories), and any types or combinations of events (e.g., impressions, clicks, and/or conversions, and/or lack thereof). The analytics generated for each report can vary accordingly. The demographic categories can correspond to user groups to which the various users have been assigned by way of expanding or self-reporting.

Because the data in the table (e.g., Table 7) is computed for all of the users as a whole rather than single users individually, the privacy of individual users is preserved.

In some implementations, additional or alternate privacy safeguards can be implemented for demographic reporting, such as differential noise addition, de-identification of records, k-anonymity, granularity-based techniques, as explained below, and/or the like. For differential noise addition, the application 112, the secure MPC cluster 130, the content platform 150, and/or the aggregation system 180 can add a controlled amount of differential noise from a preset distribution (e.g., Laplace or Gaussian distribution) to one or more functions that involve private data (e.g., identifying information such as IP addresses and/or timestamps) of users. For de-identification of records, the application 112 can simply send a set of records without any identifying information, such as IP addresses and/or timestamps. To de-identify records, the application 112 and/or the content platform 150 may remove the identifying information. For k-anonymity, the application 112, the secure MPC cluster 130, the content platform 150, and/or the aggregation system 180 can implement k-anonymization techniques, where at least "k" number of values of user attributes within the user data can be anonymized to enhance privacy, and operations such as aggregation can be performed on the anonymized data. K-anonymity requires reports to be aggregated on a given key and only be revealed if the key is shared with at least k records. For granularity-based techniques, the application 112 can be programmed to allow the digital component provider 160 to specify granularity (e.g., time-based granularity such as one day or one hour, or geographical granularity such a specific state, province, city, or country) for which reporting is required, and the application 112, the secure MPC cluster 130, the content platform 150, and/or the aggregation system 180 can perform computations for the specified granularity.

System for Demographic Reporting

The data presented in the report (e.g., number of impressions, clicks and/or conversions, and/or lack/absence thereof, within each of various demographic categories) can be generated using third party cookies. However, to avoid cookies in order to preserve user privacy, the reporting is performed using the system (which can also be referred to as framework) of environment 100.

The content platform 150 (e.g., DSP or SSP, and in certain implementations a separate reporting platform) can receive, from a digital component provider 160, data identifying a campaign involving a digital component and a first set of one or more demographic categories for which demographic reporting is desired by the digital component provider 160. The digital component provider 160 can input this data onto an application, e.g., a browser or native application. The first set of categories may include, for example, female and income greater than $100,000. In some implementations, the data identifying the campaign and the first set of one or more demographic categories can be included in an aggregation key, which can be a composite or concatenated key that has multiple values or multiple columns of values. The values can be data identifying the campaign, and each column can represent a different demographic category.

The content platform 150 (e.g., DSP or SSP, and in certain implementations a separate reporting platform coupled to the content platform 150) can associate a user of the client device 110, on which the digital component is being (or to be) displayed, with a second set of one or more demographic categories. In one example, the second set of one or more demographic categories include female, parent, and income greater than $100,000. The associating can be performed in at least one of the following two ways. Under the first way, the content platform 150 (or the separate reporting platform in some implementations) can receive a self-identification, provided by the user on an application 112 implemented on the client device 110, of the second set of one or more demographic categories, and then the content platform 150 (or the separate reporting platform in some implementations) can map the user to the second set of one or more demographic categories to perform the associating. Under the second way, the content platform 150 can transmit, to the MPC cluster 130, browsing history of the user (e.g., the browsing history can be, or include, a user profile, which the content platform 150 can transmit to the MPC cluster 130 at processes 210 and 212 of FIG. 2); then the content platform 150 (or the separate reporting platform in some implementations) can receive, from a machine learning model within the MPC cluster 130, inferences output by that machine learning model that include the second set of demographic categories; and subsequently the content platform 150 (or the separate reporting platform in some implementations) can map the user to the second set of one or more demographic categories to perform the associating.

This machine learning model can be a k nearest neighbor model, and can use the modeling techniques described above with respect to demographic-based digital component distribution. However, this machine learning model used for reporting may be trained using different data from one or more machine learning models used for demographic-based digital component distribution because machine learning is used for demographic-based digital component distribution and reporting for different purposes. For example, in the case of demographic-based digital component distribution, the purpose of machine learning is to propose user groups to a user or to the user's application (e.g., browser) so that the user can be displayed relevant digital components of interest to the user, whereas in the case of demographic reporting, the purpose of machine learning is to determine a category (which can also be referred to as a bucket) into which the user who has been displayed the digital component can be placed in a report to the digital component provider 160. In view of these different purposes, the machine learning models for demographic-based digital component distribution and reporting are trained differently, and thus generate different outputs (i.e. categorize a same probability output into different categories—i.e. classify users differently). For example, the machine learning model for demographic-based digital component distribution may categorize an output of 95% probability being male as a male always, but a reporting model may report 100 users, all of which are 95% probability being male, as 95 males and 5 females; in such example, the MPC cluster 130 may be softer (i.e. easier or less-stringent) in commitment to a particular label for reporting purposes than for demographic-based digital component distribution purposes. The content platform 150 can control or vary such stringency for categorization for machine learning models implemented in the MPC cluster 130 for demographic-based digital component distribution and/or reporting. In some implementations, the separate reporting platform can control or vary such stringency for categorization for machine learning models implemented in the MPC cluster 130 for reporting.

While machine learning models are described as being trained differently for demographic-based digital component distribution and demographic reporting, in some implementations those machine learning models may be trained similarly or even in a same manner. Further, while the machine learning models for demographic-based digital component distribution and demographic reporting are shown as being resident in the MPC cluster 130, in some other implementations, the machine learning models for demographic-based digital component distribution and/or reporting can be implemented on the client devices 110 so that categorization of the users into demographic groups takes place on the client device 110 instead of the MPC cluster 130. These implementations are generally implemented where the client devices 110 have sufficient storage capacity and computation capability. Such alternate implementations can advantageously save bandwidth by preventing substantive amount of communication with the MPC cluster 130.

If the first set of one or more demographic categories (which represent demographic categories for which demographic reporting is desired by the digital component provider 160; e.g., female and income greater than $100,000, as input data onto the application 112 by the digital component provider 160) and the second set of one or more demographic categories (which represent either inferences of user groups for the user as generated by machine learning or user groups self-identified by the users on application 112; e.g., female, parent, and income greater than $100,000) have at least one demographic category in common (e.g., demographic categories of female and income greater than $100,000), the content platform 150 (or the separate reporting platform in some implementations) can transmit browsing events (e.g., impressions, clicks, and/or conversions, and/or lack/absence thereof) input on the client device 110 and the at least one common demographic category to an aggregation API. In the examples given above for the first set of one or more demographic categories and the second set of one or more demographic categories, notice that the categories of female and income greater than $X are common. Therefore, in such example, the content platform 150 (or the separate reporting platform in some implementations) transmits browsing events (e.g. impressions, clicks, and/or conversions, and/or lack/absence thereof) input on the client device 110 and data identifying the common demographic categories to an aggregation API.

In some implementations, the reporting can be in response to a request by the digital content provider 160. In some implementations, the reporting can be in response to a request from the content platform 150. In some implementations, the reporting can be in response to a particular type of user interaction (e.g., display of specific digital content such as a content item, one or more clicks on the digital content item, conversion associated with the digital content item such as navigation to a product purchase webpage for purchasing a product promoted using the digital content item, or the like).

The aggregation API combines the browsing events (e.g., impressions, clicks, and/or conversions, and/or lack/absence thereof) and the at least one common demographic category with at least one browsing event of other users and related at least one demographic category that is one of the first set of one or more demographic categories to generate aggregated data. In the example used above, the aggregation API combines the data for browsing events for the categories of female and income greater than $X with browsing events of other users—with respect to this digital component—within the categories of female and income greater than $X. In this example, the aggregation does not take into account the uncommon category (i.e. not common between the first set of one or more demographic categories and the second set of one or more demographic categories) of parent because the digital component provider desires a report of just the specified categories of female and income greater than $X, not of the category of parents. In some examples, the aggregated data can be a table that is the same as or similar to the Table 7 discussed above. The aggregation can aggregate data for a preset amount of time (e.g. 1 hour, 12 hours, 1 day, 2 days, 5 days, 1 month, or any other time period). For example, in Table 7, the count of impressions, clicks, and conversions is per day.

The aggregation is performed as follows in a secure manner to prevent fraud and protect user privacy. The aggregation API communicates with an aggregation system 180. The aggregation system 180 can be one or more computers communicatively coupled to the content platform 150, the separate reporting platform, the client device 110, the websites 142, the publishers 140, and/or the digital component providers 160. The aggregation system 180 can generate aggregated network measurements based on data received from client devices 110. In some implementations, the data to be aggregated is sent to the aggregated system by the application 112, which can be a web browser or native application. In a few implementations, the data to be aggregated can be sent to the aggregated system by the operating system of the client device 110; in such implementations, the web browser(s) and/or native application(s) on the client device 110 can be configured to report impressions, clicks and/or conversions to the operating system. The operating system can perform each of the operations for reporting the impressions and conversions described below as being performed by the application 112.

The application 112 on the client devices 110 can provide, to the aggregation system 180, measurement data elements that include encrypted data that represents network data. The network data can include data on impressions, clicks, and/or conversions. For example, the application 112 can generate and send to the aggregation system 180, a measurement data element for each conversion for which conversion data is stored at the client device 110. The aggregated network measurements can include, for each of one or more digital components, a total number of impressions, clicks, and/or conversions for the digital component across multiple client devices 110.

The application 112, the secure MPC cluster 130, the content platform 150, and/or the aggregation system 180 can preserve privacy by implementing various techniques such as a threshold scheme or a 2-party or other MPC compute system, as described below.

In some implementations, the application 112 can use a (t, n) threshold scheme to generate the data in a measurement data element. In some implementations, when the application 112 detects a conversion or receives conversion data for a conversion, the application 112 generates a group key (e.g., a polynomial function) based on data on impressions, clicks, and/or conversions. The application 112 can then generate a group member key that represents a portion of the group key and that can be used to regenerate the group key only when a sufficient number of group member keys for the same set of impressions, clicks, and conversions are received. In this example, the measurement data element for a conversion can include the group member key generated by the application 112 and a tag that corresponds to the set of impressions, clicks, and conversions. Each unique set of impressions, clicks, and conversions can have a corresponding unique tag so that the aggregation system 180 can aggregate the measurement data elements for each set of impressions, clicks, and/or conversions using its tag.

In the (t, n)-threshold encryption scheme, the aggregation server would need to receive at least t group member keys for the same set of impressions, clicks, and/or conversions to be able to decrypt the impression and conversion data. If less than t group member keys are received, the aggregation server cannot decrypt the data on impressions, clicks, and/or conversions. Once at least t measurement data elements for the same impression and conversion pair are received from client devices 110, the aggregation system 180 can determine the group key from the at least t group member keys and obtain the impression and conversion data from the group key.

Threshold encryption techniques, such as (t, n)-threshold encryption schemes can use the network data (e.g., impression, click and/or conversion data) or a portion or derivative thereof as a seed for generating a group key that is then split between multiple applications (e.g., web browsers or native applications) of multiple client devices that report the network data being measured. This enables each of the applications running on different client devices to generate the same group key that encrypts the network data using the same network data without collaboration between the applications (or client devices) and without requiring a central system to distribute the key to each application. Instead, each application at which a network event (e.g., an impression and associated conversion) occurs can use the network data that it receives, e.g., from a digital component and/or remote server, to generate the group key that encrypts the network data.

Each application can use different information to generate a group member key that, when combined with a sufficient number of other group member keys, can be used to regenerate the group key or another representation of the group key. For example, each application can use a unique identifier for the application to generate its group member key such that each application generates a different group member key than each other application without collaboration between the applications. This generation of different group member keys by each application enables the group key to be regenerated when any combination of group member keys totaling at least a threshold "t" number of group member keys are received. Thus, the network data can be decrypted when at least t group member keys are received, but cannot be decrypted if less than t group member keys are received. By enabling such secret sharing between applications without collaboration between the applications protects user privacy by precluding communication between users' devices, reduces bandwidth consumed by such communication, and prevents measurement fraud that could occur if a single private key was simply passed out to each application.

The aggregation system 180 can determine the quantity of the clicks and/or conversions for an impression based on the number of measurement data elements received that includes data on impressions, clicks and/or conversions for the set of impressions, clicks and/or conversions. For example, after obtaining the impression, click and conversion data using the at least t group member keys, the aggregation system 180 can determine, as the quantity of conversions, a count of the number of the group member keys received for the set of impressions, clicks, and/or conversions. The aggregation system 180 can report the data on impressions, clicks, and/or conversions to the content platform 150 (or the separate reporting platform in some implementations) via the aggregation API.

The content platform 150 (or the separate reporting platform in some implementations) can receive the aggregated data from the aggregation API. The content platform 150 (or the separate reporting platform in some implementations) can use the aggregated data to generate a report. To generate the report, the content platform 150 (or the separate reporting platform in some implementations) can arrange the aggregated data in a table (e.g. the table of Table 7, or a similar table), generate analytics based on the aggregated data in the table, and combine and present the table and the analytics in the report. Because the data in the table (e.g. Table 7) as well as the report is computed for all of the users as a whole rather than single users individually, and because such table or reports are not controlled by the application 112, the vendors, privacy experts, or any others such entity, such reports preserve user privacy and prevent leak of user data while avoiding use of cookies. The content platform 150 (or the separate reporting platform in some implementations) can transmit the report to the aggregated data to the application (e.g. browser or native application) of the digital component provider 160. The reports can be presented on user interfaces displayed by the application implemented on a computing device of the digital component provider 160.

The content platform 150 (or the separate reporting platform in some implementations) can generate the report in response to a request to generate a report. In some implementations, the content platform 150 (or the separate reporting platform in some implementations) can receive the request for the report from a digital content provider 160. In one example consistent with these implementations, the digital component provider 160 may request a report for a particular digital component of that digital component provider 160. In another example, the digital component provider may request a report for several digital components of that digital component provider 160. In yet another example, the digital component provider may request a report for one or more campaigns of that digital component provider 160. In some examples, the digital component provider 160 may request a report by specifying one or more campaign IDs, one or more digital component IDs, one or more demographic user groups IDs, and/or one or more events (e.g. impressions, clicks, and/or conversions, and/or lack/absence thereof) for which the report is desired. In other implementations, the request for generation of a report can be generated automatically. The automatic generation of the request by the script can take place at (a) preset intervals of time, and/or (b) when a count of one or more events—e.g. impressions, clicks, and/or conversions, and/or lack/absence thereof, associated with a digital component or campaign of the content provider 160—exceeds a particular threshold (e.g. when the number of clicks by females exceeds 1000). In certain implementations, the script can automatically generate the request (a) in response to a request from the content provider, and/or (b) automatically. Generally, reporting is not latency sensitive, and taking up to a minute or more to generate a report may not be disadvantageous.

While a threshold scheme is described above, in some implementations, the aggregation system 180 can be a secure multi-party (e.g., 2-party) compute system. The aggregation system 180 can allow for collapsing information across multiple sites into a single, privacy preserving report, which is made possible by a write-only per-origin data store that flushes data to a reporting endpoint after reaching aggregation thresholds across many client devices 110. That is, data is only reported if it is sufficiently aggregated across browser (or other application users, using a server-side aggregation service.

Technique for Demographic Reporting

Figure 13:
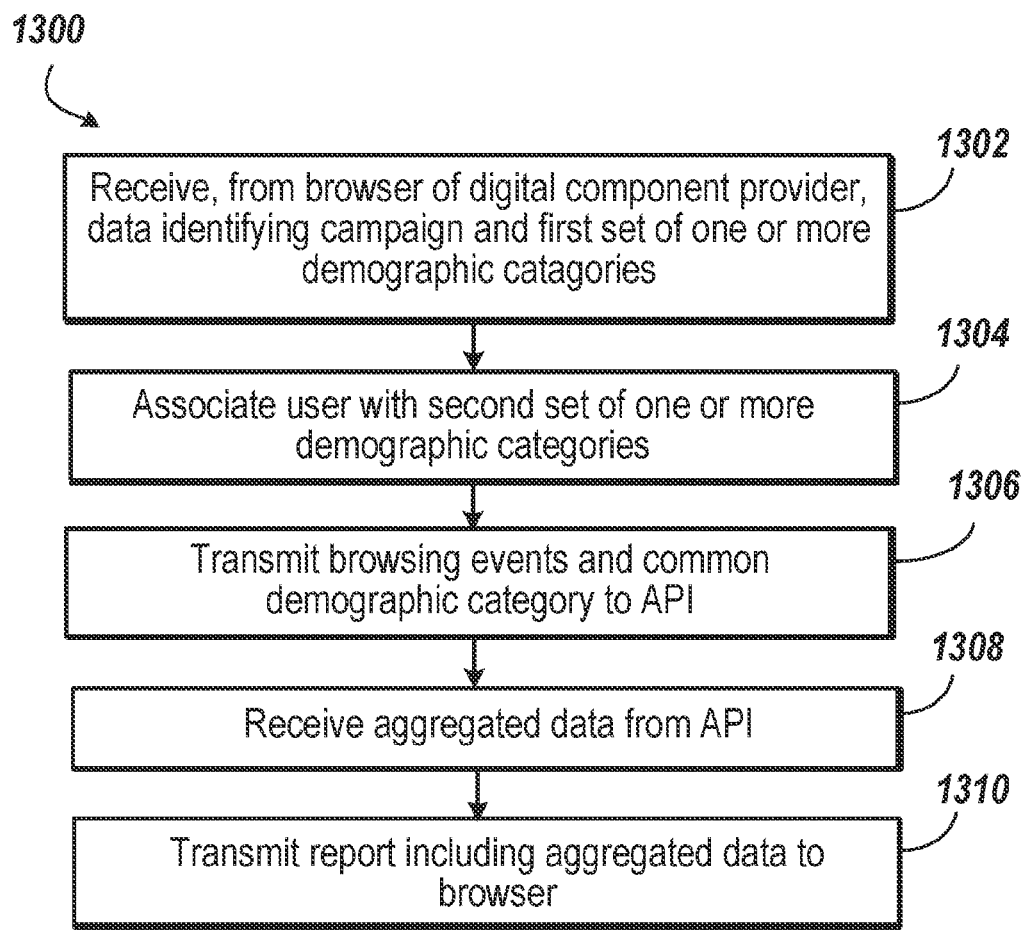
FIG. 13 is a flow diagram that illustrates demographic reporting, which is a process to report—to digital component providers—the effectiveness of the digital component.

FIG. 13 is a diagram that illustrates an example process 1300 for demographic reporting, as performed by the content platform 150. While the reporting is being described as being performed by the content platform 150, in some implementations the reporting can be performed by a separate reporting platform, as also indicated above. The content platform 150 can receive, at 1302 from an application (e.g. browser or native application) of a digital component provider 160, data identifying a campaign involving a digital component and a first set of one or more demographic categories for which demographic reporting is desired by the digital component provider. The digital component provider 160 can input this data onto such application. The first set of categories may include, for example, female and income greater than $X. In some implementations, the data identifying the campaign and the first set of one or more demographic categories can be included in an aggregation key, which can be a composite or concatenated key that has multiple values or multiple columns of values.

The content platform 150 can associate, at 1304, a user of the client device 110, on which the digital component is being (or to be) displayed, with a second set of one or more demographic categories. In one example, the second set of one or more demographic categories include female, parent, and income greater than $X. The associating can be performed in at least one of the following two ways. Under the first way, the content platform 150 can receive a self-identification, provided by the user on an application 112 implemented on the client device 110, of the second set of one or more demographic categories, and then the content platform 150 can map the user to the second set of one or more demographic categories to perform the associating. Under the second way, the content platform 150 can transmit, to the MPC cluster 130, browsing history of the user; then the content platform 150 can receive, from a machine learning model within the MPC cluster 130, inferences output by that machine learning model that include the second set of demographic categories; and subsequently the content platform can map the user to the second set of one or more demographic categories to perform the associating.

If the first set of one or more demographic categories (which represent demographic categories for which demographic reporting is desired by the digital component provider 160; e.g. female and income greater than $100,000, as input data onto the application 112 by the digital component provider 160) and the second set of one or more demographic categories (which represent either inferences of user groups for the user as generated by machine learning or user groups self-identified by the users on application 112; e.g. female, parent, and income greater than $100,000) have at least one demographic category in common (e.g. demographic categories of female and income greater than $100,000), the content platform 150 can transmit, at 1306, browsing events (e.g. impressions, clicks, and/or conversions, and/or lack/absence thereof) input on the client device 110 and the at least one common demographic category to an aggregation API. In the examples given above for the first set of one or more demographic categories and the second set of one or more demographic categories, notice that the categories of female and income greater than $X are common. Therefore, in such example, the content platform 150 transmits browsing events (e.g. impressions, clicks, and/or conversions, and/or lack/absence thereof) input on the client device 110 and data identifying the common demographic categories to an aggregation API.

The aggregation API combines the browsing events (e.g. impressions, clicks, and/or conversions, and/or lack/absence thereof) and the at least one common demographic category with at least one browsing event of other users and related at least one demographic category that is one of the first set of one or more demographic categories to generate aggregated data. In the example used above, the aggregation API combines the data for browsing events for the categories of female and income greater than $X with browsing events of other users—with respect to this digital component—within the categories of female and income greater than $X. In this example, the aggregation does not take into account the uncommon category (i.e. not common between the first set of one or more demographic categories and the second set of one or more demographic categories) of parent because the digital component provider desires a report of just the specified categories of female and income greater than $X, not of the category of parents. In some examples, the aggregated data can be a table that is the same as or similar to the Table 7 discussed above. The aggregation can aggregate data for a preset amount of time (e.g., 1 hour, 12 hours, 1 day, 2 days, 5 days, 1 month, or any other time period). For example, in Table 7, the count of impressions, clicks, and conversions is per day.

The aggregation API is described above in detail.

The content platform 150 can receive, at 1308, the aggregated data from the aggregation API. The content platform 150 can use the aggregated data to generate a report. To generate the report, the content platform 150 can arrange the aggregated data in a table (e.g. the table of Table 7, or a similar table), generate analytics based on the aggregated data in the table, and combine and present the table and the analytics in the report. Because the data in the table (e.g., Table 7) as well as the report is computed for all of the users as a whole rather than single users individually, and because such table or reports are not controlled by the application 112, the vendors, privacy experts, or any others such entity, such reports preserve user privacy and prevent leak of user data while avoiding use of cookies.

The content platform 150 can generate the report in response to a request to generate a report. In some implementations, the content platform 150 can receive the request for the report from a digital content provider 160. In one example consistent with these implementations, the digital component provider 160 may request a report for a particular digital component of that digital component provider 160. In another example, the digital component provider may request a report for several digital components of that digital component provider 160. In yet another example, the digital component provider may request a report for one or more campaigns of that digital component provider 160. In some examples, the digital component provider 160 may request a report by specifying one or more campaign IDs, one or more digital component IDs, one or more demographic user groups IDs, and/or one or more events (e.g. impressions, clicks, and/or conversions, and/or lack/absence thereof) for which the report is desired. In other implementations, the request for generation of a report can be generated automatically. The automatic generation of the request by the script can take place at (a) preset intervals of time, and/or (b) when a count of one or more events—e.g. impressions, clicks, and/or conversions, and/or lack/absence thereof, associated with a digital component or campaign of the content provider 160—exceeds a particular threshold (e.g. when the number of clicks by females exceeds 1000). In certain implementations, the script can automatically generate the request (a) in response to a request from the content provider, and/or (b) automatically.

The content platform 150 can transmit, at 1310, the report to the aggregated data to the application (e.g. browser or native application) of the digital component provider 160. The report can be presented on a user interface displayed by the application implemented on a computing device of the digital component provider 160. Generally, reporting is not latency sensitive. For example, taking up to a minute or more to generate a report may not be disadvantageous.

Figure 14:
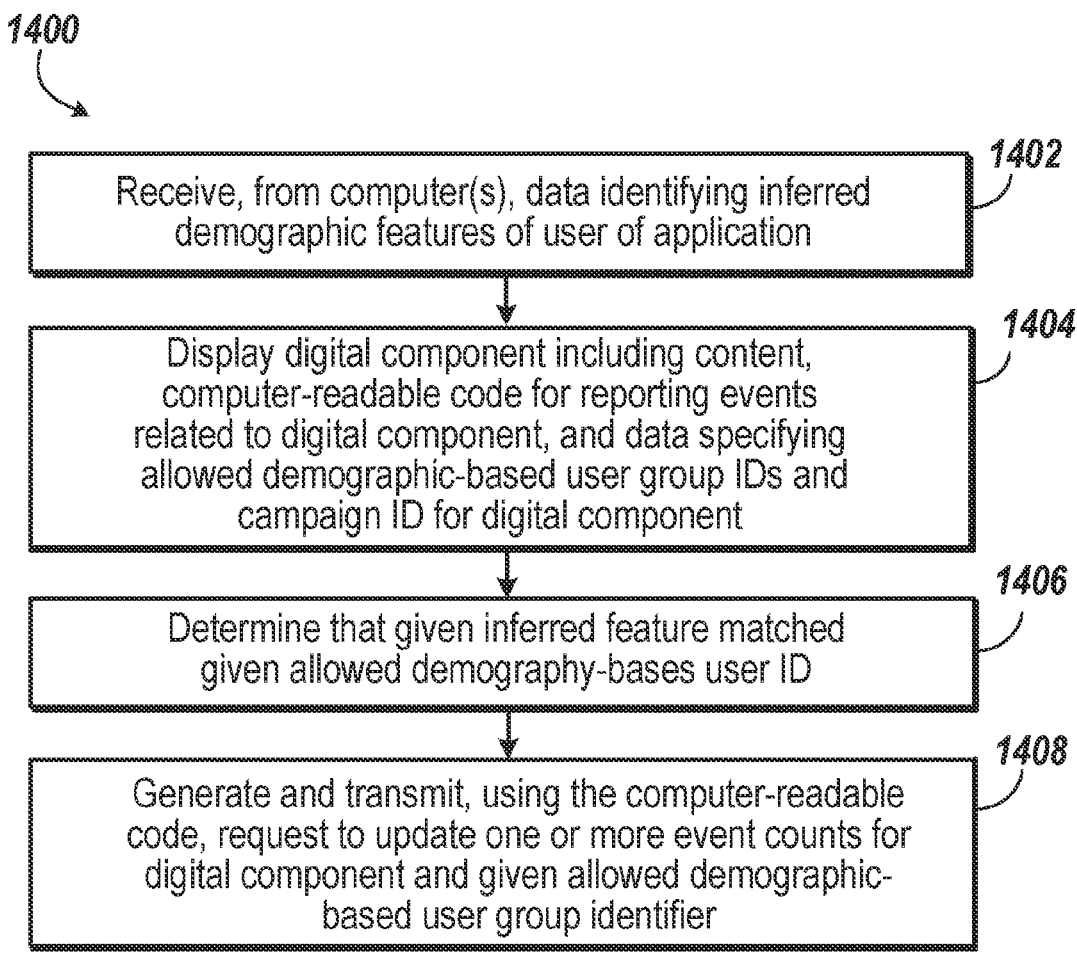
FIG. 14 is a flow diagram that illustrates an example process performed by the client device to facilitate demographic-based digital component distribution and demographic reporting.

FIG. 14 is a diagram that illustrates an example process 1400 performed by the client device 110 to facilitate demographic-based digital component distribution and demographic reporting. An application 112 of the client device 110 can receive, at 1402 from one or more computers (e.g., MPC cluster 130 that includes two computing systems $MPC_1$ and $MPC_2$), data identifying inferred demographic features of a user of the application. The application 112 can display, at 1404, digital content including computer-readable code for reporting events related to the digital component, and data specifying a set of allowed demographic-based user group identifiers and a campaign identifier for the digital component. The digital content for which reporting is being performed can be content of an electronic resource, e.g., content of a web page or of a native application. In another example, the digital content for which reporting is being performed can be a digital component that is being displayed in a digital component slot of an electronic resource.

The application 112 can determine, at 1406, that a given inferred feature matches a given allowed demographic-based user group identifier from an allowed list of demographic-based user group identifiers. The allowed list of demographic-based user group identifiers can include demographic-based user group identifiers for which reporting is allowed for the digital content. For example, the list can include one or more user groups that the owner of the user groups has enabled reporting for the digital content. The list can be included in a script of the digital content. To determine whether there is a match, the application 112 can compare the allowed demographic-based user group identifiers to a list of user group identifiers for user groups that include the user as a member.

In response to determining that the given inferred demographic feature matches the given allowed demographic-based user group identifier, the application 112 can generate and transmit, at 1408 using the computer-readable code, a request to update one or more event counts for the digital component and the given allowed demographic-based user group identifier. For example, the request can be to increase, e.g., increment, the number of users in the demographic-based user group identified by the given allowed demographic-based user group identifier that have been presented the digital content, that has interacted with, e.g., selected the digital content, or that performed some other action with respect to the digital content.

The receiving of the data identifying inferred demographic features of a user of the application 112 at 1402 includes receiving inferred demographic-based user group identifiers for demographic-based user groups to which to add the user at the client device 110. In some implementations, an inference request including a user profile of the user can be transmitted to the one or more computers. In some implementations, two or more computers are required to implement secure multi-party computation. Such inference request can include a user profile of the user. The inferred demographic user group identifiers can be received from the one or more computers in response to the inference request.

The transmission of the inference request to the one or more computers can include sending a respective secret share of the user profile to each MPC computing system (e.g. MPC server) forming the one of more computers. The MPC cluster 130 performs a secure MPC process using one or more machine learning models to generate secret shares of the inferred demographic-based user group identifiers and transmits the secrets shares of the inferred demographic-based user group identifiers to the application 112.

In response to displaying the digital component, the application 112 can transmit, to the one or more computers, an inference request for the data identifying the inferred demographic features of the user of the application 112. The inference request can include a user profile of the user and contextual signals related to at least one of (i) a digital component slot in which the digital component is displayed or (ii) the digital component, wherein the inferred demographic user group identifiers are received from the one or more computers in response to the inference request. In some examples, contextual signals can include contextual level signals such as a uniform resource locator (URL) of the resource, a location of the client device 110, spoken language setting of the application 112, a number of digital component slots, above or below the fold, and/or the like. In certain instances, contextual signals for the digital component can include creative signals such as information about the digital component, format (e.g. image, video, audio, and/or the like) of the digital component, size of the digital component, and/or the like.

The generating and transmitting, using the computer-readable code, of the request to update one or more event counts for the digital component and the given allowed demographic-based user group identifier can include (i) generating an aggregation key including the campaign identifier and the given allowed demographic-based user group identifier, and (ii) transmitting the aggregation key with the request.

The generating and transmitting, using the computer-readable code, of the request to update one or more event counts for the digital component and the given allowed demographic-based user group identifier can include invoking an application programming interface (API) of the application 112 to send the request.

In some implementations, the process 1400 can be used to update event counts that may be incorrect. For example, at the time of reporting that a user was presented the digital content, the user may have been inferred to be a member of a first demographic-based user group. However, some time later, the user was inferred to be in a second demographic-based user group different from the first demographic-based user group. In this example, the request can be to decrement the event count for the first demographic-based user group and increment the event count for the second demographic-based user group.

Figure 15:
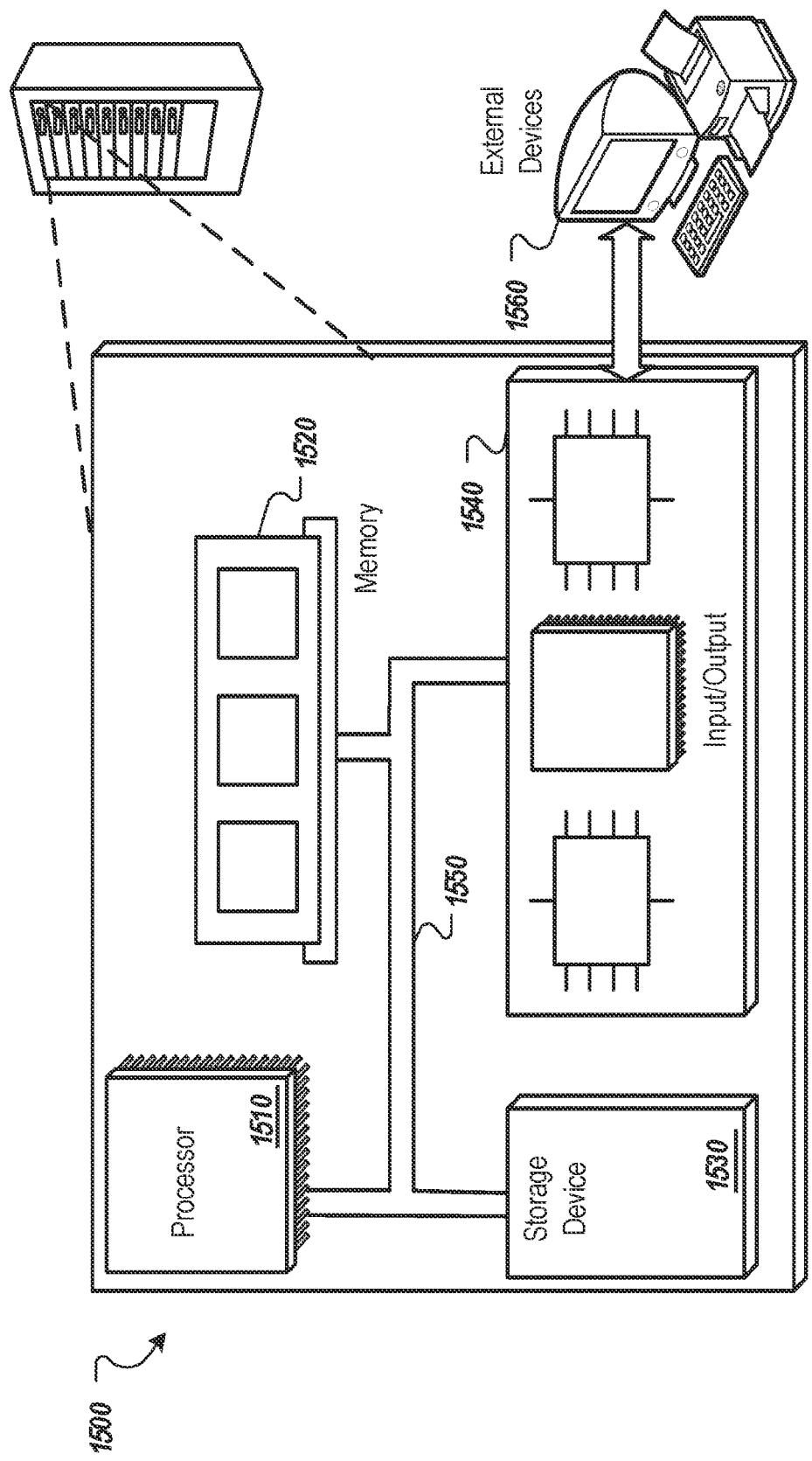
FIG. 15 is a block diagram of an example computer system.

FIG. 15 is a block diagram of an example computer system 1500 that can be used to perform operations described above. The system 1500 includes a processor 1510, a memory 1520, a storage device 1530, and an input/output device 1540. Each of the components 1510, 1520, 1530, and 1540 can be interconnected, for example, using a system bus 1550. The processor 1510 is capable of processing instructions for execution within the system 1500. In some implementations, the processor 1510 is a single-threaded processor. In another implementation, the processor 1510 is a multi-threaded processor. The processor 1510 is capable of processing instructions stored in the memory 1520 or on the storage device 1530.

The memory 1520 stores information within the system 1500. In one implementation, the memory 1520 is a computer-readable medium. In some implementations, the memory 1520 is a volatile memory unit. In another implementation, the memory 1520 is a non-volatile memory unit.

The storage device 1530 is capable of providing mass storage for the system 1500. In some implementations, the storage device 1530 is a computer-readable medium. In various different implementations, the storage device 1530 can include, for example, a hard disk device, an optical disk device, a storage device that is shared over a network by multiple computing devices (e.g., a cloud storage device), or some other large capacity storage device.

The input/output device 1540 provides input/output operations for the system 1500. In some implementations, the input/output device 1540 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to external devices 1560, e.g., keyboard, printer and display devices. Other implementations, however, can also be used, such as mobile computing devices, mobile communication devices, set-top box television client devices, etc.

Although an example processing system has been described in FIG. 15, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially-generated propagated signal—e.g., a machine-generated electrical, optical, or electromagnetic signal—that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A method comprising:
receiving, from a digital content provider, data identifying digital content and a first set of one or more demographic categories for which demographic reporting is to be performed;
associating a user of a client device on which the digital content is being displayed with a second set of one or more inferred demographic categories;
determining that at least one of the one or more inferred demographic categories matches a corresponding demographic category in the first set of one or more demographic categories for which demographic reporting is to be performed;
in response to determining that the at least one of the one or more inferred demographic categories matches the corresponding demographic category in the first set of one or more demographic categories for which demographic reporting is to be performed, transmitting browsing events input on the client device and the at least one demographic category to an API, wherein the API combines the browsing events and the at least one demographic category with browsing events of other users that are assigned the at least one demographic category to generate aggregated data;
receiving, from the API, the aggregated data;
generating analytics based on the aggregated data;
generating a report comprising the aggregated data and the analytics; and
transmitting the report to the digital content provider.

2. The method of claim 1, wherein the associating of the user with the second set of one or more demographic categories comprises:
receiving, from the user, a self-identification of the second set of one or more demographic categories; and
mapping the user to the second set of one or more demographic categories.

3. The method of claim 1, wherein the associating of the user with the second set of one or more demographic categories comprises:
transmitting, to a multi-party computation cluster, browsing history of the user; and
receiving, from a machine learning model within the multi-party computation cluster, inferences output by the machine learning model, the inferences comprising the second set of demographic categories; and
mapping the user to the second set of one or more demographic categories.

4. The method of claim 1, wherein the generating the analytics comprises:
arranging the aggregated data in a table;
generating the analytics based on the aggregated data in the table; and
providing the table and the analytics in the report.

5. The method of claim 1, wherein the report is generated in response to a request for the report or automatically at preset intervals of time.

6. The method of claim 5, wherein the request for the report is generated by one or more of the digital content provider, content platform, secure multi-party computing cluster, or a publisher.

7. The method of claim 5, wherein the request for the report is generated automatically at preset intervals of time or upon a count of an event exceeding a preset threshold.

8. The method of claim 1, wherein the data identifying the digital content and the first set of one or more demographic categories are included in an aggregate key, wherein the data identifying the digital content comprises a uniform resource locator (URL) of a resource displaying the digital content.

9. The method of claim 1, further comprising:
determining a third set of demographic categories that are relevant for the user; and restricting a browser of the client device to displaying digital content indicated by respective digital content providers as being associated with a category of the third set of demographic categories.

10. The method of claim 9, wherein the determining of the third set of one or more demographic categories comprises:
receiving a self-identification, by the user on the browser, of the third set of one or more demographic categories as being relevant for the user.

11. The method of claim 9, wherein the determining of the third set of one or more demographic categories comprises:
transmitting, to a multi-party computation cluster, browsing history of the user; and
receiving, from the multi-party computation cluster, data identifying the third set of demographic categories.

12. A system comprising:
at least one programmable processor; and
a machine-readable medium storing instructions that, when executed by the at least one programmable processor, cause the at least one programmable processor to perform operations comprising:
receiving, from a digital content provider, data identifying digital content and a first set of one or more demographic categories for which demographic reporting is to be performed;
associating a user of a client device on which the digital content is being displayed with a second set of one or more inferred demographic categories;
determining that at least one of the one or more inferred demographic categories matches a corresponding demographic category in the first set of one or more demographic categories for which demographic reporting is to be performed;
in response to determining that the at least one of the one or more inferred demographic categories matches the corresponding demographic category in the first set of one or more demographic categories for which demographic reporting is to be performed, transmitting browsing events input on the client device and the at least one demographic category to an API, wherein the API combines the browsing events and the at least one demographic category with browsing events of other users that are assigned the at least one demographic category to generate aggregated data;
receiving, from the API, the aggregated data;
generating analytics based on the aggregated data;
generating a report comprising the aggregated data and the analytics; and
transmitting the report to the digital content provider.

13. A non-transitory computer program product storing instructions that, when executed by at least one programmable processor, cause the at least one programmable processor to perform operations comprising:
receiving, from a digital content provider, data identifying digital content and a first set of one or more demographic categories for which demographic reporting is to be performed;
associating a user of a client device on which the digital content is being displayed with a second set of one or more inferred demographic categories;
determining that at least one of the one or more inferred demographic categories matches a corresponding demographic category in the first set of one or more demographic categories for which demographic reporting is to be performed;
in response to determining that the at least one of the one or more inferred demographic categories matches the corresponding demographic category in the first set of one or more demographic categories for which demographic reporting is to be performed, transmitting browsing events input on the client device and the at least one demographic category to an API, wherein the API combines the browsing events and the at least one demographic category with browsing events of other users that are assigned the at least one demographic category to generate aggregated data;
receiving, from the API, the aggregated data;
generating analytics based on the aggregated data;
generating a report comprising the aggregated data and the analytics; and
transmitting the report to the digital content provider.

14. The system of claim 12, wherein the associating of the user with the second set of one or more demographic categories comprises:
receiving, from the user, a self-identification of the second set of one or more demographic categories; and
mapping the user to the second set of one or more demographic categories.

15. The system of claim 12, wherein the associating of the user with the second set of one or more demographic categories comprises:
transmitting, to a multi-party computation cluster, browsing history of the user; and
receiving, from a machine learning model within the multi-party computation cluster, inferences output by the machine learning model, the inferences comprising the second set of demographic categories; and
mapping the user to the second set of one or more demographic categories.

16. The system of claim 12, wherein the generating the analytics comprises:
arranging the aggregated data in a table;
generating the analytics based on the aggregated data in the table; and
providing the table and the analytics in the report.

17. The system of claim 12, wherein the report is generated in response to a request for the report or automatically at preset intervals of time.

18. The system of claim 17, wherein the request for the report is generated by one or more of the digital content provider, content platform, secure multi-party computing cluster, or a publisher.

* * * * *